US012639767B2

(12) United States Patent
Combs

(10) Patent No.: US 12,639,767 B2
(45) Date of Patent: May 26, 2026

(54) SYSTEMS AND METHODS FOR CLAIM PROCESSING

(71) Applicant: CorVel Corporation, Fort Worth, TX (US)

(72) Inventor: Michael Combs, Fort Worth, TX (US)

(73) Assignee: CORVEL CORPORATION, Fort Worth, TX (US)

( * ) Notice: Subject to any disclaimer, the term of this patent is extended or adjusted under 35 U.S.C. 154(b) by 0 days.

(21) Appl. No.: 17/959,190

(22) Filed: Oct. 3, 2022

(65) Prior Publication Data

US 2023/0105093 A1      Apr. 6, 2023

Related U.S. Application Data

(60) Provisional application No. 63/251,495, filed on Oct. 1, 2021.

(51) Int. Cl.
    G06Q 40/08          (2012.01)
(52) U.S. Cl.
    CPC ..................................... G06Q 40/08 (2013.01)
(58) Field of Classification Search
    CPC ..... G06Q 40/08; G06Q 10/10; G06Q 10/0631
    See application file for complete search history.

(56) References Cited

U.S. PATENT DOCUMENTS

| | | | | | |
|---|---|---|---|---|---|
| 8,401,896 | B2 * | 3/2013 | Wargin | ............ | G06Q 10/06316 |
| | | | | | 705/4 |
| 8,484,046 | B1 * | 7/2013 | Bauer | .................... | G06Q 40/08 |
| | | | | | 705/2 |
| 8,640,191 | B2 * | 1/2014 | Lim | ......................... | H04L 63/10 |
| | | | | | 713/153 |
| 11,430,078 | B2 * | 8/2022 | Sukman | .................. | G06F 40/30 |
| 2001/0041993 | A1 * | 11/2001 | Campbell | .............. | G06Q 10/10 |
| | | | | | 705/4 |
| 2005/0137912 | A1 * | 6/2005 | Rao | ......................... | G06Q 40/08 |
| | | | | | 705/4 |
| 2009/0276733 | A1 * | 11/2009 | Manyam | ............... | G06Q 40/08 |
| | | | | | 715/854 |
| 2010/0299161 | A1 * | 11/2010 | Burdick | ............... | G06Q 10/087 |
| | | | | | 709/204 |
| 2014/0081675 | A1 * | 3/2014 | Ives | ........................ | G06Q 40/08 |
| | | | | | 705/4 |

(Continued)

FOREIGN PATENT DOCUMENTS

| | | | | | |
|---|---|---|---|---|---|
| WO | WO-0201460 A2 * | 1/2002 | ............. | G06Q 40/02 |
| WO | WO-2013159178 A1 * | 10/2013 | ............. | G06Q 10/10 |

*Primary Examiner* — Mamon Obeid

(57) ABSTRACT

Systems and methods for dynamically scheduling a claim review are provided. A request to display an instance of a claim review is received, the request generated by a user in a plurality of users associated with a first or second entity. The instance of the claim review includes claims by a plurality of claimants, each claim associated with both the first and second entity. Responsive to the request, a customizable template specifying an order and subset of the claims in the instance of the claim review is applied. Each claim is accessed, in electronic form, from one or more data stores, to acquire a summary of the respective claim. A customizable user interface is displayed, including a completion status for the claim review, the summary of each claim, a first affordance for updating the completion status, and a second affordance for updating a criterion.

28 Claims, 40 Drawing Sheets

(56)     References Cited

U.S. PATENT DOCUMENTS

| | | | |
|---|---|---|---|
| 2014/0136216 A1* | 5/2014 | Beebe ..................... | G06Q 40/08 |
| | | | 705/2 |
| 2014/0281917 A1* | 9/2014 | Alpern ................... | G06F 40/14 |
| | | | 715/234 |
| 2015/0088557 A1* | 3/2015 | Huynh ................... | G06Q 10/10 |
| | | | 705/4 |
| 2015/0154712 A1* | 6/2015 | Cook ..................... | G06Q 40/08 |
| | | | 705/4 |
| 2016/0071216 A1* | 3/2016 | Florence ............... | G06Q 40/08 |
| | | | 705/4 |
| 2017/0161839 A1* | 6/2017 | Loughran .............. | G06Q 40/08 |
| 2017/0193605 A1* | 7/2017 | Narendran ......... | G06Q 10/0631 |
| 2019/0244302 A1* | 8/2019 | Levy ..................... | G16H 10/60 |
| 2020/0294152 A1* | 9/2020 | Fletcher ................ | G06Q 40/08 |

* cited by examiner

Figure 2A:
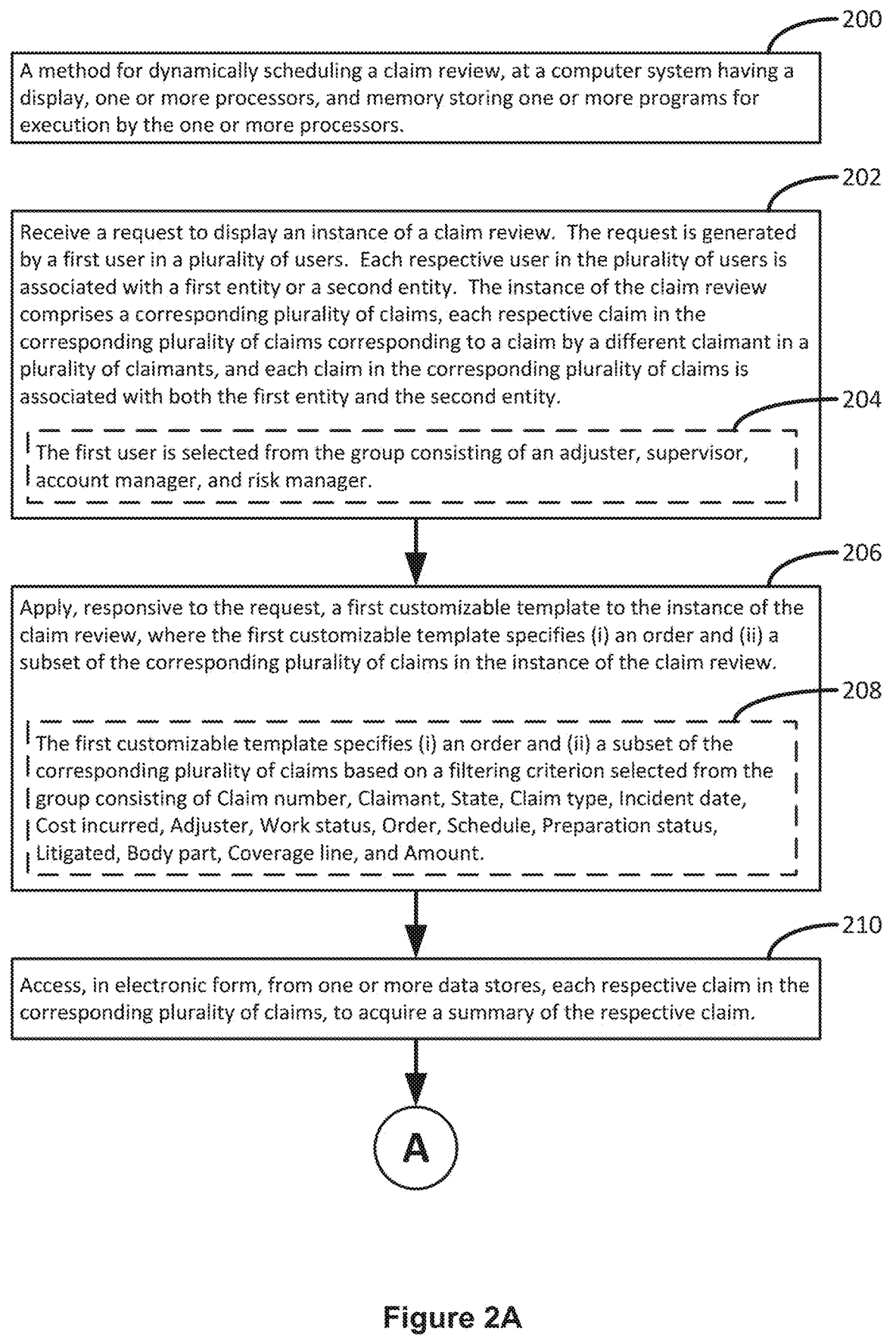

200

A method for dynamically scheduling a claim review, at a computer system having a display, one or more processors, and memory storing one or more programs for execution by the one or more processors.

202

Receive a request to display an instance of a claim review. The request is generated by a first user in a plurality of users. Each respective user in the plurality of users is associated with a first entity or a second entity. The instance of the claim review comprises a corresponding plurality of claims, each respective claim in the corresponding plurality of claims corresponding to a claim by a different claimant in a plurality of claimants, and each claim in the corresponding plurality of claims is associated with both the first entity and the second entity.

204

The first user is selected from the group consisting of an adjuster, supervisor, account manager, and risk manager.

206

Apply, responsive to the request, a first customizable template to the instance of the claim review, where the first customizable template specifies (i) an order and (ii) a subset of the corresponding plurality of claims in the instance of the claim review.

208

The first customizable template specifies (i) an order and (ii) a subset of the corresponding plurality of claims based on a filtering criterion selected from the group consisting of Claim number, Claimant, State, Claim type, Incident date, Cost incurred, Adjuster, Work status, Order, Schedule, Preparation status, Litigated, Body part, Coverage line, and Amount.

210

Access, in electronic form, from one or more data stores, each respective claim in the corresponding plurality of claims, to acquire a summary of the respective claim.

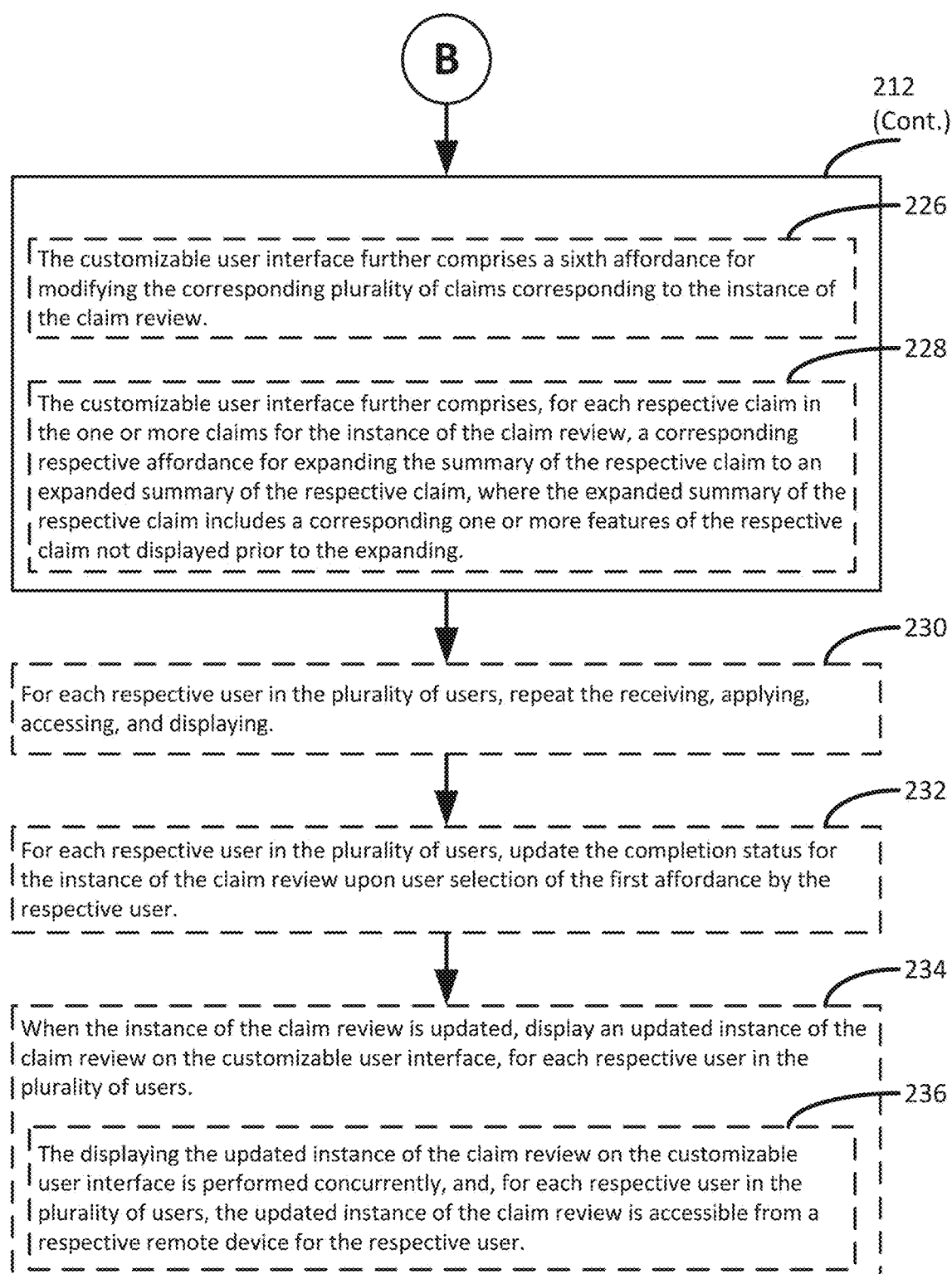

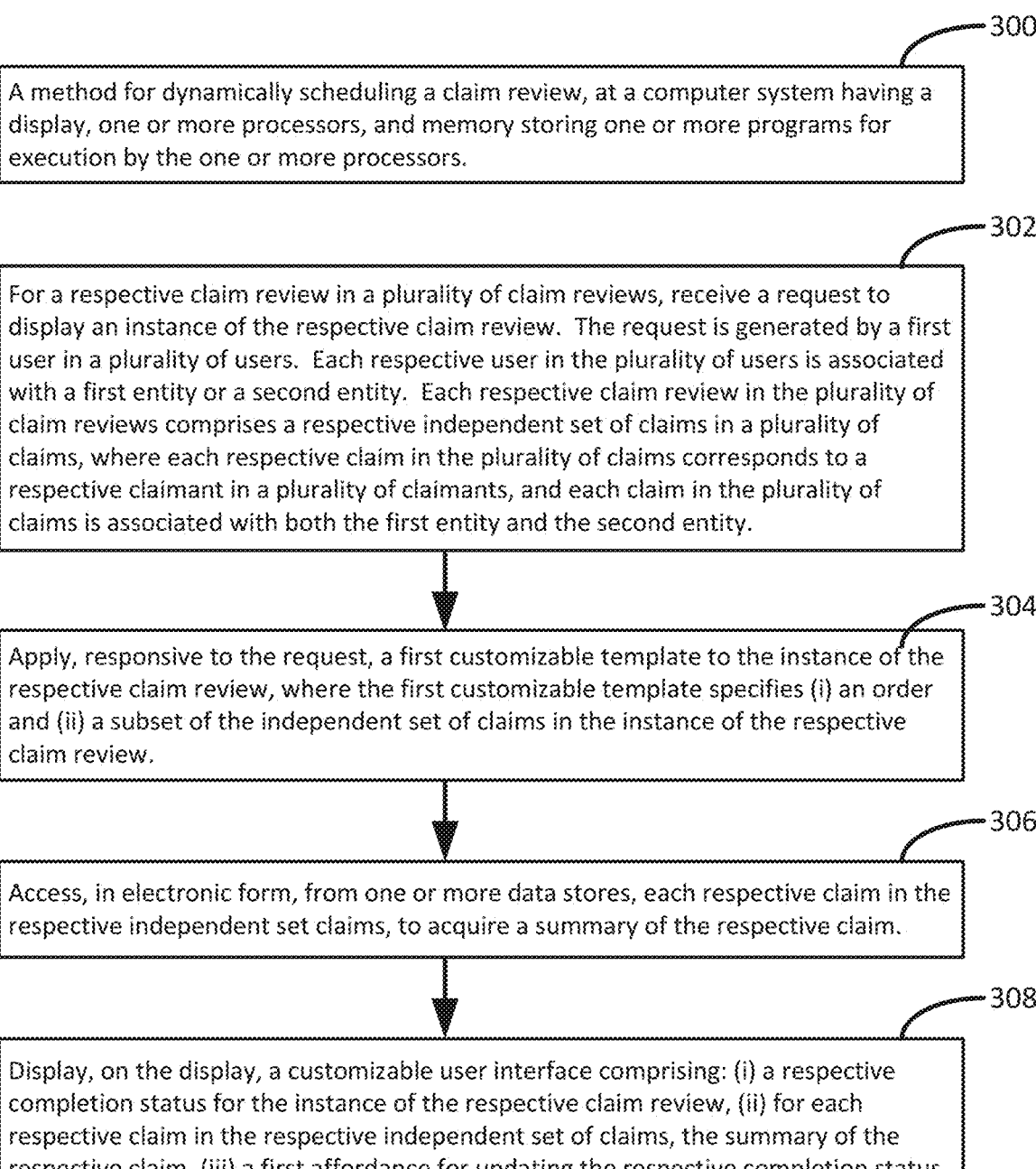

300

A method for dynamically scheduling a claim review, at a computer system having a display, one or more processors, and memory storing one or more programs for execution by the one or more processors.

302

For a respective claim review in a plurality of claim reviews, receive a request to display an instance of the respective claim review. The request is generated by a first user in a plurality of users. Each respective user in the plurality of users is associated with a first entity or a second entity. Each respective claim review in the plurality of claim reviews comprises a respective independent set of claims in a plurality of claims, where each respective claim in the plurality of claims corresponds to a respective claimant in a plurality of claimants, and each claim in the plurality of claims is associated with both the first entity and the second entity.

304

Apply, responsive to the request, a first customizable template to the instance of the respective claim review, where the first customizable template specifies (i) an order and (ii) a subset of the independent set of claims in the instance of the respective claim review.

306

Access, in electronic form, from one or more data stores, each respective claim in the respective independent set claims, to acquire a summary of the respective claim.

308

Display, on the display, a customizable user interface comprising: (i) a respective completion status for the instance of the respective claim review, (ii) for each respective claim in the respective independent set of claims, the summary of the respective claim, (iii) a first affordance for updating the respective completion status of the instance of the respective claim review, and (iv) a second affordance for updating a respective criterion for the instance of the respective claim review.

Figure 3

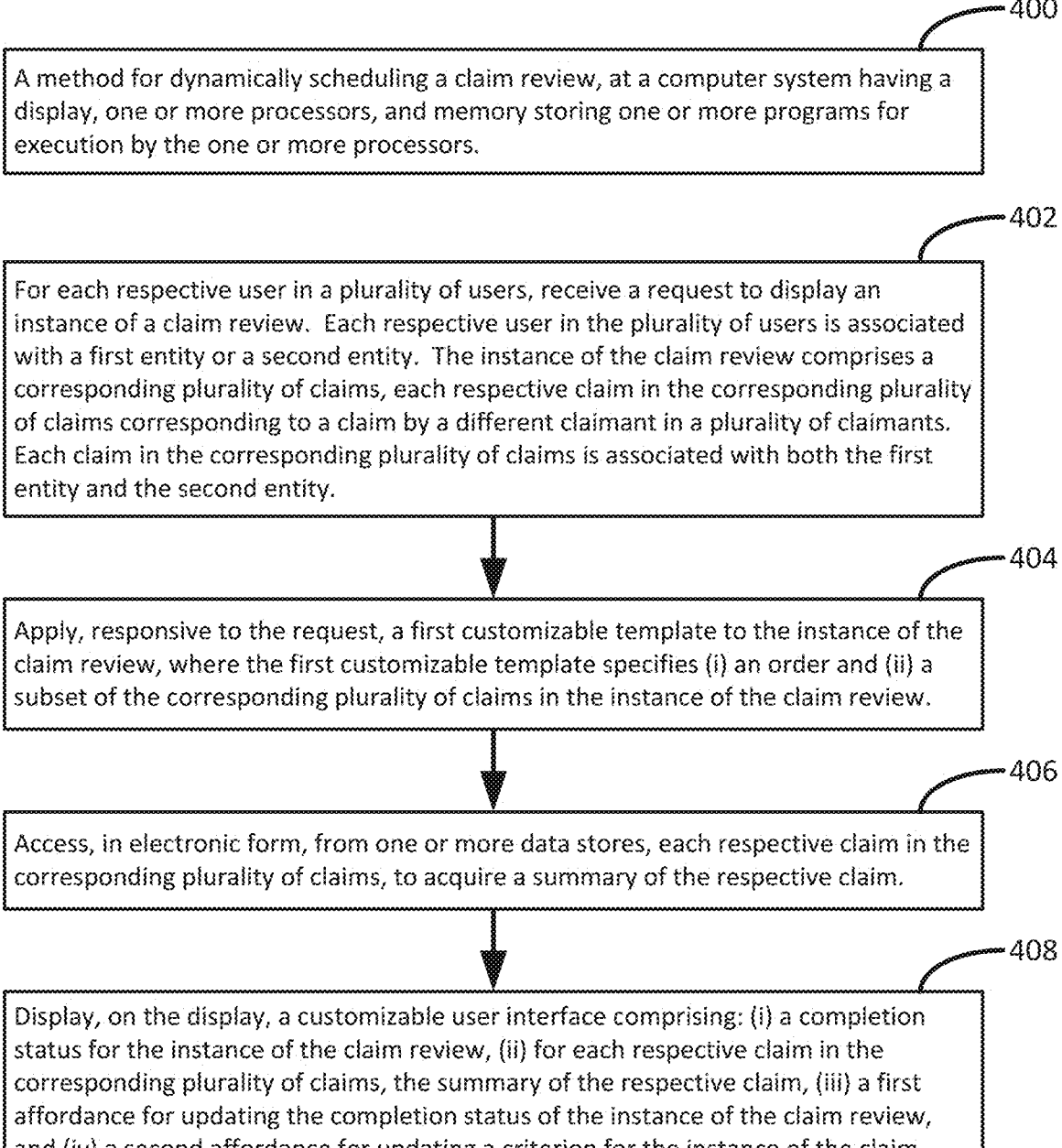

400

A method for dynamically scheduling a claim review, at a computer system having a display, one or more processors, and memory storing one or more programs for execution by the one or more processors.

402

For each respective user in a plurality of users, receive a request to display an instance of a claim review. Each respective user in the plurality of users is associated with a first entity or a second entity. The instance of the claim review comprises a corresponding plurality of claims, each respective claim in the corresponding plurality of claims corresponding to a claim by a different claimant in a plurality of claimants. Each claim in the corresponding plurality of claims is associated with both the first entity and the second entity.

404

Apply, responsive to the request, a first customizable template to the instance of the claim review, where the first customizable template specifies (i) an order and (ii) a subset of the corresponding plurality of claims in the instance of the claim review.

406

Access, in electronic form, from one or more data stores, each respective claim in the corresponding plurality of claims, to acquire a summary of the respective claim.

408

Display, on the display, a customizable user interface comprising: (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

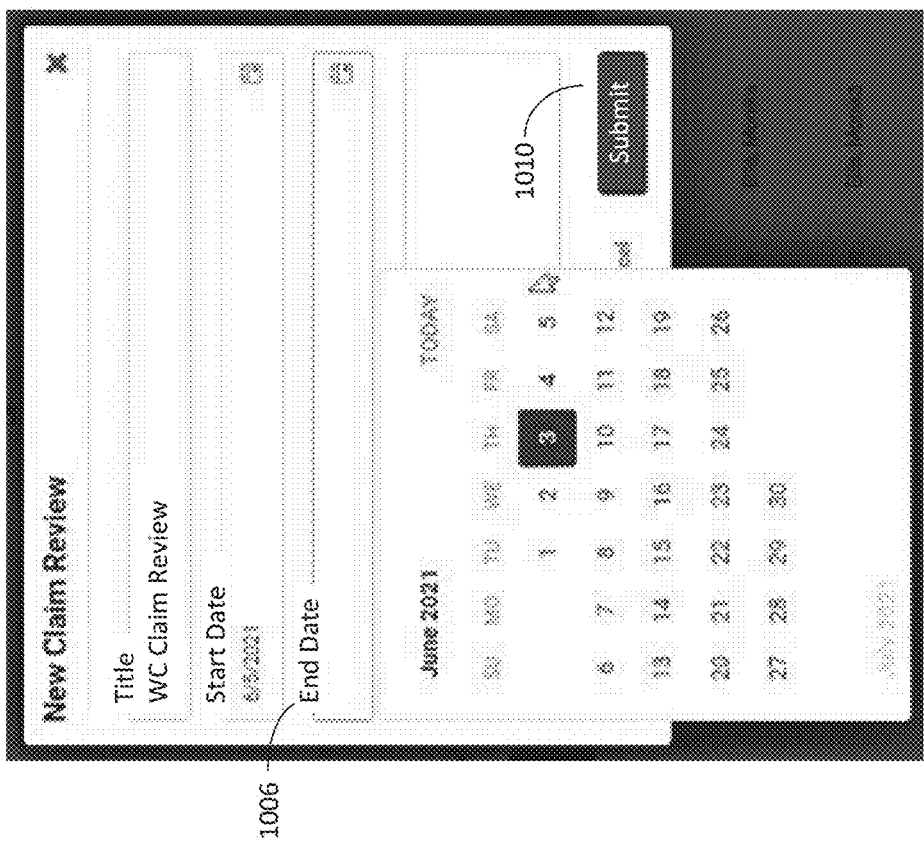
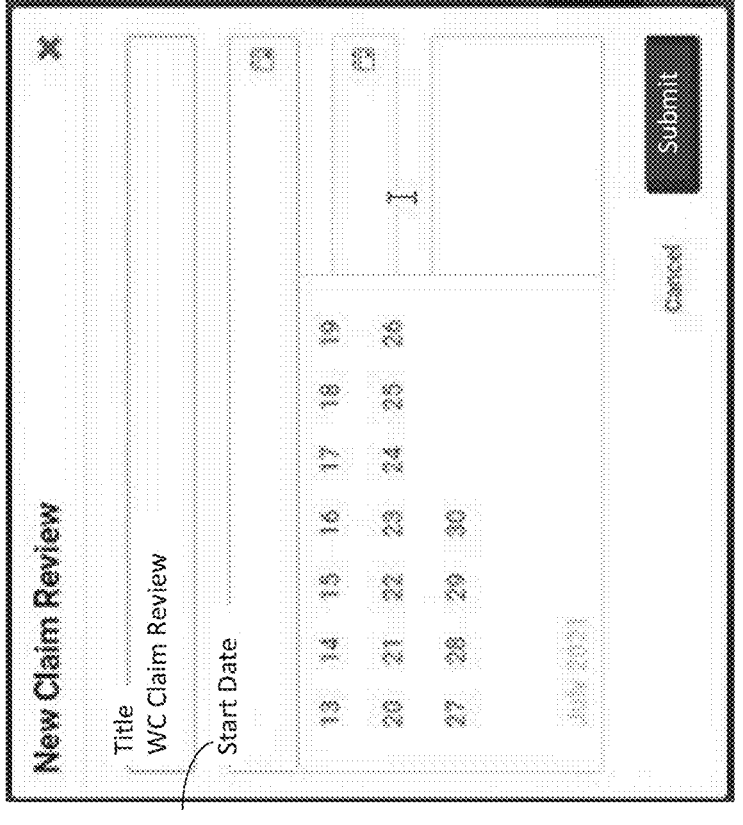
Figure 10B

Figure 12:
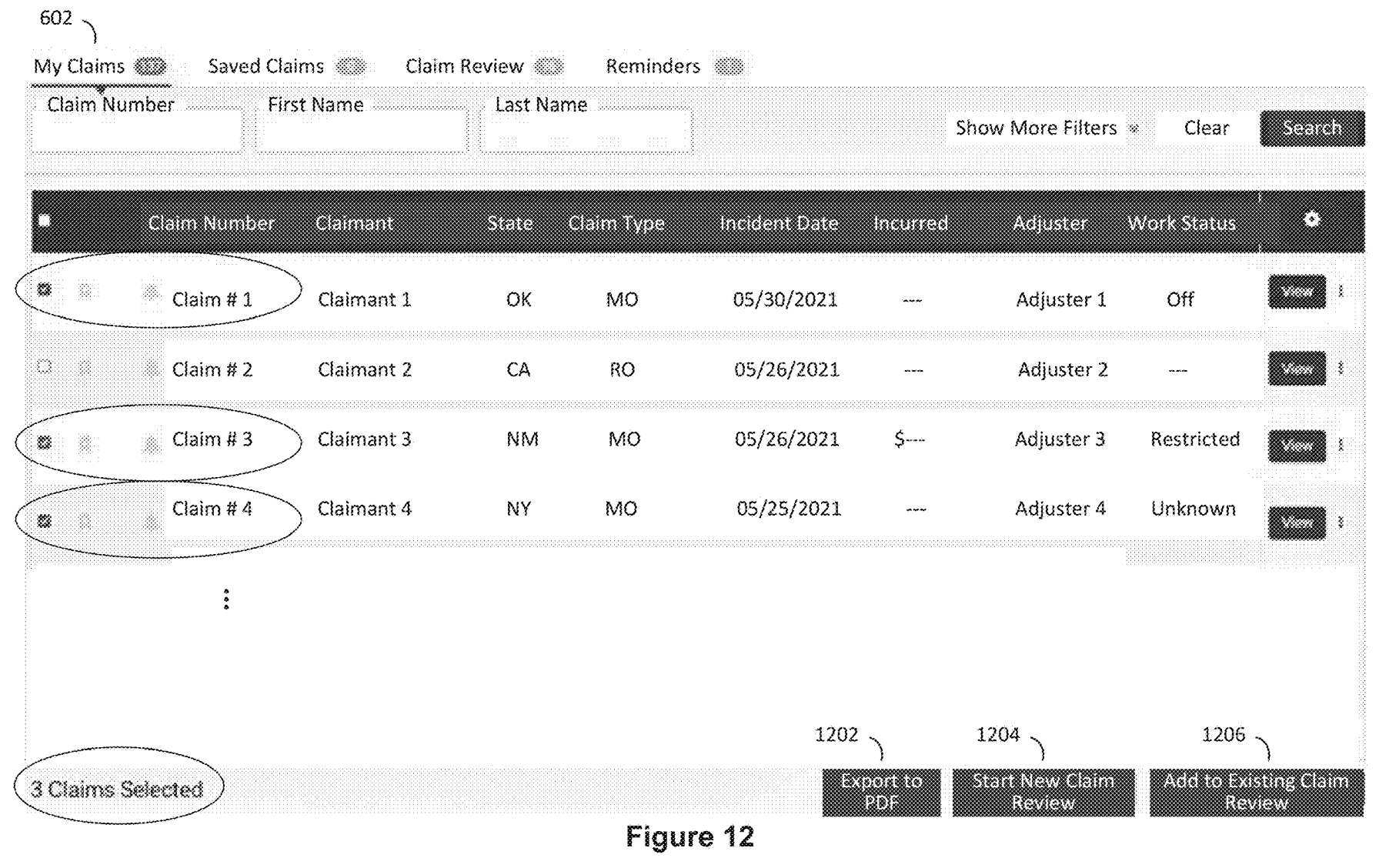

602

My Claims ⬤   Saved Claims ⬤   Claim Review ⬤   Reminders ⬤

Claim Number     First Name     Last Name     Show More Filters ✱   Clear   Search

| Claim Number | Claimant | State | Claim Type | Incident Date | Incurred | Adjuster | Work Status | |
|---|---|---|---|---|---|---|---|---|
| Claim # 1 | Claimant 1 | OK | MO | 05/30/2021 | --- | Adjuster 1 | Off | View |
| Claim # 2 | Claimant 2 | CA | RO | 05/26/2021 | --- | Adjuster 2 | --- | View |
| Claim # 3 | Claimant 3 | NM | MO | 05/26/2021 | $--- | Adjuster 3 | Restricted | View |
| Claim # 4 | Claimant 4 | NY | MO | 05/25/2021 | --- | Adjuster 4 | Unknown | View |

• • •

3 Claims Selected

1202 — Export to PDF    1204 — Start New Claim Review    1206 — Add to Existing Claim Review

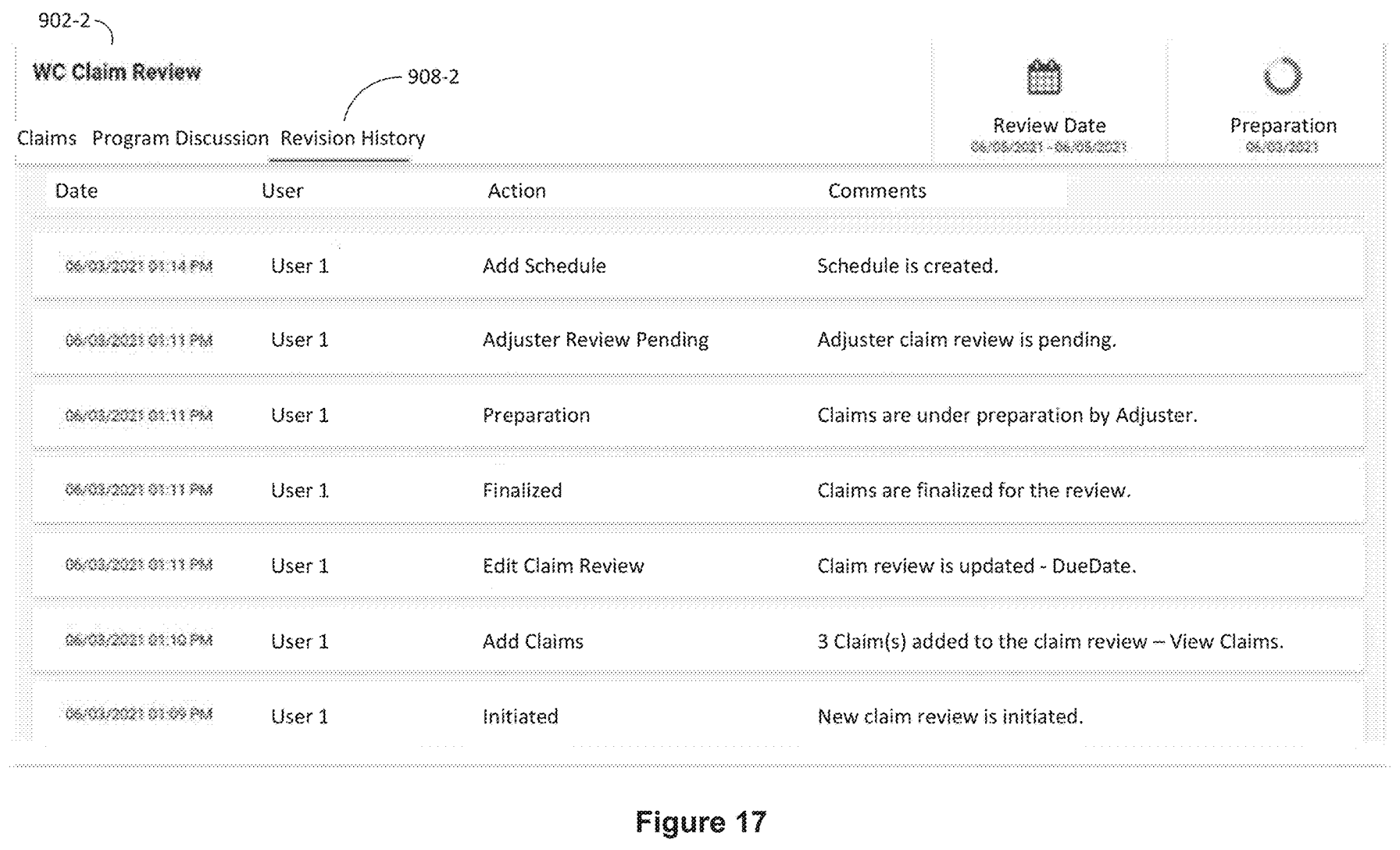

WC Claim Review

908-2

Claims  Program  Discussion  Revision History

Review Date    Preparation

| Date | User | Action | Comments |
|---|---|---|---|
| 06/03/2023 03:14 PM | User 1 | Add Schedule | Schedule is created. |
| 06/03/2023 03:11 PM | User 1 | Adjuster Review Pending | Adjuster claim review is pending. |
| 06/03/2023 03:11 PM | User 1 | Preparation | Claims are under preparation by Adjuster. |
| 06/03/2023 03:11 PM | User 1 | Finalized | Claims are finalized for the review. |
| 06/03/2023 03:11 PM | User 1 | Edit Claim Review | Claim review is updated - DueDate. |
| 06/03/2023 03:10 PM | User 1 | Add Claims | 3 Claim(s) added to the claim review — View Claims. |
| 06/03/2023 03:09 PM | User 1 | Initiated | New claim review is initiated. |

Figure 17

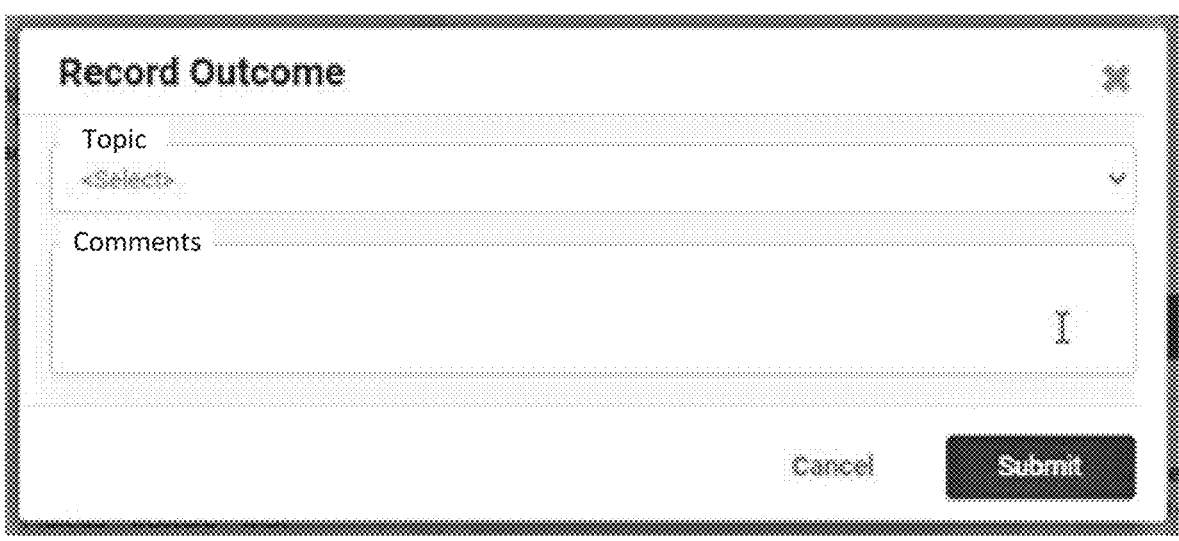
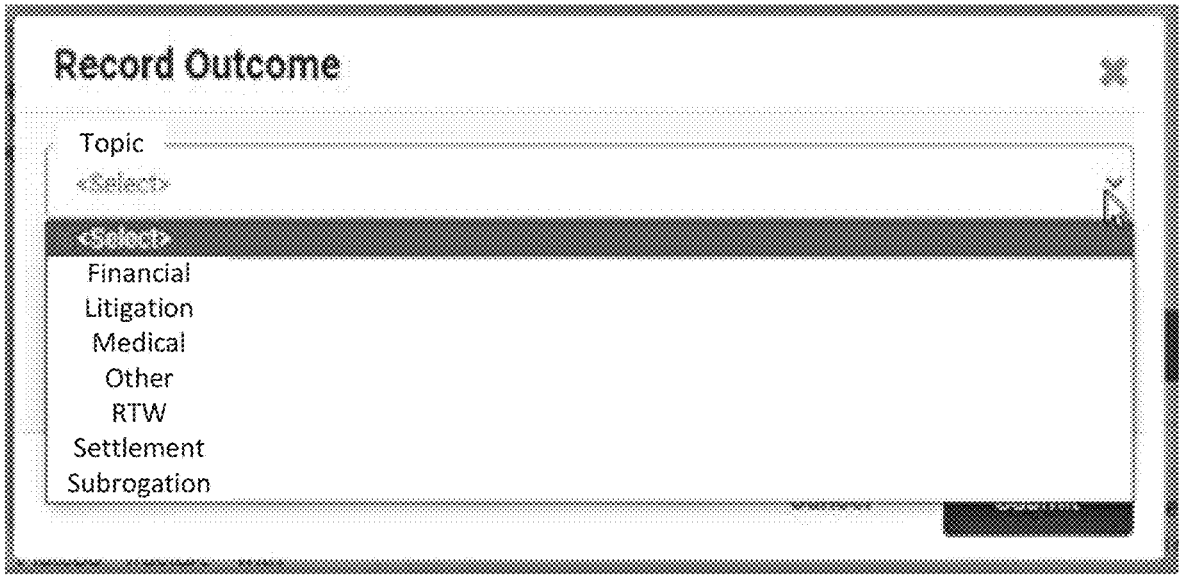
Figure 19G

SYSTEMS AND METHODS FOR CLAIM PROCESSING

CROSS-REFERENCE TO RELATED APPLICATION

The present Application claims priority to U.S. Provisional Patent Application No. 63/251,495, entitled "Systems and Methods for Claim Processing," filed Oct. 1, 2021, which is hereby incorporated by reference in its entirety for all purposes.

TECHNICAL FIELD

This specification describes technologies relating to risk management, particularly relating to processing claims.

BACKGROUND

The complex and time-consuming process of claiming compensation for personal injury or damage to property includes assessment of claims and determination of appropriate settlements involving an increasingly large number of variables and data. Claim processing often entails high operational burdens for risk management providers, including such tasks as registering claims, gathering information, performing investigations, compiling evidence, ensuring that all relevant documents are properly processed and filed, and expediting claim assessment. In addition to these technical and operational challenges, in many cases, claim processing calls for a balance of empathy and advocacy for the claimants, such as injured workers, who need timely, compassionate care in order to regain wellness, return to work, and achieve peace of mind.

Traditional methods for claim processing include manual preparation of files in an often slow and ineffective manner. For instance, studies have shown that a claims adjuster can spend 1000 hours or more each year simply in the preparation and joining of file reviews. Furthermore, much of the information available to claims adjusters and other individuals involved in risk management is outdated, particularly because locating, compiling, manually inputting, and distributing new information can be a painstaking and laborious process. Traditional delays in assessing claims thus prevent immediate care for claimants, increasing delays in return-to-work outcomes as well as incurring additional costs of loss that extend beyond medical-only claims. For instance, the inability for an injured employee to return to work due to lags in claim processing can result in increased isolation and a disruption of the employee's daily routine. This can in turn lengthen the time of full recovery so that the employee can return to full duty in their pre-injury role.

There are many industry challenges associated with returning injured employees back to the workplace. Studies have shown that the longer an injured employee is out of work, the less likely they are to return, with industry statistics reporting that only 50% of employees go back to work after 6 months of lost time and only 5% go back after 1 year. Delays in returning employees to work therefore can result in worsened outcomes for claims closure, higher average incurred costs per claim, and decreased productivity for employers. Comorbidities also compound the complexity of claim processing; these preexisting health conditions, including such factors as obesity, hypertension, smoking and age, may hinder an injured worker's recovery. According to a 2012 National Council of Compensation Insurance (NCCI) report, the share of workers' compensation claims with a comorbidity diagnosis nearly tripled from 2000 to 2009, growing from a share of 2.4 percent to 6.6 percent, and continue to increase. Comorbidity claims are found to incur twice as much medical costs than comparable claims.

Poor or inefficient resolution of worker's compensation and/or liability claims can also result in high administrative and litigation fees, costly mistakes, high dollar thresholds, and potential lawsuits. Failure to identify fraudulent claims can further increase the claim exposure and financial loss of employers and clients.

Given the above background, methods for claim processing, including reducing delays, providing advocacy for claimants, and streamlining claims assessments, are needed in the art.

SUMMARY

Technical solutions (e.g., computing systems, methods, and non-transitory computer readable storage mediums) for addressing the above identified problems with processing claims are provided in the present disclosure. In particular, the present disclosure provides an integrated solution that focuses on compressing traditional delays in claim processing by improving responsiveness, increasing workflow efficiency, and implementing real-time access to critical information through the claim process.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

One aspect of the present disclosure provides a method for dynamically scheduling a claim review (e.g., for an instance of a claim review), at a computer system having a display, one or more processors, and memory storing one or more programs for execution by the one or more processors.

The method includes receiving a request to display an instance of a claim review. The request is generated by a first user in a plurality of users (e.g., an adjuster, a supervisor, an account manager, and/or a risk manager), where each respective user in the plurality of users is associated with a first entity or a second entity (e.g., a risk management service provider, an employer of a claimant, and/or an insurance provider). The instance of the claim review comprises a corresponding plurality of claims, each respective claim in the corresponding plurality of claims corresponding to a claim by a different claimant in a plurality of claimants. Each claim in the corresponding plurality of claims is associated with both the first entity and the second entity.

Responsive to the request, a first customizable template is applied to the instance of the claim review, where the first customizable template specifies (i) an order and (ii) a subset of the corresponding plurality of claims in the instance of the claim review (e.g., a plurality of filters). Each respective claim in the corresponding plurality of claims is accessed, in electronic form, from one or more data stores, to acquire a summary of the respective claim.

A customizable user interface is displayed on the display, the customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Another aspect of the present disclosure provides a method for dynamically scheduling a claim review (e.g., for a respective claim review in a plurality of claim reviews), at a computer system having a display, one or more processors, and memory storing one or more programs for execution by the one or more processors. The method includes, for a respective claim review in a plurality of claim reviews, receiving a request to display an instance of the respective claim review. The request is generated by a first user in a plurality of users (e.g., an adjuster, a supervisor, an account manager, and/or a risk manager), where each respective user in the plurality of users is associated with a first entity or a second entity (e.g., a risk management service provider, an employer of a claimant, and/or an insurance provider). Each respective claim review in the plurality of claim reviews comprises a respective independent set of claims in a plurality of claims, where each respective claim in the plurality of claims corresponds to a respective claimant in a plurality of claimants. Each claim in the plurality of claims is associated with both the first entity and the second entity.

Responsive to the request, a first customizable template is applied to the instance of the respective claim review, where the first customizable template specifies (i) an order and (ii) a subset of the independent set of claims in the instance of the respective claim review. Each respective claim in the respective independent set claims is accessed, in electronic form, from one or more data stores, to acquire a summary of the respective claim.

A customizable user interface is displayed on the display, the customizable user interface comprising (i) a respective completion status for the instance of the respective claim review, (ii) for each respective claim in the respective independent set of claims, the summary of the respective claim, (iii) a first affordance for updating the respective completion status of the instance of the respective claim review, and (iv) a second affordance for updating a respective criterion for the instance of the respective claim review.

Another aspect of the present disclosure provides a method for dynamically scheduling a claim review (e.g., for a plurality of users), at a computer system having a display, one or more processors, and memory storing one or more programs for execution by the one or more processors. The method includes, for each respective user in a plurality of users (e.g., an adjuster, a supervisor, an account manager, and/or a risk manager), receiving a request to display an instance of a claim review. Each respective user in the plurality of users is associated with a first entity or a second entity (e.g., a risk management service provider, an employer of a claimant, and/or an insurance provider). The instance of the claim review comprises a corresponding plurality of claims, each respective claim in the corresponding plurality of claims corresponding to a claim by a different claimant in a plurality of claimants. Each claim in the corresponding plurality of claims is associated with both the first entity and the second entity.

Responsive to the request, a first customizable template is applied to the instance of the claim review, where the first customizable template specifies (i) an order and (ii) a subset of the corresponding plurality of claims in the instance of the claim review. Each respective claim in the corresponding plurality of claims is accessed, in electronic form, from one or more data stores, to acquire a summary of the respective claim.

A customizable user interface is displayed on the display, the customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Yet another aspect of the present disclosure provides a computer system, comprising one or more processors and memory, the memory storing instructions for performing any of the methods disclosed above.

Still another aspect of the present disclosure provides a non-transitory computer-readable medium storing one or more computer programs, executable by a computer, for performing any of the methods disclosed above.

Various embodiments of systems, methods, and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

INCORPORATION BY REFERENCE

All publications, patents, and patent applications mentioned in this specification are herein incorporated by reference in their entireties to the same extent as if each individual publication, patent, or patent application was specifically and individually indicated to be incorporated by reference.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the several views of the drawings.

FIGS. 2A, 2B, and 2C collectively illustrate a flowchart for an example method for dynamically scheduling a claim review in accordance with some embodiments of the present disclosure, in which optional steps are indicated by broken lines.

FIG. 3 illustrates a flowchart for an example method for dynamically scheduling a claim review in accordance with some embodiments of the present disclosure, in which optional steps are indicated by broken lines.

FIG. 4 illustrates a flowchart for an example method for dynamically scheduling a claim review in accordance with some embodiments of the present disclosure, in which optional steps are indicated by broken lines.

FIGS. 10A and 10B collectively illustrate generating an instance of a claim review, in accordance with some embodiments of the present disclosure.

FIG. 12 illustrates obtaining one or more candidate claims and adding the one or more candidate claims to an instance of a claim review, in accordance with some embodiments of the present disclosure.

FIGS. 14A and 14B illustrates updating the completion status of an instance of a claim review, in accordance with some embodiments of the present disclosure.

FIG. 17 illustrates a customizable user interface displaying a historical record for an instance of a claim review, in accordance with some embodiments of the present disclosure.

FIGS. 19A, 19B, 19C, 19D, 19E, 19F, and 19G collectively illustrate a customizable user interface displaying an example expanded summary of a respective claim, in accordance with some embodiments of the present disclosure.

DETAILED DESCRIPTION

Introduction

Figure 1:
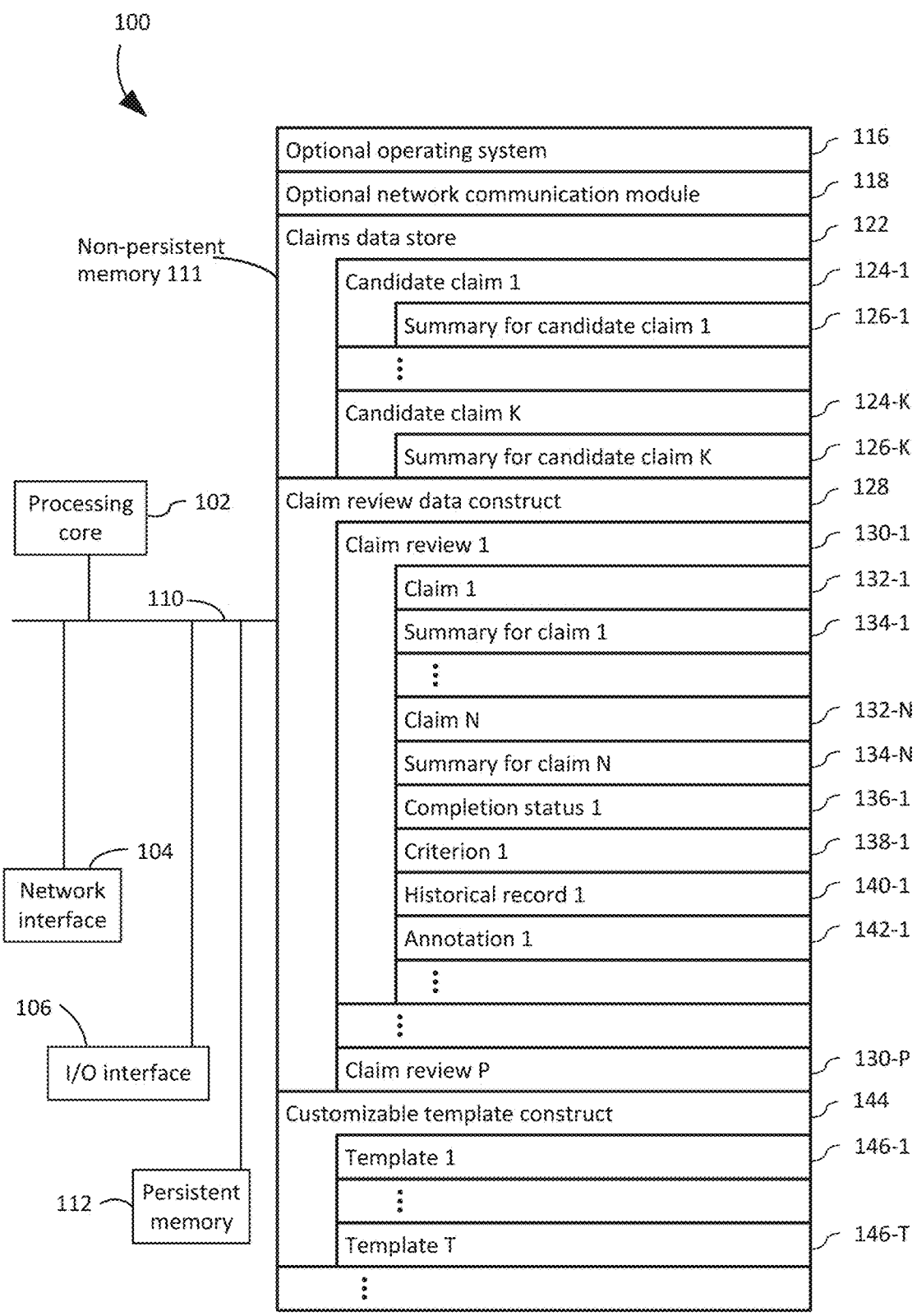
FIG. 1 is an example block diagram illustrating a computing device and related data structures used by the computing device in accordance with some implementations of the present disclosure.
Figure 2B:
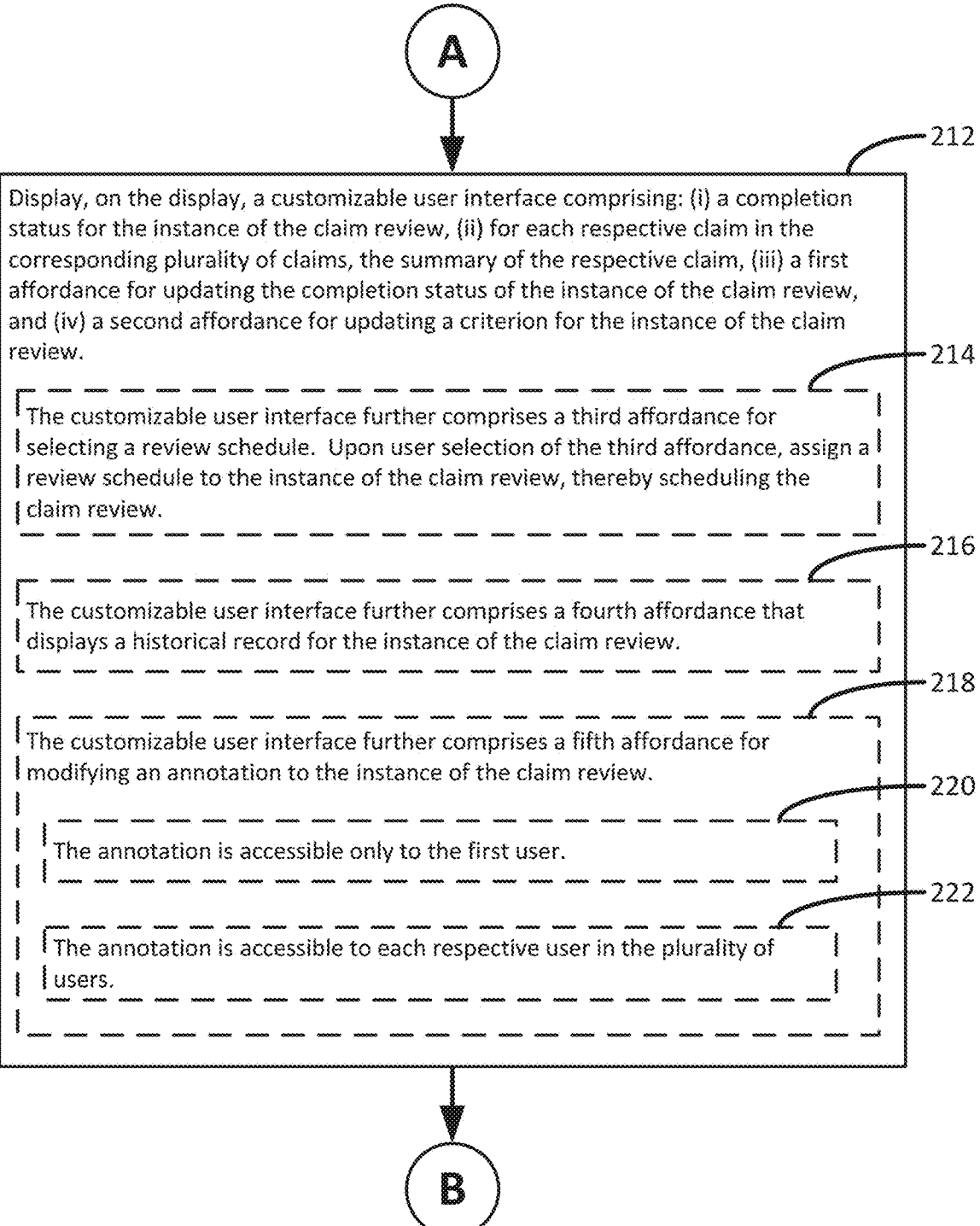

As described above, there are many industry challenges associated with the insurance claims process, including the assessment of claims, determination of appropriate settlements, and, ultimately, claims closure. Delays in claim processing, as are often encountered in traditional methods, can result in greater losses incurred by the claimant and, in the case of worker's compensation claims, the employer in the form of lost productivity and greater costs incurred per claim. These difficulties are compounded by studies reporting that the longer an injured employee is out of work, the less likely they are to return.

Advantageously, the present disclosure solves these and other deficiencies in the art by providing an integrated solution that focuses on compressing traditional delays in claim processing by improving responsiveness, increasing workflow efficiency, and implementing real-time access to critical information through the claim process.

In an example embodiment, the present disclosure offers a simplified approach to a complex process, starting, for instance, with efficient incident reporting and early intervention by an integrated workflow that advocates focused claims management from the very onset of injury and/or damage. The integrated workflow connects users (e.g., claims adjusters, account managers, risk managers, employers, risk management providers, health care providers, legal counsel, nurses, case managers, and/or other interested parties), claims, claim reviews, and/or any additional claims management services in a single database, such that interested parties can access healthcare intervention, reporting, analytics and claims data in real time, reducing costly delays. A customizable user interface (e.g., a dashboard) facilitates the review of pertinent data, including number of visits, duration of care, improvement in function, comorbidities, risk scores and other metrics. These affordances and process steps allow an appropriate user (e.g., an adjuster and/or an account manager) to respond to a claim within moments rather than days, coordinate care for claimants quickly and keep activity transparent for all other users (e.g., claimants, risk managers, and/or employers).

Benefit

As described above, traditional methods for claim processing include manual preparation of files in an often slow and ineffective manner. In particular, manual preparation and compilation of data results in severe bottlenecks prior to claim reviews, during which the pertinent facts related to the case are reviewed by one or more individuals (e.g., users) associated with the claim (e.g., adjusters, account managers, risk managers, legal counsel, nurses, and/or case managers) such that the claim can be settled and eventually closed.

As technology advances, many industries discover increasingly greater intricacies within the data sets of insurance claims, including workers' compensation programs and liability claims. However, as the reach of analytic capabilities broadens, so too does the complexity and scale of information needed to be compiled for a comprehensive and accurate review.

In some traditional claim reviews, a respective claim review document is prepared at least several weeks in advance of a scheduled claim review (e.g., at least 3-6 weeks or more in advance). Conventionally, claim review documents are forms that are manually prepared by claims adjusters, using data from compiled documents and/or telephonic interviews with associated users. Due to the difficulty of compiling large amount of data from several associated parties (e.g., adjusters, account managers, risk managers, legal counsel, nurses, and/or case managers), the information that is reviewed at the scheduled claim review can be different and/or outdated compared to the actual facts of the case.

For instance, changes or updates in the facts of a claim (e.g., changes in status or personnel, upcoming events in the review timeline, potential actions, decisions made, risks, issues, personal reminders, data for presentation to a client or external party, and/or any other relevant items) will not be reflected in the claim review document if they occurred after the claim review document was prepared, but before the scheduled claim review took place. Without a centralized means of compiling all the relevant data generated by any one or more of numerous individuals associated with a claim review, the task of manually changing or updating the claim review record is particularly burdensome. Changes to claim reviews, in some cases, are not logged in a centralized location, but can take the form of hand-written annotations on paper files, solutions or action items decided upon during in-person or telephonic conversations, personnel changes recorded in other departments, and/or other files or information recorded elsewhere and not readily transmitted to the claim review record or to the one or more individuals associated with the claim review.

On the other hand, maintaining an up-to-date record in real time through continual tracking of any and all events in a claim review timeline, including decisions made by or between other parties (e.g., a telephonic interview between an account manager and a risk manager), would involve a significant amount of time and labor for any one individual (e.g., a claims adjuster). Studies have shown that a claims adjuster can already spend 1000 hours or more each year simply in the preparation and joining of file reviews. The additional burden of locating, compiling, and manually inputting all of the various notes, actions, and changes made by multiple users involved in the claims process, as well as preparing and distributing an updated report would add significant additional delays to the claims review process, and thus delay satisfactory outcomes for claimants and/or employees.

Advantageously, the present disclosure provides a real-time, interactive system with dynamic updating, such that the information that is available at the time of the scheduled claim review will be up-to-date on a customizable user interface, in an efficient and automated manner. Specifically, the present disclosure provides systems and methods for dynamically scheduling a claim review, including receiving a request by a user in a plurality of users (e.g., claims adjusters, account managers, risk managers, employers, risk management providers, health care providers, legal counsel, nurses, case managers, and/or other interested parties) to display an instance of a claim review. The visualization of the instance of the claim review includes a summary of each claim in the claim review and can be modulated by specifying an order and subset of the claims via a customizable template (e.g., sortable columns and/or filters). A customizable user interface is displayed, including a completion status for the claim review (e.g., initiated, preparation, complete, submit for review, finalize, and/or schedule), the summary of each claim, a first affordance for updating the completion status, and a second affordance for updating a criterion (e.g., a program discussion topic). In some embodiments, the customizable user interface further comprises additional affordances for selecting a review schedule (e.g., scheduling the claim review), displaying a historical record (e.g., one or more revisions to the claim review by one or more users), modifying an annotation (e.g., private and/or public annotations), modifying the plurality of claims in the claim review (e.g., adding, deleting, editing, updating a status, changing personnel, and/or updating a feature), and/ or expanding a claim summary.

In some embodiments, the information is available on a centralized, cloud-based infrastructure with real-time, live updating capabilities, such that no time is lost in having to recompile and redistribute the information. Rather, the systems and methods provide that the information is updated without the need to reload or refresh the customizable user interface. Thus, in contrast to traditional claim review processes, the information that is reviewed at the scheduled claim review is up-to-date at every point in time prior to, during, and after the claim review meeting.

In some embodiments, any individual (e.g., user) associated with a respective claim review can make changes (e.g., solutions, action items, changes to the record, scheduling, and/or annotations) at any time to the claim review. For instance, the ability to add public or private annotations to a respective claim review allows a respective user to record meeting notes, decisions made between parties, or personal reminders in a manner that is visible to other users or private to the respective user. In this way, the presently disclosed systems and methods improve upon the art by automatically compiling the relevant information for a case in a centralized location, thus reducing the amount of labor and time required for manual compilation and distribution.

In some embodiments, the presently disclosed systems and methods further facilitate the automation, centralization, and logging of each step in the claim review process. For instance, in addition to tracking and/or logging changes to the claim review, a respective user can initiate or launch a claim review, and/or update a completion status of the claim review and escalate the claim review to another user for review (e.g., an adjuster to a supervisor, or an account manager to a risk manager). In another example, in some implementations, the scheduling of a claim review is automated, bypassing the need to manually coordinate dates and times between multiple users and streamlining the review process. Additionally, in some embodiments, the customizable user interface includes a schedule of claim reviews that displays a respective plurality of claim reviews scheduled for a respective date and/or time. A user associated with a respective claim review in the plurality of scheduled claim reviews can therefore determine, in real time, their position in the queue of claim reviews, and can accordingly limit their time spent in claim review meetings only to those meetings relevant to them, reducing the amount of unnecessary meeting time.

In some implementations, the customizable user interface is further used to generate an accessible, easily readable summary screen that can be used for presentation to one or more users (e.g., clients affiliated with an external organization, such as a risk manager representing a claimant's employer). Thus, in addition to significantly increasing the efficiency of the claim review process and saving time and labor, the presently disclosed systems and methods provide transparency to all users and reduces costly information delays.

By integrating multiple aspects involved in managing claims, allowing for real-time actions and updates in the claim review process, facilitating dynamic management (e.g., viewing, editing, updating, and/or performing actions) of the claim review process, and streamlining workflows between multiple users and events, the systems and methods of the present disclosure advantageously increase the efficiency and cost-savings of the claim management process, specifically, the claim review process. For instance, in contrast to studies reporting that claims adjusters spend, on average, over 1000 hours on the preparation and compilation of claim review documents, the systems and methods of the present disclosure can reduce the number of adjuster hours by half. This lowers costs as well as reduces the time for successful resolution of claims. For instance, a faster resolution of a worker's compensation claim can return an injured employee to work by days, weeks, or even months sooner than expected, resulting in lower average incurred costs per claim, significant savings, and increased productivity.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

Definitions

In general, terms used in the claims and the specification are intended to be construed as having the plain meaning understood by a person of ordinary skill in the art. Certain terms are defined below to provide additional clarity. In case of conflict between the plain meaning and the provided definitions, the provided definitions are to be used.

Any terms not directly defined herein shall be understood to have the meanings commonly associated with them as understood within the art of the invention. Certain terms are discussed herein to provide additional guidance to the practitioner in describing the compositions, devices, methods, and the like of aspects of the invention, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents unless it is explicitly stated. Use of examples, including examples of terms, is for illustrative purposes only and does not limit the scope and meaning of the aspects of the invention herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "about" or "approximately" refer to an acceptable error range for a particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. The term "about" or "approximately" can mean within an order of magnitude, within 5-fold, or within 2-fold, of a value. Where particular values are described in the application and claims, unless otherwise stated the term "about" meaning within an acceptable error range for the particular value should be assumed. The term "about" can have the meaning as commonly understood by one of ordinary skill in the art. The term "about" can refer to ±10%. The term "about" can refer to ±5%.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. For example, as used herein, the term "between" used in a range is intended to include the recited endpoints. For example, a number "between X and Y" can be X, Y, or any value from X to Y.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event (" or "in response to detecting (the stated condition or event)," depending on the context.

As used herein, an affordance refers to an operator that can be used to perform a function. For example, affordances can be used for performing actions, including selecting, viewing, reviewing, visualizing, modifying, validating, and/or reporting any of the aspects, embodiments, elements, and/or features disclosed herein. In some embodiments, an affordance is a text-based or graphical hyperlink that expands an existing display and/or opens a new display. In some embodiments, an affordance is a text-based or graphical operator that performs an action. In some embodiments, an affordance is an adjustable interactive feature, such as a slider bar and/or a scroll bar (e.g., for adjusting a value). In some embodiments, an affordance is a clickable interactive feature, such as a button or a hyperlink. In some embodiments, an affordance is a toggle button, a checkbox, a radio button, and/or a dropdown list. In some embodiments, an affordance is a manual entry box (e.g., that accepts a user-inputted alphanumeric character and/or an alphanumeric text string).

As used interchangeably herein, an "adjuster" or "claims adjuster" is an individual that manages a claim for a claimant in a claims management or claims processing workflow. Generally, an adjuster is associated with a first entity (e.g., a risk management provider and/or an insurance company). In some embodiments, an adjuster represents and/or coordinates with a claimant associated with a claim to achieve resolution of the claim. In some embodiments, assignment of an adjuster to a respective claim and/or to a respective claimant is based on a determination of the relevant skills and expertise of the adjuster that align with the needs of the respective claim and/or claimant. An adjuster can make recommendations, monitor the progression of a claim through the claims processing workflow, evaluate the risk of a claim settlement, provide information on the status of a claim, identify possible outcomes or settlements, and/or ensure adherence to claims resolution regulations. An adjuster can develop and recommend strategies for claims resolution. In some embodiments, an adjuster provides information, evaluations, and recommendations to a risk manager and/or another entity other than the first entity (e.g., a client and/or an employer of a claimant) for approval and continuation of the claims processing workflow.

As used herein, an "account manager" is an individual that manages a plurality of claims for a respective account in a claims management or claims processing workflow. Generally, an account manager is associated with a first entity (e.g., a risk management provider and/or an insurance company). In some embodiments, an account manager oversees, for each respective claim in a respective plurality of claims in a respective account, a corresponding adjuster for the respective claim. For example, in some such embodiments, an account manager is responsible for a plurality of claims in the respective account, where each respective claim in the plurality of claims is assigned to a respective adjuster for individualized management. An account manager can perform many of the actions of adjusters in a supervisory capacity, including monitoring the progression of a claim through the claims processing workflow, evaluating risk, approving, finalizing, and/or scheduling claims and claim reviews, and/or ensuring adherence to claims resolution regulations. An account manager can provide information, evaluations, and recommendations to a risk manager and/or another entity other than the first entity (e.g., a client and/or an employer of a claimant) for approval and continuation of the claims processing workflow.

As used herein, a "risk manager" is an individual that manages one or more claims for a respective entity in a claims management or claims processing workflow. Generally, a risk manager is associated with a second entity (e.g., a business, a company, and/or an employer of one or more claimants in a claims processing workflow). The risk manager can be directly or indirectly associated with the second entity. For instance, the risk manager can be employed by the second entity or by a third party administrator that provides claims management services for the second entity. In some embodiments, the risk manager is associated with a second entity (e.g., a business, a company, and/or an employer) that is a client of a first entity (e.g., a risk management provider). In some embodiments, a risk manager represents and/or coordinates with the first entity (e.g., a risk management provider) and the second entity (e.g., an employer) to achieve resolution of the claim. A risk manager can manage internal issues and coordinate logistics for the second entity. In some embodiments, a risk manager receives information, evaluations, and/or recommendations from a first entity and determines whether the information, evaluations, and/or recommendations can be approved for continuation of the claims processing workflow or rejected and returned to the first entity for revision.

The implementations described herein provide various technical solutions for dynamically scheduling a claim review (e.g., for processing claims). Details of implementations are now described in conjunction with the Figures.

Exemplary System Embodiments

FIG. 1 is a block diagram illustrating a visualization system 100 in accordance with some implementations. The device 100 in some implementations includes one or more central processing units (CPU(s)) 102 (also referred to as processors), one or more network interfaces 104, a user interface 106, a non-persistent memory 111, a persistent memory 112, and one or more communication buses 110 for interconnecting these components. The one or more communication buses 110 optionally include circuitry (sometimes called a chipset) that interconnects and controls communications between system components. The non-persistent memory 111 typically includes high-speed random access memory, such as DRAM, SRAM, DDR RAM, ROM, EEPROM, flash memory, whereas the persistent memory 112 typically includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. The persistent memory 112 optionally includes one or more storage devices remotely located from the CPU(s) 102. The persistent memory 112, and the non-volatile memory device(s) within the non-persistent memory 112, comprises non-transitory computer readable storage medium. In some implementations, the non-persistent memory 111 or alternatively the non-transitory computer readable storage medium stores the following programs, modules and data structures, or a subset thereof, sometimes in conjunction with the persistent memory 112:

- an optional operating system 116, which includes procedures for handling various basic system services and for performing hardware dependent tasks;
- an optional network communication module (or instructions) 118 for connecting the visualization system 100 with other devices, or a communication network;
- a claim review data construct 128 including one or more claim reviews 130 (e.g., 130-1, ... 130-P) accessible to a corresponding one or more users, where a respective instance of a respective claim review 130 includes:
  - a corresponding plurality of claims 132 (e.g., 132-1, ... 132-N), each respective claim in the plurality of claims having a corresponding summary 134 (e.g., 134-1, ... 134-N) accessible from one or more data stores,
  - at least a corresponding completion status 136 (e.g., 136-1) for the respective instance of the respective claim review (e.g., where the corresponding completion status is initiated, preparation, complete, submit for review, finalize, and/or schedule),
  - at least a corresponding criterion 138 (e.g., 138-1) for the respective instance of the respective claim review (e.g., where the corresponding criterion includes a program discussion topic),
  - optionally, a historical record 140 (e.g., 140-1) for the respective instance of the respective claim review, where the historical record includes one or more revisions, by the corresponding one or more users, to the instance of the claim review, and
  - optionally, at least an annotation 142 (e.g., 142-1), by the corresponding one or more users, for the respective instance of the respective claim review (e.g., where the annotation is a private annotation or a public annotation);
- a customizable template construct 144 including at least a first customizable template 146 (e.g., 146-1, ... 146-T) that specifies an order and a subset of the corresponding plurality of claims for a respective instance of a respective claim review 130; and
- optionally, a claims data store 122 including a plurality of candidate claims 124 (e.g., 124-1, ... 124-K) and a corresponding summary 126 (e.g., 126-1, ... 126-K) for each respective candidate claim in the plurality of candidate claims, where the corresponding plurality of claims 132 for a respective instance of a respective claim review 130 is obtained by applying a second customizable template 146 to the instance of the claim review, thereby specifying a subset of the plurality of candidate claims to be added to the instance of the claim review.

In some implementations, one or more of the above identified elements are stored in one or more of the previously mentioned memory devices and correspond to a set of instructions for performing a function described above. The above identified modules, data, or programs (e.g., sets of instructions) need not be implemented as separate software programs, procedures, data sets, or modules, and thus various subsets of these modules and data may be combined or otherwise re-arranged in various implementations. In some implementations, the non-persistent memory 111 optionally stores a subset of the modules and data structures identified above. Furthermore, in some embodiments, the memory stores additional modules and data structures not described above. In some embodiments, one or more of the above identified elements is stored in a computer system, other than that of visualization system 100, that is addressable by visualization system 100 so that visualization system 100 may retrieve all or a portion of such data when needed.

Although FIG. 1 depicts a "visualization system 100," the figures are intended more as a functional description of the various features which may be present in computer systems than as a structural schematic of the implementations described herein. In practice, and as recognized by those of ordinary skill in the art, items shown separately could be combined and some items could be separated. Moreover, although FIG. 1 depicts certain data and modules in non-persistent memory 111, some or all of these data and modules may be in persistent memory 112.

Specific Embodiments of the Disclosure

While a system in accordance with the present disclosure has been disclosed with reference to FIG. 1, a method 200 for dynamically scheduling a claim review in accordance with the present disclosure is now detailed with reference to FIGS. 2A-C and FIGS. 3-21.

Referring to Block 202, the method includes receiving a request to display an instance of a claim review. The request is generated by a first user in a plurality of users. Each respective user in the plurality of users is associated with a first entity or a second entity.

The instance of the claim review comprises a corresponding plurality of claims. Each respective claim in the corresponding plurality of claims corresponds to a claim by a different claimant in a plurality of claimants, and each claim in the corresponding plurality of claims is associated with both the first entity and the second entity. In some embodiments, the corresponding plurality of claims comprises between 2 claims and 5,000 claims, between 2 claims and 1,000 claims, between 2 claims and 500 claims, between 2 claims and 50 claims, between 2 claims and 25 claims, between 2 claims and 15 claims, between 2 claims and 10 claims, between 2 claims and 5 claims, between 5 claims and 5,000 claims, between 5 claims and 1,000 claims, between 5 claims and 500 claims, between 5 claims and 50 claims, between 5 claims and 25 claims, between 5 claims and 15 claims, between 5 claims and 10 claims, between 10 claims and 5,000 claims, between 10 claims and 1,000 claims, between 10 claims and 500 claims, between 10 claims and 50 claims, between 10 claims and 25 claims, between 10 claims and 15 claims, between 20 claims and 5,000 claims, between 20 claims and 1,000 claims, between 20 claims and 500 claims, between 20 claims and 50 claims, between 20 claims and 25 claims, between 150 claims and 5,000 claims, between 150 claims and 1,000 claims, or between 150 claims and 500 claims. In some embodiments, the corresponding plurality of claims comprises 2 claims or more, 5 claims or more, 10 claims or more, 15 claims or more, 20 claims or more, 25 claims or more, 50 claims or more, 100 claims or more, 500 claims or more, or 1,000 claims or more.

Users and Entities.

In some embodiments, the plurality of users comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, or at least 5000 users. In some embodiments, the plurality of users comprises no more than 10,000, no more than 5000, no more than 2000, no more than 1000, no more than 500, no more than 200, no more than 100, no more than 50, no more than 40, no more than 30, no more than 20, or no more than 10 users. In some embodiments, the plurality of users comprises from 2 to 10, from 5 to 30, from 3 to 8, from 10 to 50, from 20 to 500, from 100 to 2000, or from 200 to 10,000 users. In some embodiments, the plurality of users falls within another range starting no lower than 2 users and ending no higher than 10,000 users.

In some embodiments, any one or more users in the plurality of users can generate a request to display an instance of a claim review. In some such embodiments, any one or more users in the plurality of users can access (e.g., display, view, create, edit, and/or perform actions on) an instance of a claim review.

Figure 5:
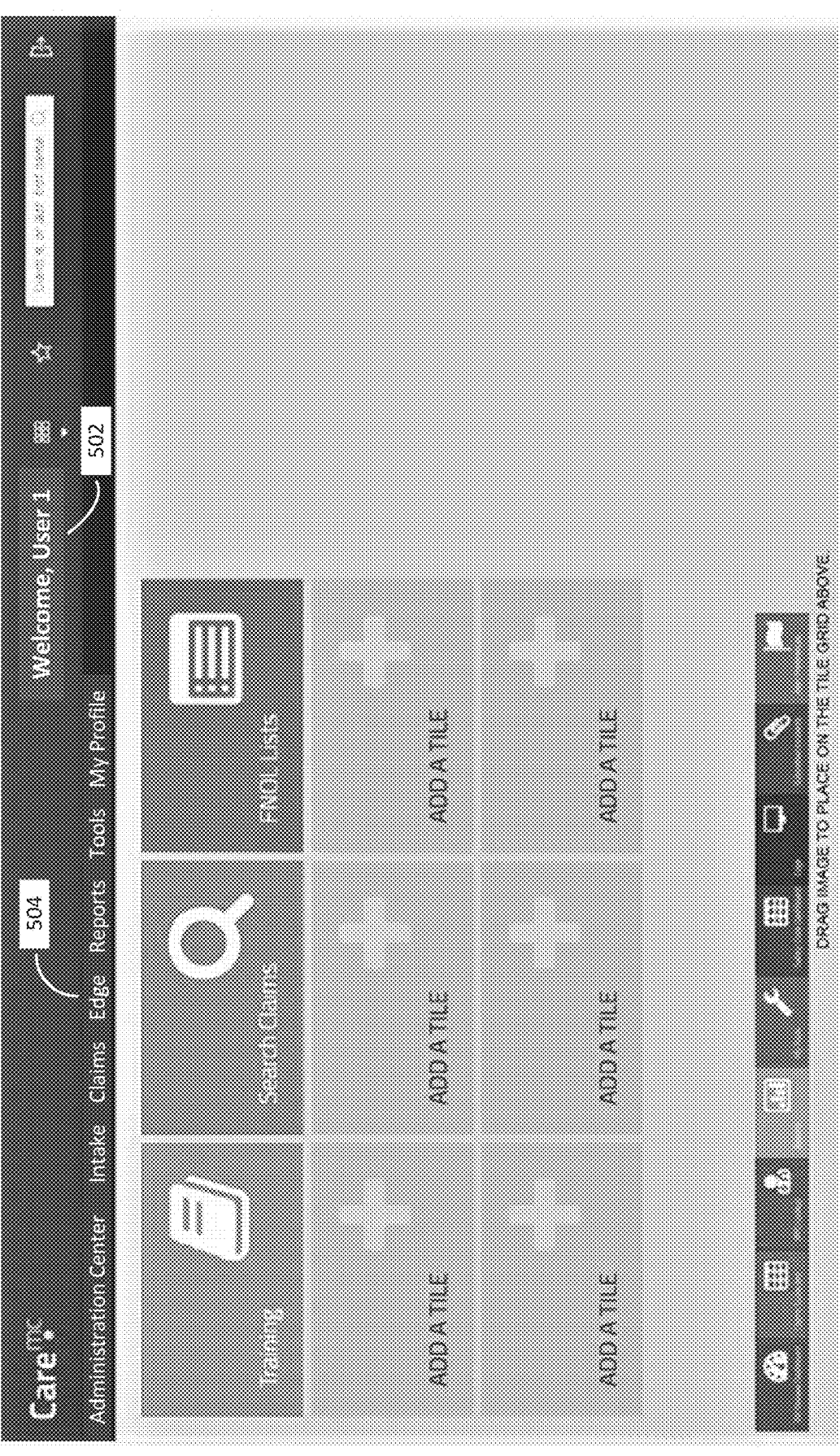
FIG. 5 illustrates a customizable user interface for dynamically scheduling a claim review, for a first user in a plurality of users, in accordance with some embodiments of the present disclosure.

In some embodiments, the plurality of users comprises at least a first user associated with a first entity and at least a second user associated with a second entity. For instance, in an example embodiment, user 1 (502) is associated with the first entity, as illustrated in FIG. 5, and user 3 (2102) is associated with the second entity, as illustrated in FIG. 21A. In some embodiments, the plurality of users comprises a first subset of users associated with a first entity and a second subset of users associated with a second entity. For instance, in an example embodiment, a first subset of users associated with the first entity includes user 1 (502) and user 2 (2002) in FIGS. 5 and 20A, and a second subset of users associated with the second entity includes user 3 (2102) in FIG. 21A.

Figure 20A:
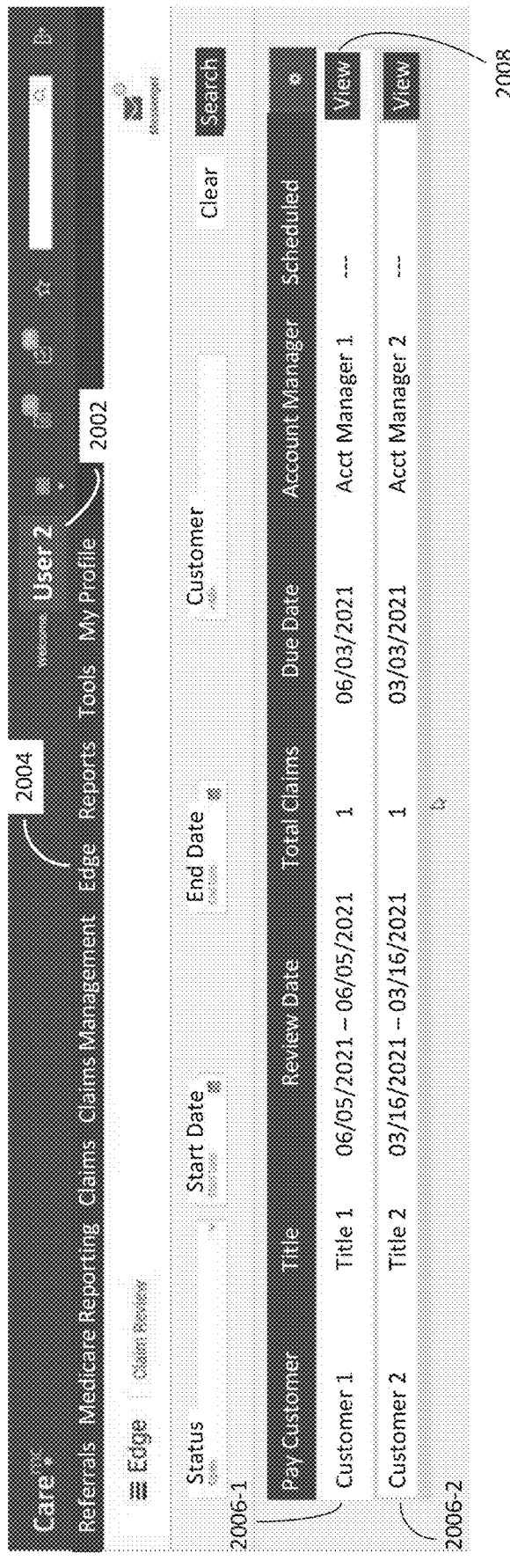
FIGS. 20A and 20B collectively illustrate a customizable user interface for dynamically scheduling a claim review, for a respective user in a plurality of users, in accordance with some embodiments of the present disclosure.
Figure 21A:
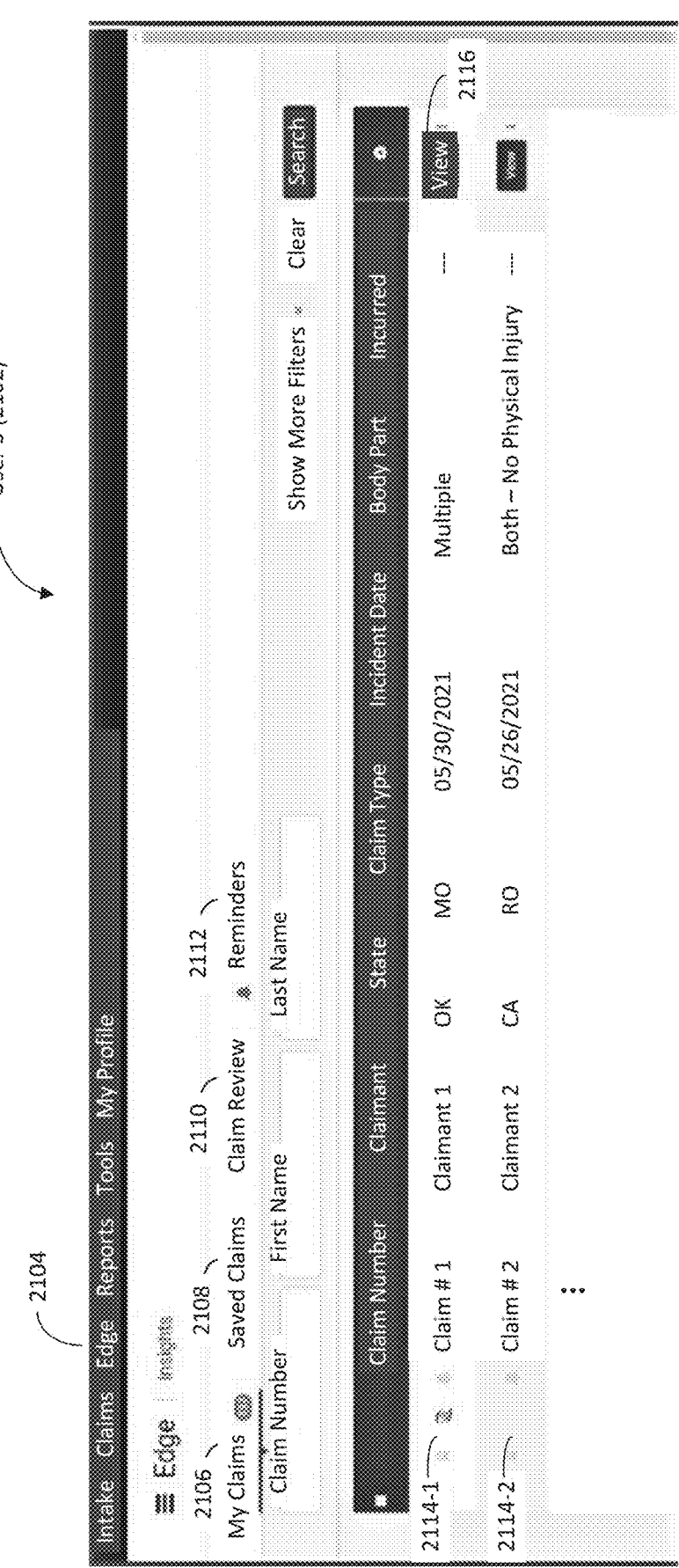
FIGS. 21A and 21B collectively illustrate a customizable user interface for dynamically scheduling a claim review, for a respective user in a plurality of users, in accordance with some embodiments of the present disclosure.

In some embodiments, the first user (e.g., user 1 (502) in FIG. 5, user 2 (2002) in FIG. 20A, and/or user 3 (2102) in FIG. 21A) is associated with the first entity. In some embodiments, the first user (e.g., e.g., user 1 (502) in FIG. 5, user 2 (2002) in FIG. 20A, and/or user 3 (2102) in FIG. 21A) is associated with the second entity.

In some embodiments, the plurality of users comprises, for each respective entity in a plurality of entities, a respective subset of users, in the plurality of users, associated with the respective entity. For example, in some embodiments, the plurality of entities comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, or at least 1000 entities. In some embodiments, the plurality of entities comprises no more than 2000, no more than 1000, no more than 500, no more than 200, no more than 100, no more than 50, no more than 40, no more than 30, no more than 20, or no more than 10 entities. In some embodiments, the plurality of entities comprises from 2 to 10, from 5 to 30, from 2 to 6, from 10 to 50, from 20 to 500, or from 100 to 2000 entities. In some embodiments, the plurality of entities falls within another range starting no lower than 2 entities and ending no higher than 2000 entities.

In some embodiments, for each respective entity in a plurality of entities, the respective subset of users, in the plurality of users, associated with the respective entity comprises at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, or at least 100 users. In some embodiments, the respective subset of users comprises no more than 200, no more than 100, no more than 50, no more than 40, no more than 30, no more than 20, or no more than 10 users. In some embodiments, the respective subset of users comprises from 1 to 10, from 5 to 30, from 1 to 5, from 10 to 50, from 20 to 200, or from 100 to 200 users. In some embodiments, the respective subset of users falls within another range starting no lower than 2 users and ending no higher than 200 users.

In some embodiments, an entity is an employer, a business, a corporation, an insurance company, a risk management provider, a third party administrator, a government agency, a health care provider, a hospital, an institution, and/or any other organization comprising one or more individuals involved in a claims management or claims processing workflow.

In some embodiments, the first entity is a risk management provider. In some embodiments, a second entity is an employer. In some embodiments, the second entity is an employer of one or more claimants in the plurality of claimants associated with one or more claims in the corresponding plurality of claims in the instance of the claim review. In some embodiments, the first entity is a risk management provider and the second entity is an employer of one or more claimants in the plurality of claimants associated with one or more claims in the corresponding plurality of claims in the instance of the claim review. In some embodiments, the first entity is a risk management provider and the second entity is a client of the risk management provider.

Referring to Block 204, in some embodiments, the first user is selected from the group consisting of an adjuster, a supervisor, account manager, and/or risk manager. For instance, as illustrated in FIG. 5, in some embodiments, the first user 502 is an account manager. In some embodiments, as illustrated in FIG. 20A, the first user 2002 is an adjuster. In some embodiments, as illustrated in FIG. 21A, the first user 2102 is a risk manager. See, for example, Definitions: "Adjuster," "Account Manager," and "Risk Manager," above.

In some embodiments, a respective user in the plurality of users is an adjuster, a supervisor, an account manager, a risk manager, a claimant, an employer, an individual associated with a risk management provider, an individual associated with a health care provider, a legal counsel, a nurse and/or medical professional, a case manager, a field investigator, a subrogation specialist, and/or other interested party involved in a claims management or claims processing workflow.

In some embodiments, the receiving a request to display an instance of a claim review includes receiving log-in credentials for the first user, displaying, on the display, an index of claim reviews for the first user, and detecting selection of a respective claim review from the index. In some embodiments, the log-in credentials are for an entity (e.g., a first entity and/or a second entity). In some embodiments, the log-in credentials are for an individual (e.g., an adjuster, a supervisor, an account manager, a risk manager, a claimant, an employer, an individual associated with a risk management provider, an individual associated with a health care provider, a legal counsel, a nurse and/or medical professional, a case manager, a field investigator, a subrogation specialist, and/or other interested party involved in a claims management or claims processing workflow).

In some embodiments, the receiving the request includes receiving log-in credentials for a plurality of users. In some embodiments, a plurality of requests can be received simultaneously from a plurality of users. In some embodiments, only one user at a time can submit a request by entering log-in credentials. In some embodiments, log-in credentials include a username and/or a password. In some embodiments, log-in credentials include an email address.

In some embodiments, the instance of the claim review is accessed by the first user at a respective first remote device (e.g., a computer, a smartphone, and/or a personal electronic device). In some embodiment, the instance of the claim review is accessed, by each respective user in the plurality of users, at a respective remote device for the respective user (e.g., a computer, a smartphone, and/or a personal electronic device).

Claims.

As described above, referring again to Block 202, the instance of the claim review comprises a corresponding plurality of claims, where each respective claim in the corresponding plurality of claims corresponds to a claim by a different claimant in a plurality of claimants, and each claim in the corresponding plurality of claims is associated with both the first entity and the second entity.

In some embodiments, the claim type of each claim in the corresponding plurality of claims is worker's compensation or liability. For instance, in some embodiments, the claim type of a respective claim in the corresponding plurality of claims is worker's compensation, including, but not limited to, medical, health, and/or bodily injury claims. In some embodiments, the claim type of a respective claim in the corresponding plurality of claims is liability, including, but not limited to, general liability, auto liability (e.g., auto indemnity for truck fleets, school buses, construction vehicles, and/or corporate transportation), and/or property liability (e.g., property damage).

In some embodiments, a respective claim in the corresponding plurality of claims is complex (e.g., severe bodily injury). In some embodiments, a respective claim in the corresponding plurality of claims is non-complex (e.g., property damage and/or minor bodily injury).

In some embodiments, the corresponding plurality of claims for the instance of the claim review comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 30,000, or at least 40,000 claims. In some embodiments, the corresponding plurality of claims for the instance of the claim review comprises no more than 100,000, no more than 50,000, no more than 10,000, no more than 5000, no more than 2000, no more than 1000, no more than 500, no more than 200, no more than 100, no more than 50, no more than 40, no more than 30, no more than 20, or no more than 10 claims. In some embodiments, the corresponding plurality of claims for the instance of the claim review comprises from 2 to 10, from 5 to 30, from 10 to 50, from 20 to 500, from 100 to 2000, from 200 to 5000, from 1000 to 10,000, or from 8000 to 50,000 claims. In some embodiments, the corresponding plurality of claims for the instance of the claim review falls within another range starting no lower than 2 claims and ending no higher than 100,000 claims.

In some embodiments, the plurality of claimants comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 30,000, at least 40,000, or at least 50,000 claimants. In some embodiments, the plurality of claimants comprises no more than 100,000, no more than 50,000, no more than 10,000, no more than 5000, no more than 2000, no more than 1000, no more than 500, no more than 200, no more than 100, no more than 50, no more than 40, no more than 30, no more than 20, or no more than 10 claimants. In some embodiments, the plurality of claimants comprises from 2 to 10, from 5 to 30, from 10 to 50, from 20 to 500, from 100 to 2000, from 200 to 5000, from 1000 to 10,000, or from 8000 to 50,000 claimants. In some embodiments, the plurality of claimants falls within another range starting no lower than 2 claimants and ending no higher than 100,000 claimants.

In some embodiments, a respective claim in the corresponding plurality of claims corresponds to a claim by one or more claimants in a plurality of claimants. For instance, in some embodiments, a respective claim in the corresponding plurality of claims corresponds to a claim by at least 1, at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, or at least 100 claimants in the plurality of claimants. In some embodiments, a respective claim in the corresponding plurality of claims corresponds to a claim by no more than 200, no more than 100, no more than 50, no more than 40, no more than 30, no more than 20, or no more than 10 claimants in the plurality of claimants. In some embodiments, a respective claim in the corresponding plurality of claims corresponds to a claim by from 2 to 10, from 5 to 30, from 10 to 50, from 20 to 100, or from 100 to 200 claimants. In some embodiments, a respective claim in the corresponding plurality of claims corresponds to a claim by a plurality of claimants that falls within another range starting no lower than 2 claimants and ending no higher than 200 claimants.

In some embodiments, each claimant in the plurality of claimants is associated with a corresponding one or more claims. For instance, in some embodiments, a respective claimant in the plurality of claimants is associated with at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 30,000, or at least 40,000 claims. In some embodiments, a respective claimant in the plurality of claimants is associated with no more than 100,000, no more than 50,000, no more than 10,000, no more than 5000, no more than 2000, no more than 1000, no more than 500, no more than 200, no more than 100, no more than 50, no more than 40, no more than 30, no more than 20, or no more than 10 claims. In some embodiments, a respective claimant in the plurality of claimants is associated with from 2 to 10, from 5 to 30, from 10 to 50, from 20 to 500, from 100 to 2000, from 200 to 5000, from 1000 to 10,000, or from 8000 to 50,000 claims. In some embodiments, a respective claimant in the plurality of claimants is associated with a corresponding one or more claims that falls within another range starting no lower than 2 claims and ending no higher than 100,000 claims.

In some embodiments, each claim in the corresponding plurality of claims for the instance of the claim review is associated with at least the first user. For instance, in some embodiments, each claim in the corresponding plurality of claims for the instance of the claim review is associated with (e.g., assigned to) at least an adjuster, a supervisor, an account manager, and/or a risk manager. In some embodiments, each claim in the corresponding plurality of claims for the instance of the claim review is associated with a set of users in the plurality of users. For example, in some embodiments, a respective claim in the corresponding plurality of claims is associated with (e.g., assigned to) at least one adjuster. In some embodiments, the respective claim is further associated with (e.g., assigned to) at least one supervisor that supervises the at least one adjuster. In some embodiments, the respective claim is further associated with (e.g., assigned to) at least one account manager that manages the instance of the claim review including the respective claim. In some embodiments, the respective claim is further associated with (e.g., assigned to) at least one risk manager.

In some embodiments, each claim in the corresponding plurality of claims for the instance of the claim review is associated with at least 1, at least 2, at least 3, at least 4, at least 5, at least 6, at least 7, at least 8, at least 9, at least 10, at least 15, at least 20, at least 25, at least 30, at least 35, at least 40, at least 45, or at least 50 users. In some embodiments, each claim in the corresponding plurality of claims for the instance of the claim review is associated with no more than 100, no more than 50, no more than 40, no more than 30, no more than 20, or no more than 10 users. In some embodiments, each claim in the corresponding plurality of claims for the instance of the claim review is associated with from 1 to 10, from 5 to 30, from 1 to 5, from 10 to 50, from 20 to 100, or from 10 to 100 users. In some embodiments, each claim in the corresponding plurality of claims for the instance of the claim review is associated with a set of users that falls within another range starting no lower than 1 user and ending no higher than 100 users.

In some embodiments, each claim in the corresponding plurality of claims is associated with both the first entity and the second entity. For instance, in the above example, the at least one adjuster, at least one supervisor, and at least one account manager associated with the respective claim in the corresponding plurality of claims are associated with the first entity (e.g., a risk management provider), and the at least one risk manager is associated with the second entity (e.g., an employer of a respective one or more claimants for the respective claim).

In some embodiments, each respective claim in the corresponding plurality of claims includes a respective preparation status that indicates whether the respective claim has been prepared for review. In some embodiments, the preparation status is "pending," "ready," and/or "complete." In some embodiments, the respective completion status is "ready" or "complete" when the respective claim has been prepared for review by an adjuster. In some embodiments, each respective claim in the corresponding plurality of claims includes a respective preparation due date that indicates the date by which preparation of the respective claim for review is to be completed.

In some embodiments, each respective claim in the corresponding plurality of claims includes a respective availability status that indicates whether the respective claim is currently available for processing or has been previously processed. For instance, in some embodiments, each respective claim in the corresponding plurality of claims is "open" or "closed."

Candidate Claims.

In some embodiments, the corresponding plurality of claims for the instance of the claim review is selected from a plurality of candidate claims.

In some embodiments, the plurality of candidate claims comprises at least as many claims as the corresponding plurality of claims for the instance of the claim review.

In some embodiments, the plurality of candidate claims comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, at least 10,000, at least 20,000, at least 30,000, at least 40,000, at least 50,000, at least 60,000, at least 70,000, at least 80,000, at least 90,000, or at least 100,000 candidate claims. In some embodiments, the plurality of candidate claims comprises no more than 500,000, no more than 100,000, no more than 50,000, no more than 10,000, no more than 5000, no more than 2000, no more than 1000, no more than 500, no more than 200, no more than 100, no more than 50, no more than 40, no more than 30, no more than 20, or no more than 10 candidate claims. In some embodiments, the plurality of candidate claims comprises from 2 to 10, from 5 to 30, from 10 to 50, from 20 to 500, from 100 to 2000, from 200 to 5000, from 1000 to 10,000, or from 8000 to 100,000 candidate claims. In some embodiments, the plurality of candidate claims falls within another range starting no lower than 2 candidate claims and ending no higher than 500,000 candidate claims.

In some embodiments, each candidate claim in the plurality of candidate claims comprises any of the embodiments disclosed herein as for a respective claim in the corresponding plurality of claims for a respective instance of a claim review. In some embodiments, a respective candidate claim in the plurality of candidate claims comprises any of the embodiments disclosed herein as for a respective claim in the corresponding plurality of claims for a respective instance of a claim review. For instance, in some embodiments, a respective candidate claim in the plurality of candidate claims is by a respective one or more claimants in a plurality of claimants, as described above with respect to the claims in the corresponding plurality of claims for a respective instance of a claim review. In some embodiments, each claimant in the plurality of claimants is associated with a corresponding one or more candidate claims in the plurality of candidate claims, as described above with respect to the claims in the corresponding plurality of claims for a respective instance of a claim review.

In some embodiments, the plurality of candidate claims includes additional claims not included in the corresponding plurality of claims for the instance of the claim review.

In some embodiments, each candidate claim in the plurality of candidate claims is associated with the first user. In some embodiments, the plurality of candidate claims includes additional claims, other than the corresponding plurality of claims selected for the instance of the claim review, where the additional claims are not associated with the first user.

In some embodiments, each candidate claim in the plurality of candidate claims is associated with both the first entity and the second entity. In some embodiments, the plurality of candidate claims includes additional claims, other than the corresponding plurality of claims selected for the instance of the claim review, where the additional claims are not associated with the first entity, the second entity, or both.

Thus, for instance, the selection of the corresponding plurality of claims for the instance of the claim review comprises, in some embodiments, selecting a set of candidate claims from the plurality of candidate claims, where each respective candidate claim in the set of candidate claims meets one or more criteria for the instance of the claim review. In some embodiments, the one or more criteria for the instance of the claim review includes an association with the first user, an association with the first entity and/or an association with the second entity. For instance, in some embodiments, the set of candidate claims is selected from the plurality of candidate claims when each respective candidate claim in the set of candidate claims is, at least, associated with the first user, associated with the first entity, and associated with the second entity.

In some embodiments, the one or more criteria for the instance of the claim review includes a filtering criterion. In some implementations, the filtering criterion is a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars). For example, in some embodiments, the selection of the corresponding plurality of claims for the instance of the claim review comprises selecting a set of candidate claims from the plurality of candidate claims, where each respective candidate claim in the set of candidate claims is of a respective claim type. As another example, in some embodiments, the selection of the corresponding plurality of claims for the instance of the claim review comprises selecting a set of candidate claims from the plurality of candidate claims, where each respective candidate claim in the set of candidate claims is for a respective claimant.

Any substitutions, modifications, additions, deletions, and/or combinations of any criteria for the instance of the claim review to be used in the selection of the set of candidate claims is contemplated in the present disclosure, as will be apparent to one skilled in the art. In some such embodiments, it is desirable to select candidate claims having one or more criteria of interest for inclusion in the instance of the claim review. For instance, it can be desirable to select a set of candidate claims for an instance of a claim review from a large number and/or variety of candidate claims, such as where a respective entity (e.g., a client of a risk management provider, a business, and/or an employer) has a large number of claims (e.g., at least 100, at least 1000, or at least 10,000 claims) and/or many different types of claims (e.g., worker's compensation and liability claims) to be processed. In some such embodiments, the large number and/or the different nature of the claims are difficult to review together in an efficient manner. Thus, selection of the set of candidate claims for the instance of the claim review, based on the one or more criteria for the instance of the claim review, can improve the efficiency of the claim review process, and therefore the claim processing workflow as a whole.

An example of a plurality of candidate claims is illustrated in FIGS. 6 and 7A-D. For instance, in some embodiments, the plurality of candidate claims is displayed for a respective user 502 (e.g., "User 1") on a customizable user interface, such as customizable user interface 504. The customizable user interface 504 includes a candidate claims affordance 602 (e.g., "My Claims") that displays, on the display, the plurality of candidate claims 610 (e.g., 610-1, 610-2, 610-3, 610-4 . . . ) for the respective user 502. The plurality of candidate claims 610 includes an index of candidate claims associated with (e.g., assigned to) the respective user, including any open, closed, pending, ready, and/or complete candidate claims. For each respective candidate claim 610 in the plurality of candidate claims, a summary of the respective candidate claim is displayed, where the summary includes a corresponding data entry for one or more features of the respective candidate claim (e.g., "Claim number," "Claimant," "State," "Claim Type," "Incident Date," "Incurred," "Adjuster," and/or "Work Status"). In some embodiments, the customizable user interface further comprises a viewing affordance 614 for expanding the summary of each respective candidate claim in the plurality of candidate claims, where the expanding the summary of the respective candidate claim comprises displaying, on the display, additional features of the respective candidate claim. In some embodiments, the one or more features include any of the features disclosed herein. For instance, claim summaries contemplated for use for the plurality of candidate claims are described in further detail in the present disclosure (see, for example, the section entitled "Claim Summaries," below).

Figure 6:
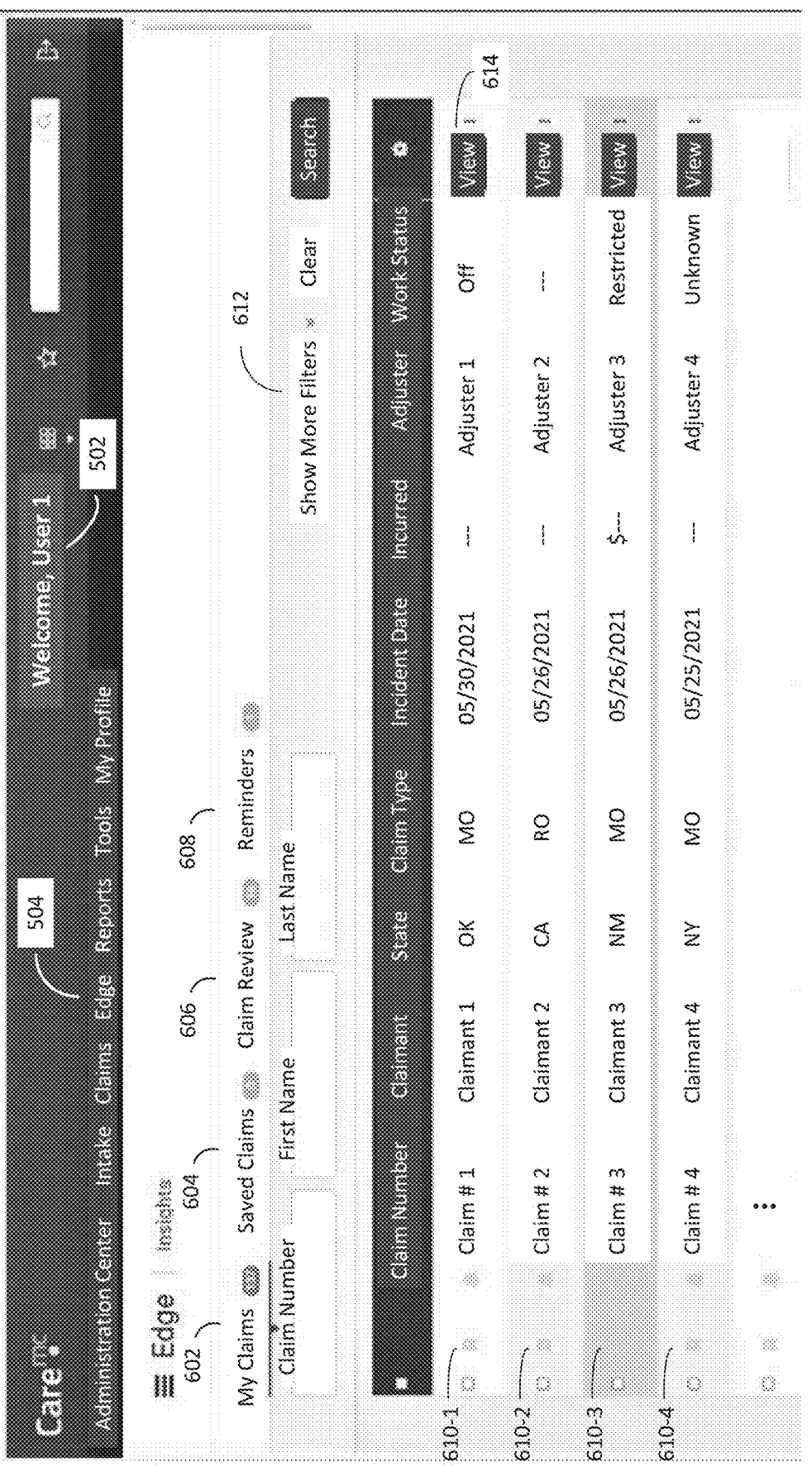
FIG. 6 illustrates a customizable user interface displaying a plurality of candidate claims, in accordance with some embodiments of the present disclosure.

In some embodiments, the plurality of candidate claims 610 are displayed as a list or an index. Referring to FIG. 1, in some embodiments, the plurality of candidate claims 610 are stored in electronic form in a data store, such as claims data store 122, in a system 100. In some such embodiments, each respective candidate claim 124 in claims data store 122 comprises a corresponding summary for the candidate claim 126. For example, FIG. 6 illustrates a plurality of candidate claims 610 (610-1, 610-2, 610-3, 610-4 . . . ) in an index of claims provided by candidate claims affordance 602, where each respective candidate claim comprises a corresponding summary.

In some embodiments, the selection of the corresponding plurality of claims for the instance of the claim review comprises sorting the plurality of candidate claims. In some embodiments, the selection of the corresponding plurality of claims for the instance of the claim review comprises filtering the plurality of candidate claims. For instance, as described above, in some embodiments, the selection of the corresponding plurality of claims for the instance of the claim review comprises, in some embodiments, selecting a set of candidate claims from the plurality of candidate claims based on one or more filtering criteria. For example, as described above, the one or more filtering criteria includes a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars). In some embodiments, the sorting and/or the filtering the plurality of candidate claims is performed based on the one or more filtering criteria.

Figure 7A:
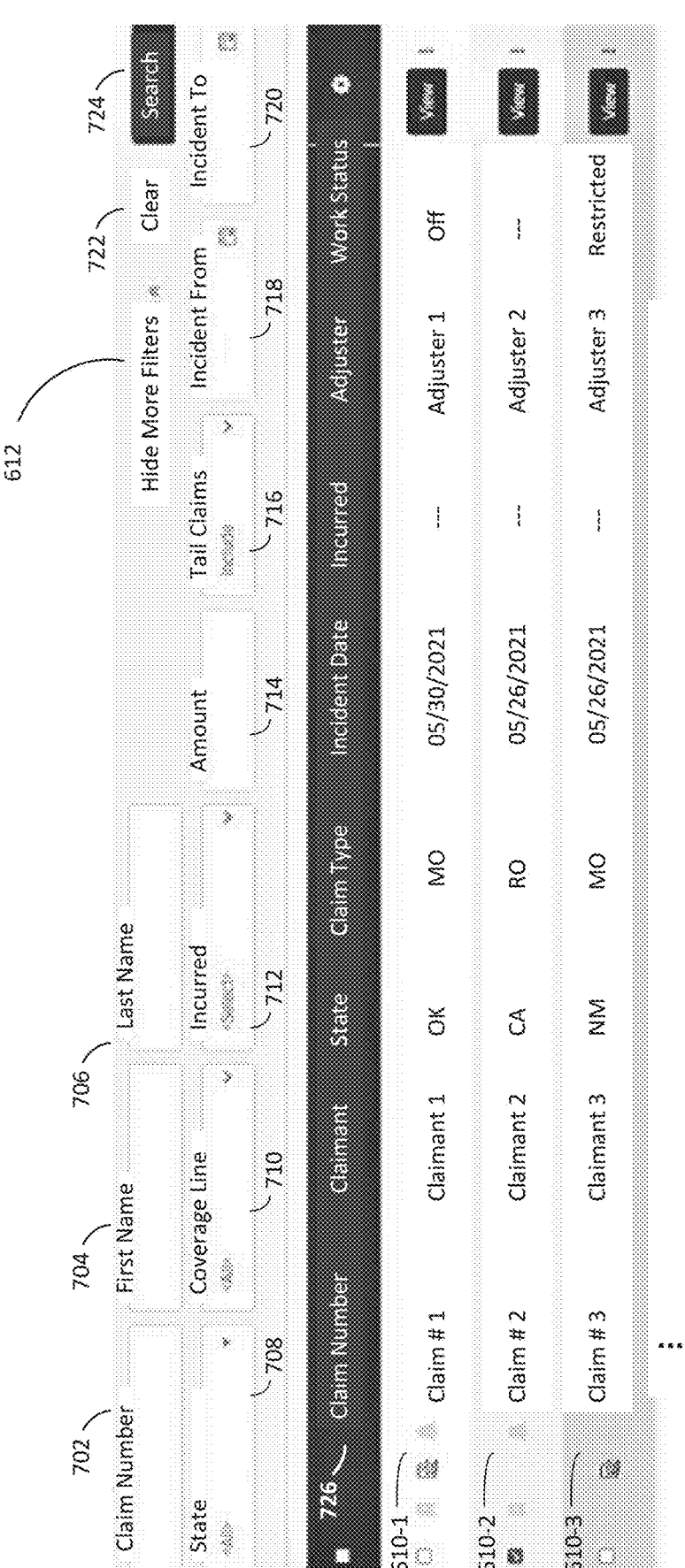
FIGS. 7A, 7B, 7C, and 7D collectively illustrate specifying an order and/or a subset of a plurality of candidate claims based on a filtering criterion, in accordance with some embodiments of the present disclosure.

In some embodiments, the sorting and/or the filtering the plurality of candidate claims based on the one or more filtering criteria specifies an order and/or a subset of the plurality of candidate claims, as illustrated in FIGS. 7A-D. In some embodiments, the customizable user interface 504 includes a filtering affordance 612 (e.g., "Show More Filters") for displaying, on the display, the one or more filtering criteria. Selection of the filtering affordance 612 displays, on the display, for each respective filtering criterion in the one or more filtering criteria, a data entry affordance for specifying a data entry for the respective filtering criterion. For instance, as illustrated in FIG. 7A, selection of the filtering affordance displays a data entry affordance for claim number 702, first name 704, last name 706, state 708, coverage line 710, incurred 712, amount 714, tail claims 716, incident from date 718, and incident to date 720. In some embodiments, selection of the filtering affordance 612 a second time removes, from the display, the one or more filtering criteria (e.g., "Hide More Filters").

Figure 7B:
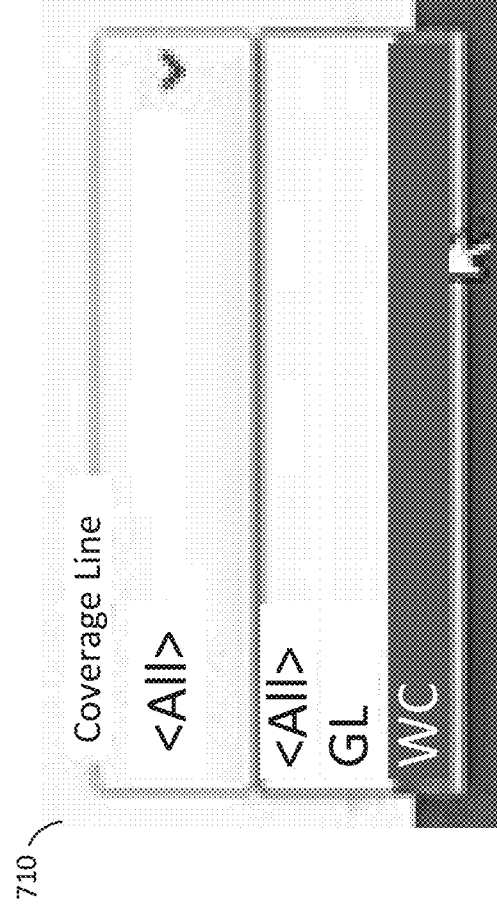
Figure 7C:
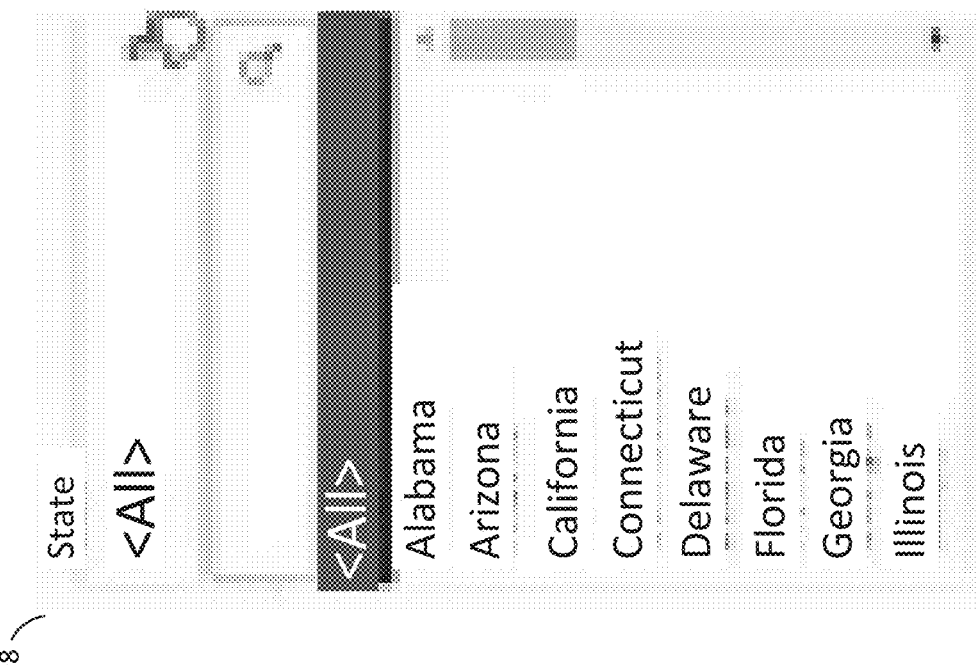

In some embodiments, the data entry affordance for specifying a data entry for the respective filtering criterion is a manual entry of an alphanumeric string (e.g., a search box). In some embodiments, the data entry affordance for specifying a data entry for the respective filtering criterion is a dropdown list of one or more options for the respective filtering criterion. For example, FIGS. 7B and 7C illustrate specifying a data entry using a dropdown list for a coverage line filter 710 (e.g., general liability "GL" and/or worker's compensation "WC") and a state filter 708 (e.g., U.S. state and/or jurisdiction). In some embodiments, the customizable user interface 504 further includes an affordance for clearing all data entries for filtering criteria 722 (e.g., "Clear") and/or for applying, to the plurality of candidate claims, the one or more filtering criteria to specify the order and/or the subset of the plurality of candidate claims.

Figure 7D:
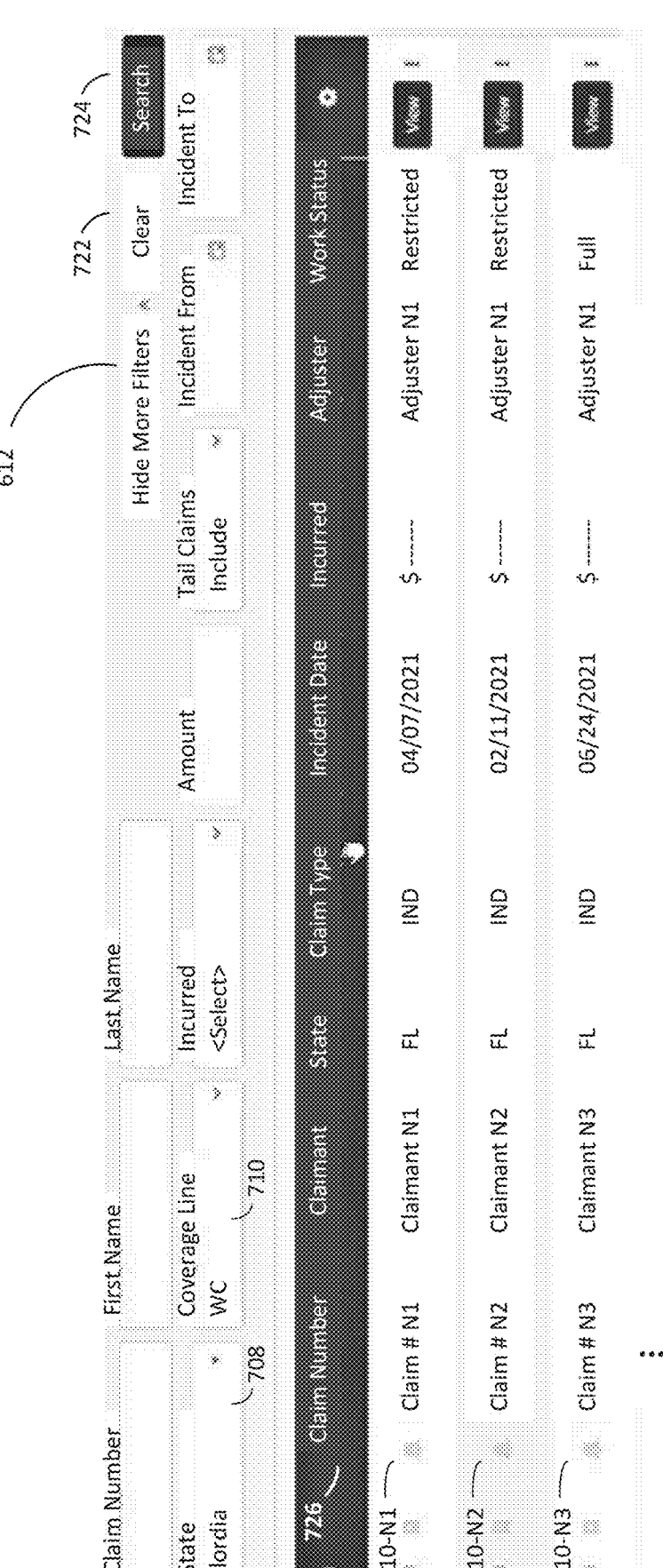

Thus, as illustrated in FIG. 7D, applying a coverage line filter 710 and a state filter 708 to the plurality of candidate claims specifies an order and a subset of the plurality of candidate claims, where the subset of the plurality of candidate claims consists of candidate claims 610 (e.g., 610-N1, 610-N2, 610-N3 . . . ) that satisfy the coverage line filter 710 and the state filter 708. In some embodiments, the order of the plurality of candidate claims is further specified using, for each respective filtering criterion in the one or more filtering criteria, a respective column heading 726. For instance, user selection of a respective column heading 726 for a respective filtering criterion specifies the order of the plurality of candidate claims, based on the data entries for the respective filtering criterion.

In some embodiments, one or more candidate claims in the plurality of candidate claims is stored, in electronic form, in a saved claims data store. For instance, as illustrated in FIG. 6, in some embodiments, the customizable user interface 504 further includes a saved claims affordance 604.

Figure 8A:
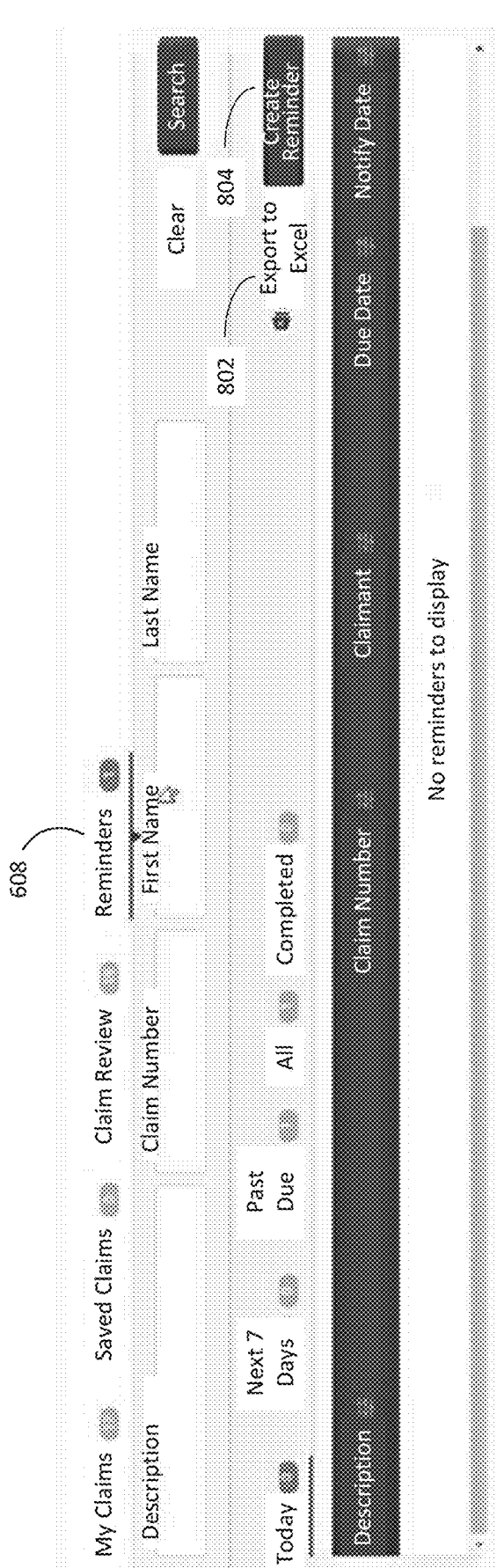
FIGS. 8A and 8B collectively illustrate a customizable user interface for modifying a notification for a user in a plurality of users, in accordance with some embodiments of the present disclosure.
Figure 8B:
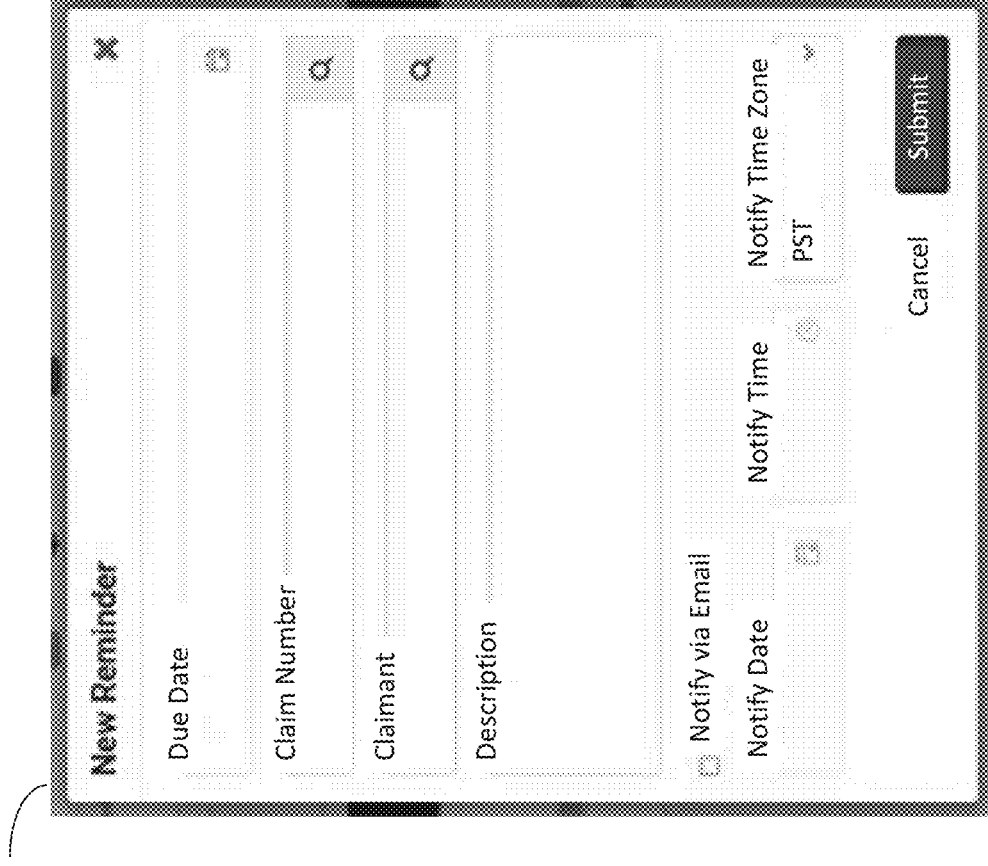

In some embodiments, the customizable user interface 504 further includes a reminders affordance 608 for displaying, on the display, one or more reminders for the user 502 (e.g., a reminder to check a progress of a respective claim through a claim processing workflow). In some embodiments, a respective reminder in the one or more reminders includes a notification date (e.g., a date on which, and/or a time period after which, to check the progress of the respective claim). For instance, as illustrated in FIGS. 8A and 8B, in some implementations, display options for the one or more reminders based on notification date include today, next 7 days, past due, all, and completed. In some embodiments, the customizable user interface further includes a reminder export affordance 802 for exporting the one or more reminders to an Excel file and/or an affordance for generating a reminder 804, where selection of the affordance for generating a reminder 804 displays, on the display, an expanded screen including affordances for specifying a due date, a claim number, a claimant, a description, a means of notification (e.g., email), a notify date, a notify time, and/or a notify time zone.

Claim Reviews.

In some embodiments, the customizable user interface further includes an affordance 606 for viewing an index of claim reviews comprising a corresponding one or more claim reviews (e.g., a queue of one or more pending claim reviews displayed on the customizable user interface). In some embodiments, the receiving a request to display an instance of a claim review comprises detecting a selection of the instance of the claim review from the index of claim reviews (e.g., selection from a list of claim reviews in the pending queue displayed on the customizable user interface).

In some embodiments, the index of claim reviews includes, for each claim review in the corresponding one or more claim reviews, a corresponding instance of the respective claim review. In some embodiments, each corresponding instance of a respective claim review in the corresponding one or more claim reviews is associated with the first user. In some embodiments, each corresponding instance of a respective claim review in the corresponding one or more claim reviews is associated with a respective user in a plurality of users. In some embodiments, the corresponding one or more claim reviews is a plurality of claim reviews.

In some embodiments, the plurality of claim reviews comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, or at least 500 claim reviews. In some embodiments, the plurality of claim reviews comprises no more than 1000, no more than 500, no more than 200, no more than 100, no more than 50, no more than 40, no more than 30, no more than 20, or no more than 10 claim reviews. In some embodiments, the plurality of claim reviews comprises from 2 to 10, from 5 to 30, from 10 to 50, from 20 to 500, from 100 to 200, from 200 to 500, from 10 to 100, or from 80 to 1000 claim reviews. In some embodiments, the plurality of claim reviews falls within another range starting no lower than 2 claim reviews and ending no higher than 1,000 claim reviews.

In some embodiments, a respective claim review in a plurality of claim reviews comprises a plurality of instances. For example, in some embodiments, a respective claim review is scheduled to be performed at a plurality of times and/or dates. In some embodiments, a first claim review is copied (e.g., as a template) to a second claim review comprising an independent corresponding plurality of claims. In some embodiments, a respective claim review comprises at least 1, at least 2, at least 3, at least 4, at least 5, at least 6, at least 7, at least 8, at least 9, at least 10, at least 15, or at least 20 instances. In some embodiments, a respective claim review comprises no more than 50, no more than 30, no more than 20, no more than 15, no more than 10, or no more than 5 instances. In some embodiments, a respective claim review comprises from 2 to 10, from 1 to 5, from 2 to 8, from 5 to 25, or from 10 to 50 instances. In some embodiments, a respective claim review comprises a plurality of instances that falls within another range starting no lower than 2 instances and ending no higher than 50 instances.

Figure 9:
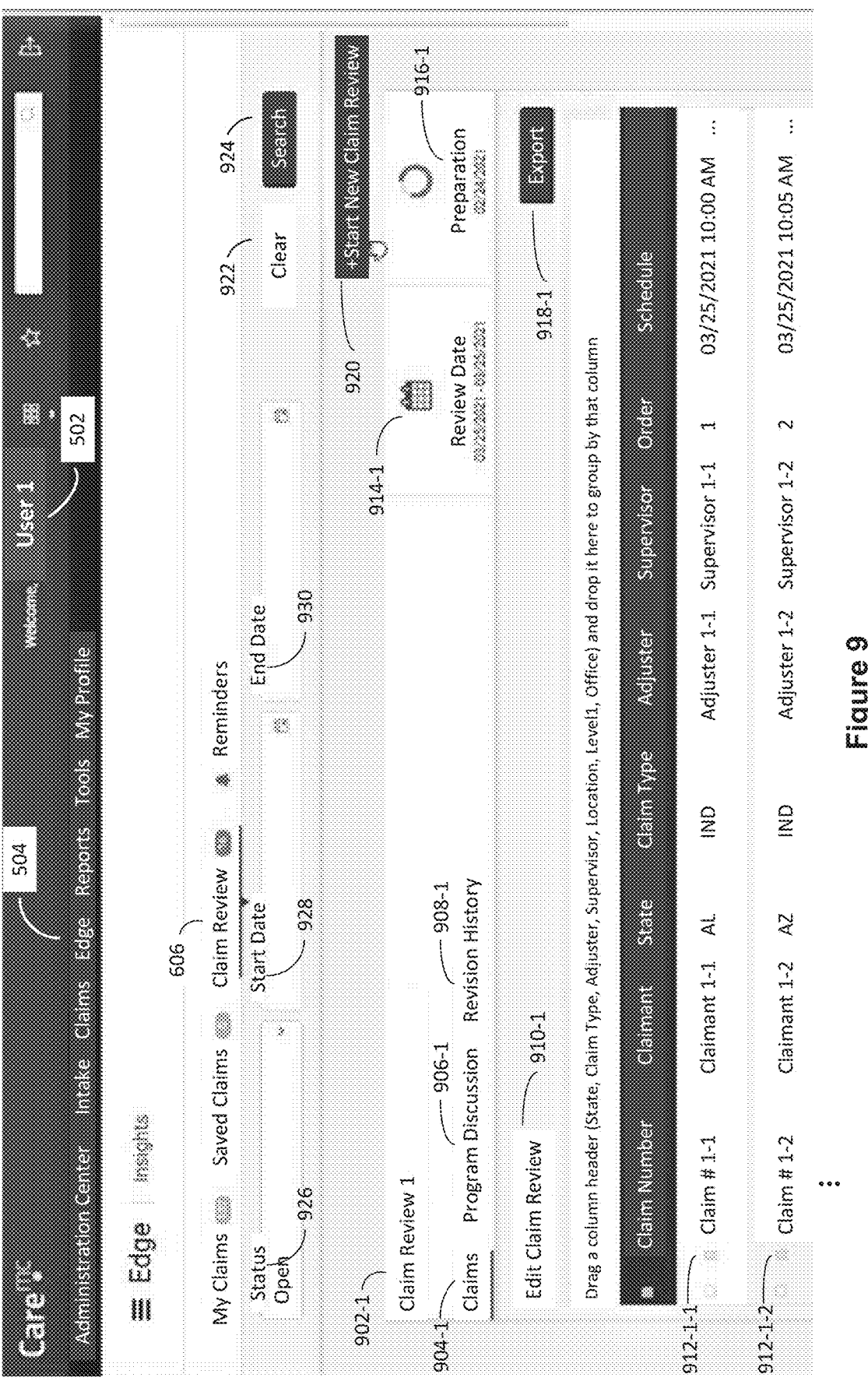
FIG. 9 illustrates a customizable user interface displaying an instance of a claim review, in accordance with some embodiments of the present disclosure.

In some embodiments, the customizable user interface displays an affordance for sorting and/or filtering the index of claim reviews using one or more filtering criteria, and the method further comprises specifying an order and/or a subset of one or more claim reviews in the index of claim reviews. Thus, as illustrated in FIG. 9, in some embodiments, the customizable user interface displayed for a respective user 502 displays an affordance for specifying a status 926 (e.g., open and/or closed) of one or more claim reviews in the index of claim reviews, an affordance for specifying a start date 928 (e.g., a dropdown list and/or a calendar selection tool) of the one or more claim reviews in the index of claim reviews, and/or an affordance for specifying an end date 930 (e.g., a dropdown list and/or a calendar selection tool) of the one or more claim reviews in the index of claim reviews, and the method further comprises sorting and/or filtering the index of claim reviews by specifying an order and/or a subset of the one or more claim reviews in the index of claim reviews based on the one or more criteria 926, 928, and/or 930. In some embodiments, the customizable user interface further provides an affordance for removing the one or more filtering criteria 922 (e.g., "Clear"). In some embodiments, the customizable user interface further provides an affordance for filtering the index of claim reviews 924 (e.g., "Search") based on the one or more filtering criteria.

In some embodiments, the receiving a request to display an instance of a claim review comprises displaying an expanded view of the instance of the claim review including the corresponding plurality of claims for the instance of the claim review. Suitable embodiments for the corresponding plurality of claims for the instance of the claim review are described herein, for example, in the section entitled "Claims," above. For instance, as illustrated in FIG. 9, a first claim review 902 (e.g., 902-1) includes a corresponding plurality of claims 912 (e.g., 912-1-1, 912-1-2 . . . ). The corresponding plurality of claims 912 for the first claim review can be viewed by selecting an affordance 904 for viewing the corresponding plurality of claims (e.g., 904-1). In some embodiments, the corresponding plurality of claims for the instance of the claim review includes any number of claims and/or any of the embodiments of claims and/or candidate claims, as disclosed herein (see, for example, the section entitled "Claims," above).

Figure 13:
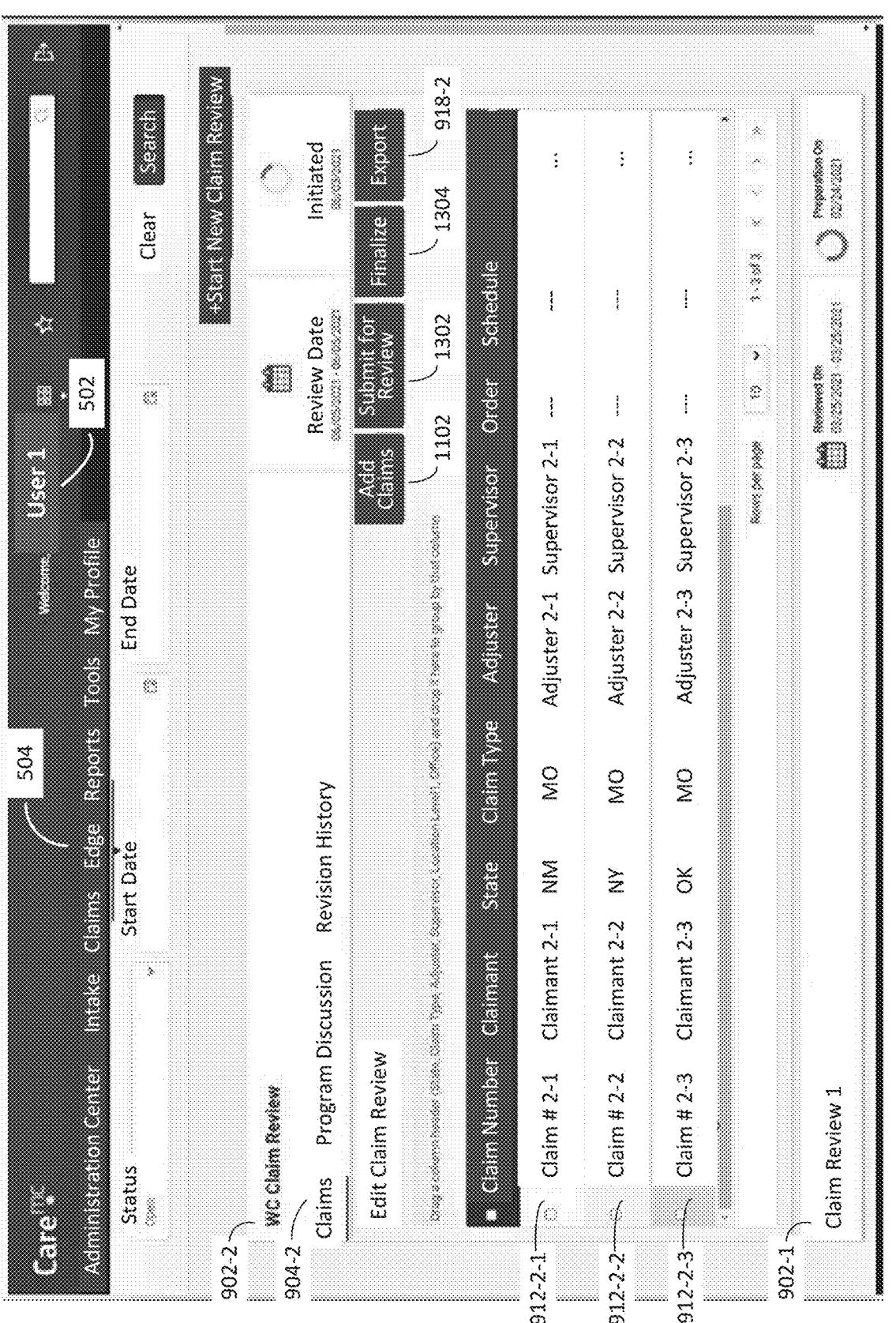
FIG. 13 illustrates a customizable user interface displaying an instance of a claim review, in accordance with some embodiments of the present disclosure.

As illustrated in FIG. 13, a second claim review 902 (e.g., 902-2) can include any of the embodiments of a first claim review 902-1, including a corresponding plurality of claims 912 (e.g., 912-2-1, 912-2-2, 912-2-3). In some embodiments, the corresponding plurality of claims 912 for the second claim review is viewed by selecting an affordance 904 for viewing the corresponding plurality of claims (e.g., 904-2). Referring to FIG. 1, in some embodiments, the instance of the claim review is for a respective claim review in a plurality of claim reviews stored in a system 100, such as in claim review data construct 128. In system 100, claim review data construct 128 comprises, for each claim review 130 in a plurality of claim reviews, a corresponding plurality of claims 132.

In some embodiments, a respective instance of a claim review further comprises a due date that indicates a time frame during which the corresponding plurality of claims for the instance of the claim review are to be prepared for review (e.g., marked as complete by an adjuster). In some embodiments, a respective instance of a claim review further comprises a review date 914 (e.g., 914-1, 914-2) that indicates a time frame during which the instance of the claim review is to occur (e.g., a date and/or a range of dates during which the instance of the claim review will be performed). Generally, the review date specifies a later time frame (e.g., a later date) than the due date. In some embodiments, a respective instance of a claim review further comprises a completion status 916 (e.g., 916-1, 916-2) that indicates a status of the instance of the claim review throughout a claims processing workflow (see, for example, the section entitled "Claim Review Status," below). Thus, in some embodiments, the customizable user interface further comprises a review date 914 for the instance of the claim review. In some embodiments, the customizable user interface further comprises a completion status 916 for the instance of the claim review.

In some embodiments, the customizable user interface displays, for a respective instance of a claim review in the corresponding one or more claim reviews, various affordances for performing actions for the respective claim review (e.g., sorting and/or filtering the corresponding plurality of claims for the respective instance of the claim review; generating an instance of a claim review 920; updating a completion status for the respective instance of the claim review; viewing and/or modifying a criterion for the respective instance of the claim review 906 (e.g., 906-1, 906-2); viewing a revision history of the respective instance of the claim review 908 (e.g., 908-1, 908-2); modifying the respective instance of the claim review 910 (e.g., 910-1, 910-2); viewing an expanded summary of a claim in the corresponding plurality of claims for the respective instance of the claim review; and/or exporting the respective instance of the claim review 918 (e.g., 918-1, 918-2)).

For example, in some embodiments, the customizable user interface displays, for a respective instance of a claim review, an affordance for sorting and/or filtering the corresponding plurality of claims for the respective instance of the claim review. Referring to Block 206, the method further includes applying, responsive to the request (e.g., the request to display an instance of a claim review), a first customizable template to the instance of the claim review, where the first customizable template specifies (i) an order and (ii) a subset of the corresponding plurality of claims in the instance of the claim review.

In some embodiments, the applying the first customizable template to the instance of the claim review comprises sorting the corresponding plurality of claims for the instance of the claim review. In some embodiments, the applying the first customizable template to the instance of the claim review comprises filtering the corresponding plurality of claims for the instance of the claim review.

Referring to Block 208, in some embodiments, the first customizable template specifies (i) an order and (ii) a subset of the corresponding plurality of claims based on a filtering criterion selected from the group consisting of a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars).

In some embodiments, as illustrated in FIG. 9, a filtering criterion is displayed for a respective instance of a claim review 902-1 on the customizable user interface 504. In some embodiments, the order and/or the subset of the corresponding plurality of claims is further specified using, for a respective filtering criterion, a respective column heading (e.g., such as column heading 726 in FIG. 7A). For instance, user selection of a respective column heading 726 for a respective filtering criterion specifies an order and/or a subset of the corresponding plurality of claims, based on a corresponding data entry for the respective filtering criterion. In some embodiments, the data entry for a respective filtering criterion is a manual entry of an alphanumeric string (e.g., a search box). In some embodiments, the data entry for a respective filtering criterion is a dropdown list of one or more options for the respective filtering criterion. Referring to FIG. 1, in some embodiments, the first customizable template is stored in electronic form in a system 100, such as template 1 (e.g., 146-1) in customizable template construct 144.

Figure 20B:
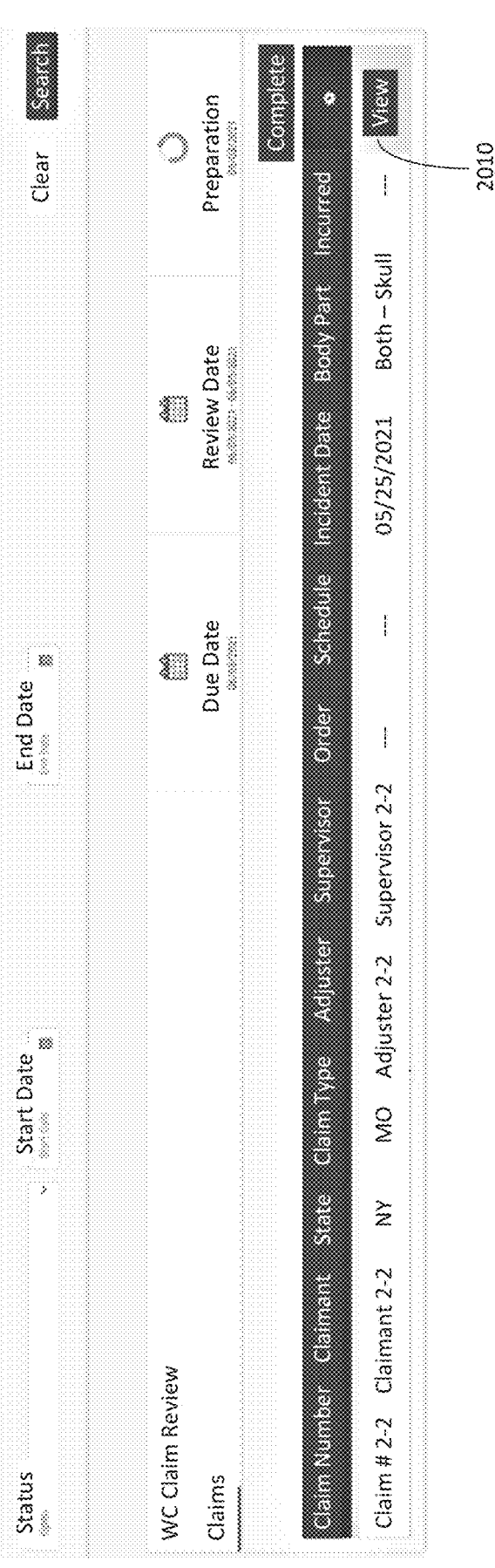
Figure 21B:
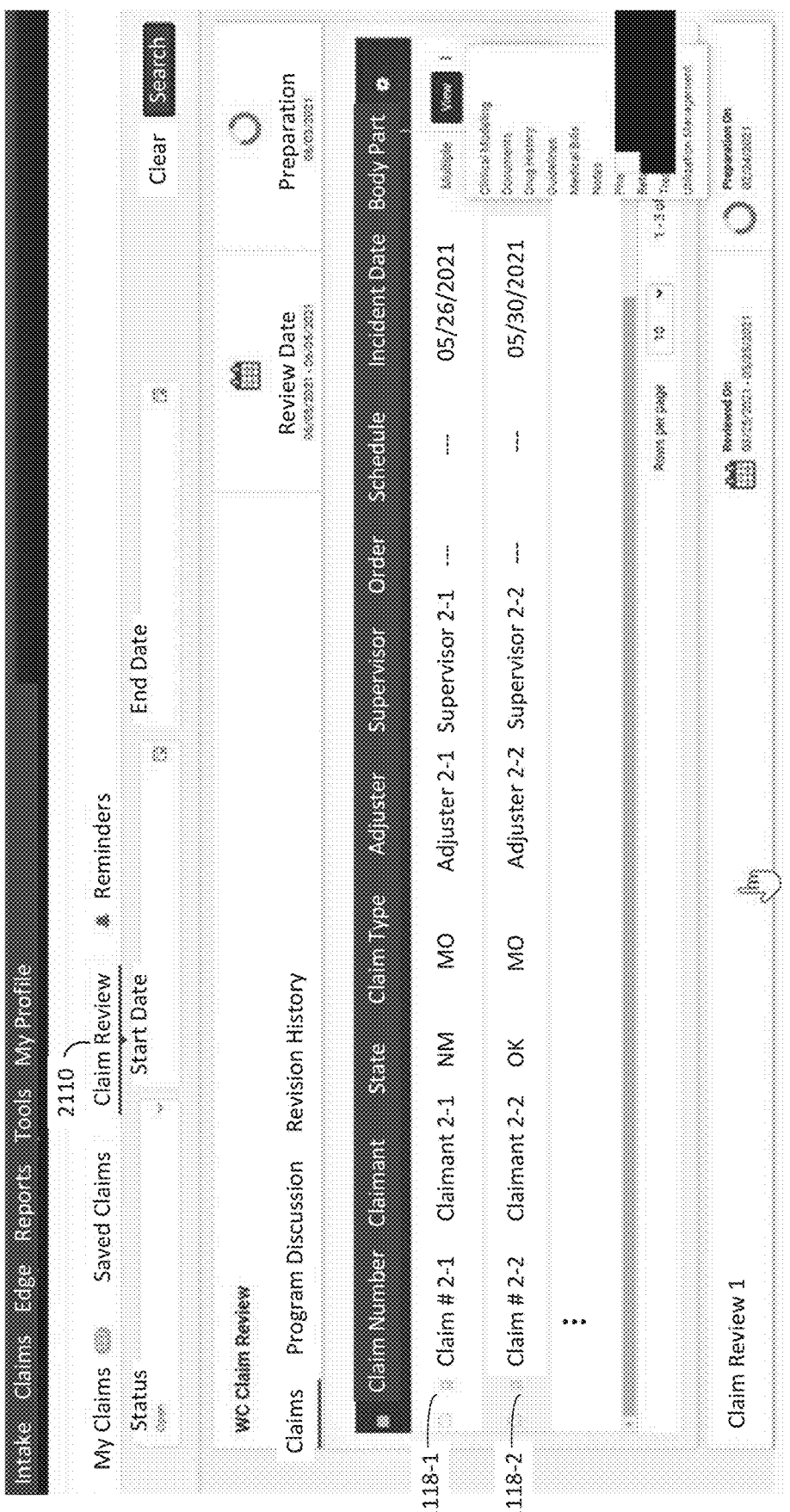

In some embodiments, responsive to receiving the request to display the instance of the claim review, the first customizable template applied to the instance of the claim review is selected, from a plurality of first customizable templates, based on the identity of the first user. For instance, FIG. 9 illustrates a respective customizable template applied to a respective instance of a claim review for a respective user in a plurality of users (e.g., "user 1," 502), FIGS. 20A-B illustrate a respective customizable template applied to a respective instance of a claim review for a different respective user in the plurality of users (e.g., "user 2," 2002), and FIGS. 21A-B illustrate a respective customizable template applied to a respective instance of a claim review for still another respective user in the plurality of users (e.g., "user 3," 2102), where each of the respective customizable templates applied to the respective instance of the claim review for users 1, 2, and 3 display an independent set of affordances for performing actions to the respective instance of the claim review.

In some embodiments, a respective first customizable template in the plurality of first customizable templates has a respective independent set of affordances for performing actions to a respective instance of a claim review, where each affordance in the respective independent set of affordances for the respective first customizable template is the same or different from an affordance in a corresponding independent set of affordances for any other first customizable template in the plurality of first customizable templates. In other words, in some embodiments, a respective first customizable template applied to an instance of a claim review for a respective user in the plurality of users displays the same or different affordances for performing actions, or a combination thereof, as any other user in the plurality of users (e.g., the customizable user interface displayed for a respective user can have similarities and/or differences from any other customizable user interface displayed for any other user in the plurality of users). Thus, referring again to FIGS. 9, 20A-B, and 21A-B, in an example embodiment, user 1 is an account manager, user 2 is an adjuster, and user 3 is a risk manager, and the respective first customizable template applied to the instance of the claim review for each respective user in the plurality of users is selected, from a plurality of first customizable templates, based on the identity of the respective user.

Referring again to FIG. 1, then, in some embodiments, each respective first customizable template in the plurality of first customizable templates is stored in electronic form in a system 100, such as templates 1-T (e.g., 146-1, . . . 146-T) in customizable template construct 144.

In some embodiments, the plurality of first customizable templates comprises at least a corresponding first customizable template for each respective user in the plurality of users. In some embodiments, the plurality of first customizable templates comprises at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, or at least 5000 templates. In some embodiments, the plurality of first customizable templates comprises no more than 10,000, no more than 5000, no more than 2000, no more than 1000, no more than 500, no more than 200, no more than 100, no more than 50, no more than 40, no more than 30, no more than 20, or no more than 10 templates. In some embodiments, the plurality of first customizable templates comprises from 2 to 10, from 5 to 30, from 3 to 8, from 10 to 50, from 20 to 500, from 100 to 2000, or from 200 to 10,000 templates. In some embodiments, the plurality of first customizable templates falls within another range starting no lower than 2 templates and ending no higher than 10,000 templates.

In some embodiments, the method further comprises receiving a request to generate the instance of the claim review by applying a second customizable template to the instance of the claim review, where the second customizable template specifies a subset of candidate claims in a plurality of candidate claims associated with both the first and the second entity, thereby obtaining one or more candidate claims, and adding the one or more candidate claims to the instance of the claim review. In some embodiments, the customizable user interface further displays, for a respective instance of a claim review, an affordance for generating an instance of a claim review 920 (e.g., "Start New Claim Review").

Figure 10A:
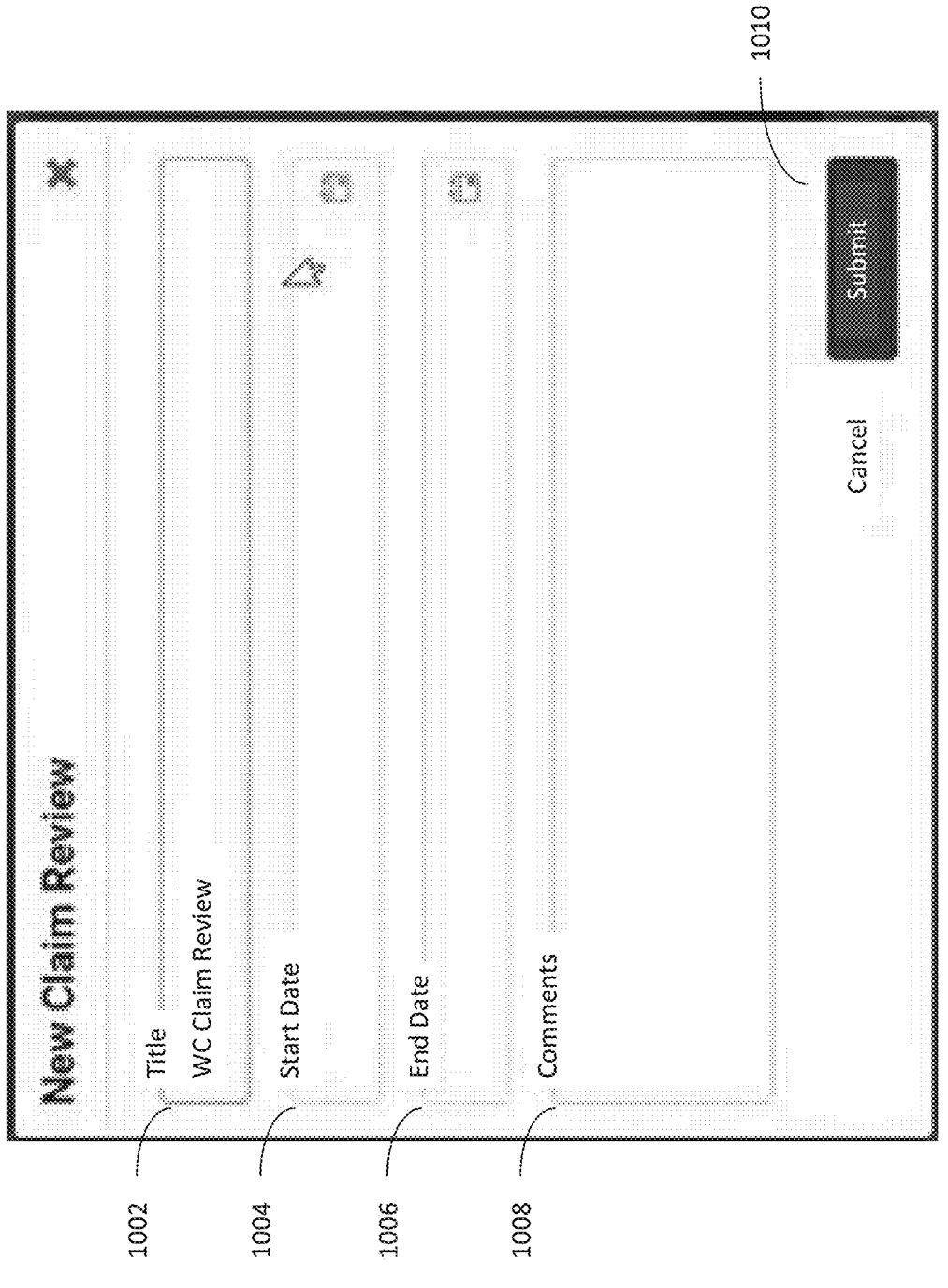
Figure 11:
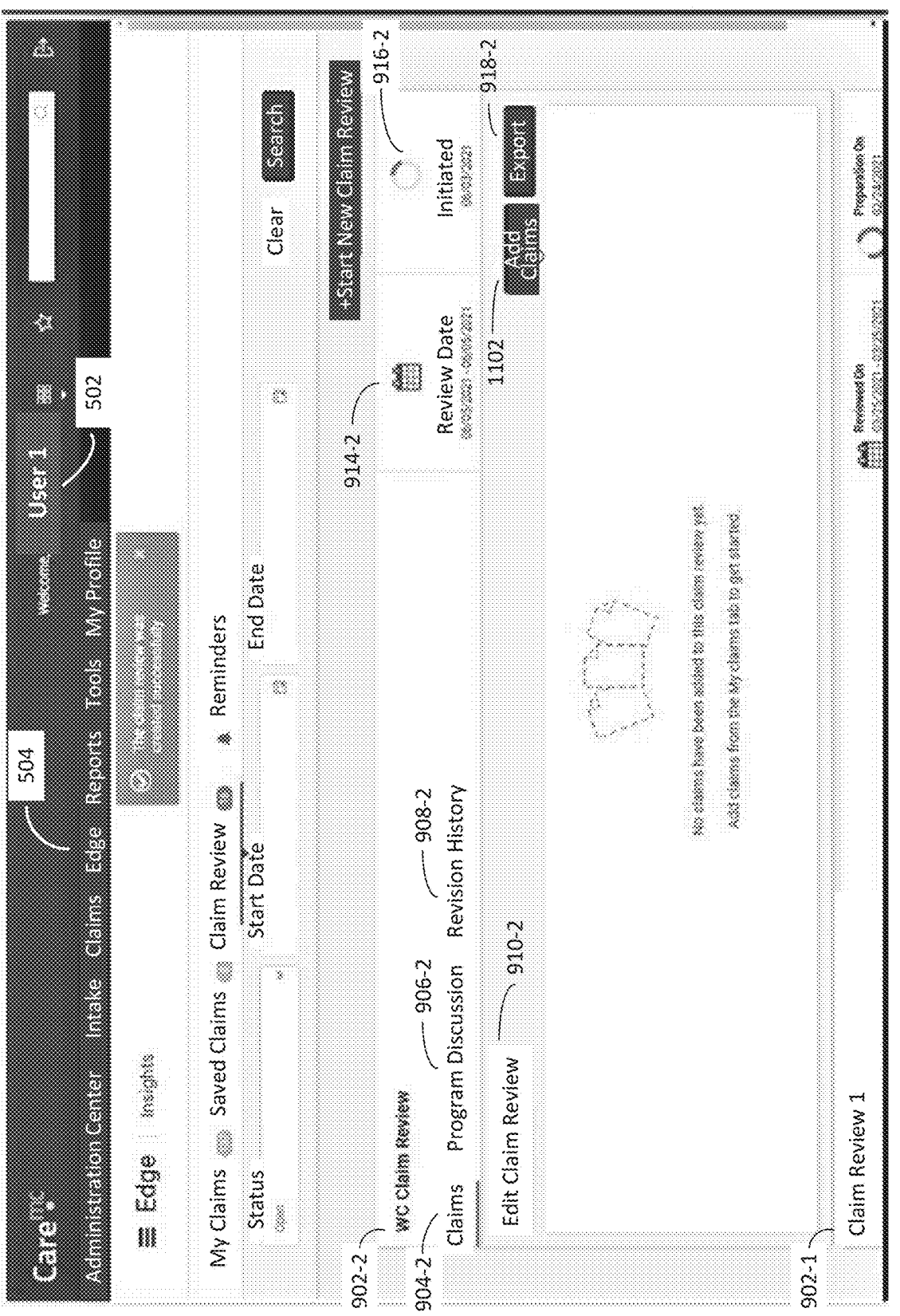
FIG. 11 illustrates a customizable user interface displaying an instance of a claim review, in accordance with some embodiments of the present disclosure.

An example process of generating an instance of a claim review and adding one or more candidate claims to the instance of the claim review is illustrated with reference to FIGS. 10-13. As illustrated in FIG. 10A, in some embodiments, selection of the affordance for generating an instance of a claim review 920 (e.g., "Start New Claim Review") displays, on the display, an expanded screen including an affordance for specifying a title for the instance of the claim review 1002 (e.g., "WC Claim Review"), an affordance for specifying a start date for the instance of the claim review 1004, an affordance for specifying an end date for the instance of the claim review 1006, an affordance for entering one or more annotations (e.g., comments) for the instance of the claim review 1008, and/or an affordance for canceling or submitting the instance of the claim review 1010, thereby creating a new instance of a claim review. Referring to FIG. 10B, in some embodiments, the specifying the title, start date, end date, and/or one or more annotations is performed using any suitable user affordance such as a dropdown list, a calendar selection tool, and/or a manual entry box. In some embodiments, the specifying the start date 1004 and end date 1006 provides a review date 914 (e.g., 914-2) for the instance of the claim review (e.g., where the customizable user interface further comprises a review date for the instance of the claim review).

In the example process illustrated with reference to FIGS. 10-13, the customizable user interface further displays an affordance for adding the one or more candidate claims to the instance of the claim review 1102 (e.g., "Add Claims"). In some embodiments, selection of affordance 1102 displays, on the display, the plurality of candidate claims (e.g., "My Claims" 602) associated with the first user, as illustrated in FIG. 12. For example, as described above with reference to FIGS. 1 and 6, in some embodiments, the plurality of candidate claims is displayed on a customizable user interface as candidate claims 610 (610-1, 610-2, 610-3, 610-4 . . . ) in an index of claims 602, where each respective candidate claim comprises a corresponding summary, and, in some embodiments, the candidate claims are obtained in electronic form from a data store, such as candidate claims 124 in claims data store 122 in a system 100. Selection of the subset of candidate claims is performed, in some embodiments, by clicking on and/or toggling check boxes for each respective candidate claim in the subset of candidate claims. In some embodiments, the customizable user interface displays a tally of the number of selected candidate claims in the subset of candidate claims.

In some embodiments, the specifying the subset of candidate claims comprises selecting one or more candidate claims in the plurality of claims that meet one or more criteria for the instance of the claim review. In some implementations, the one or more criteria comprise a filtering criterion, as described above. For instance, in some embodiments, the second customizable template specifies (i) an order and (ii) a subset of the corresponding plurality of claims based on a filtering criterion selected from the group consisting of a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars). Suitable methods for sorting and/or filtering the plurality of candidate claims for the selection of the corresponding plurality of claims for the instance of the claim review are further disclosed in the above section entitled "Candidate Claims," above.

In some embodiments, the subset of candidate claims is exported (e.g., to an Excel and/or PDF format). In some embodiments, the customizable user interface comprises an exporting affordance 1202 for exporting the one or more candidate claims in the subset of candidate claims (e.g., to an Excel and/or PDF format).

In some embodiments, the subset of candidate claims is used to generate a new instance of a claim review (e.g., by populating a new instance of a claim review with the one or more candidate claims in the subset of candidate claims). In some embodiments, the customizable user interface comprises an affordance for generating a new instance of a claim review 1204 (e.g., "Start New Claim Review") based on the selection of the subset of candidate claims.

In some embodiments, the subset of candidate claims is added to an existing instance of a claim review (e.g., to previously generated instance of a claim review 902-2). In some embodiments, the customizable user interface comprises an affordance for adding the one or more candidate claims in the subset of candidate claims to an existing instance of a claim review (e.g., "Add to Existing Claim Review" 1206). In some embodiments, the adding the one or more candidate claims to the existing instance of the claim review populates the instance of the claim review with the corresponding plurality of claims, as illustrated in FIG. 13 (e.g., 912-2-1, 912-2-2, 912-2-3).

Referring to Block 210, the method further includes accessing, in electronic form, from one or more data stores, each respective claim in the corresponding plurality of claims, to acquire a summary of the respective claim. As described above, referring to FIG. 1, in some embodiments, each respective claim in the corresponding plurality of claims for the instance of the claim review is accessed, in electronic form, from a system 100, such as from claim review data construct 128. In claim review data construct 128, for a respective claim review 130, each claim in a plurality of claims 132 has a corresponding summary 134.

Figure 18:
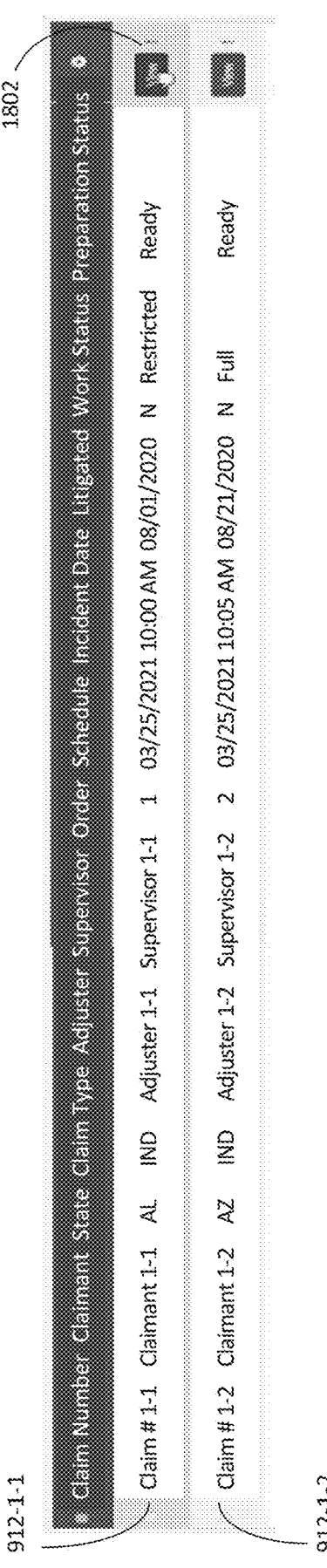
FIG. 18 illustrates a customizable user interface displaying an example summary of a respective claim in a corresponding plurality of claims in an instance of a claim review, in accordance with some embodiments of the present disclosure.

FIG. 18 illustrates an example of a summary of a respective claim 912-1-1 in a corresponding plurality of claims. In some embodiments, the summary of the respective claim comprises one or more features. In some embodiments, the one or more features includes a filtering criterion. In some embodiments, the one or more features includes a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a supervisor, a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars). In some embodiments, the one or more features include any of the features disclosed herein, such as any of the features described in the section entitled "Claim Summaries," below.

In some embodiments, the method further includes, prior to the adding the one or more candidate claims to the instance of the claim review, obtaining an approval of the one or more candidate claims from at least a user associated with the first entity and a user associated with the second entity. For instance, in some implementations, the method includes obtaining an approval of the corresponding plurality of claims for the instance of the claim review from an account manager associated with the first entity, a risk manager associated with the second entity, or both. In some embodiments, the one or more candidate claims in the subset of candidate claims is specified by a user associated with the first entity and approved by a user associated with the second entity. In some embodiments, the one or more candidate claims in the subset of candidate claims is specified by a user associated with the second entity and approved by a user associated with the first entity.

Claim Review Status.

Referring to Block 212, the method further includes displaying, on the display, a customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Figure 15A:
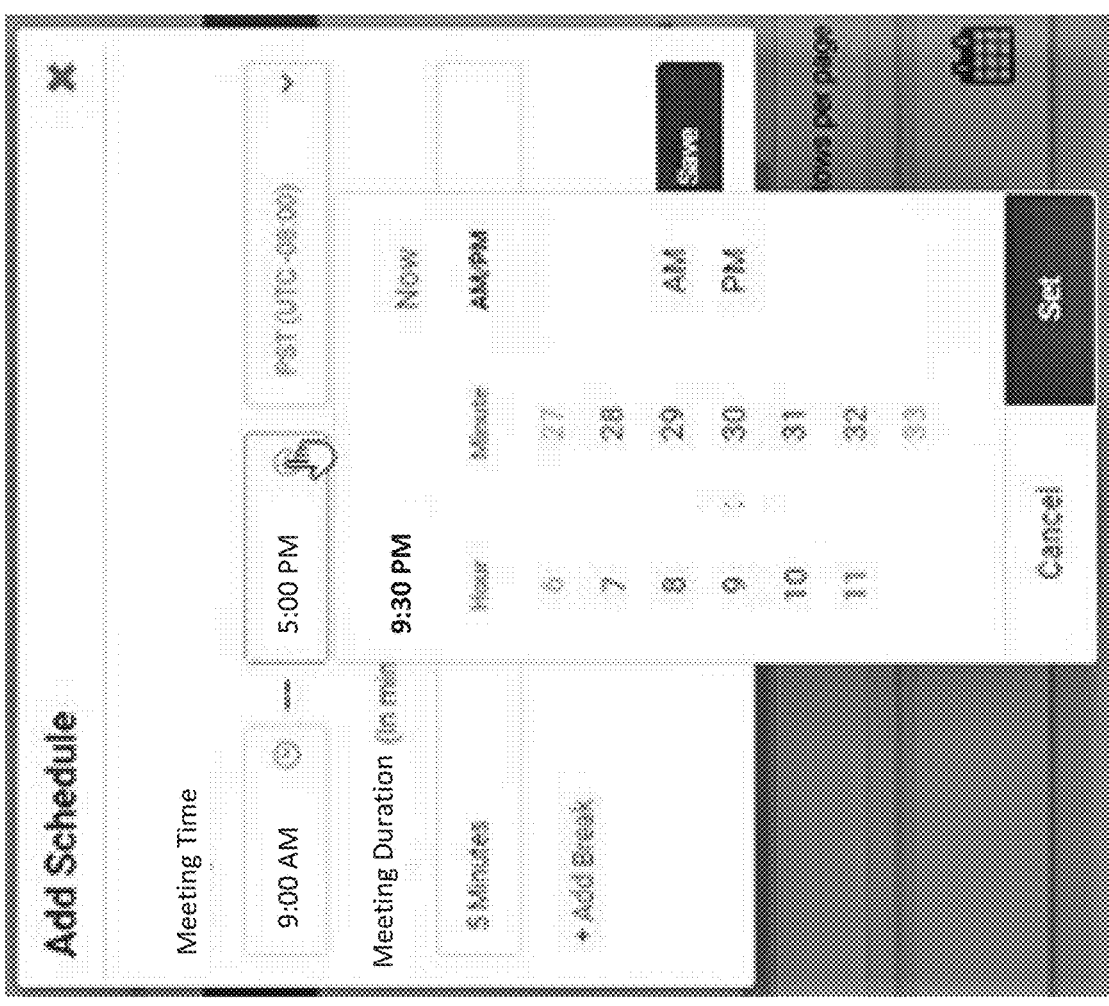
FIGS. 15A, 15B, 15C, and 15D collectively illustrate assigning a review schedule to an instance of a claim review, in accordance with some embodiments of the present disclosure.
Figure 15B:
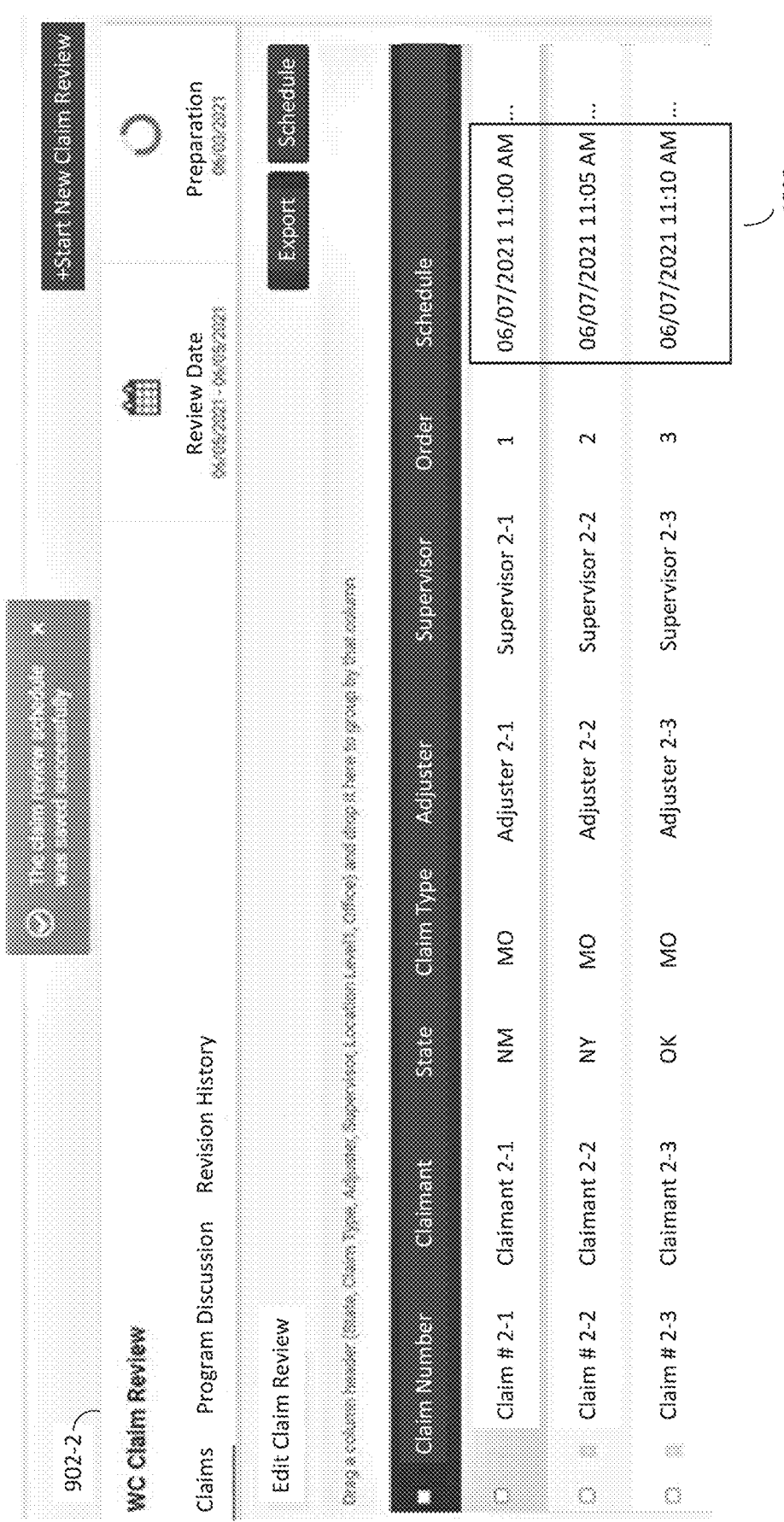
Figure 15C:
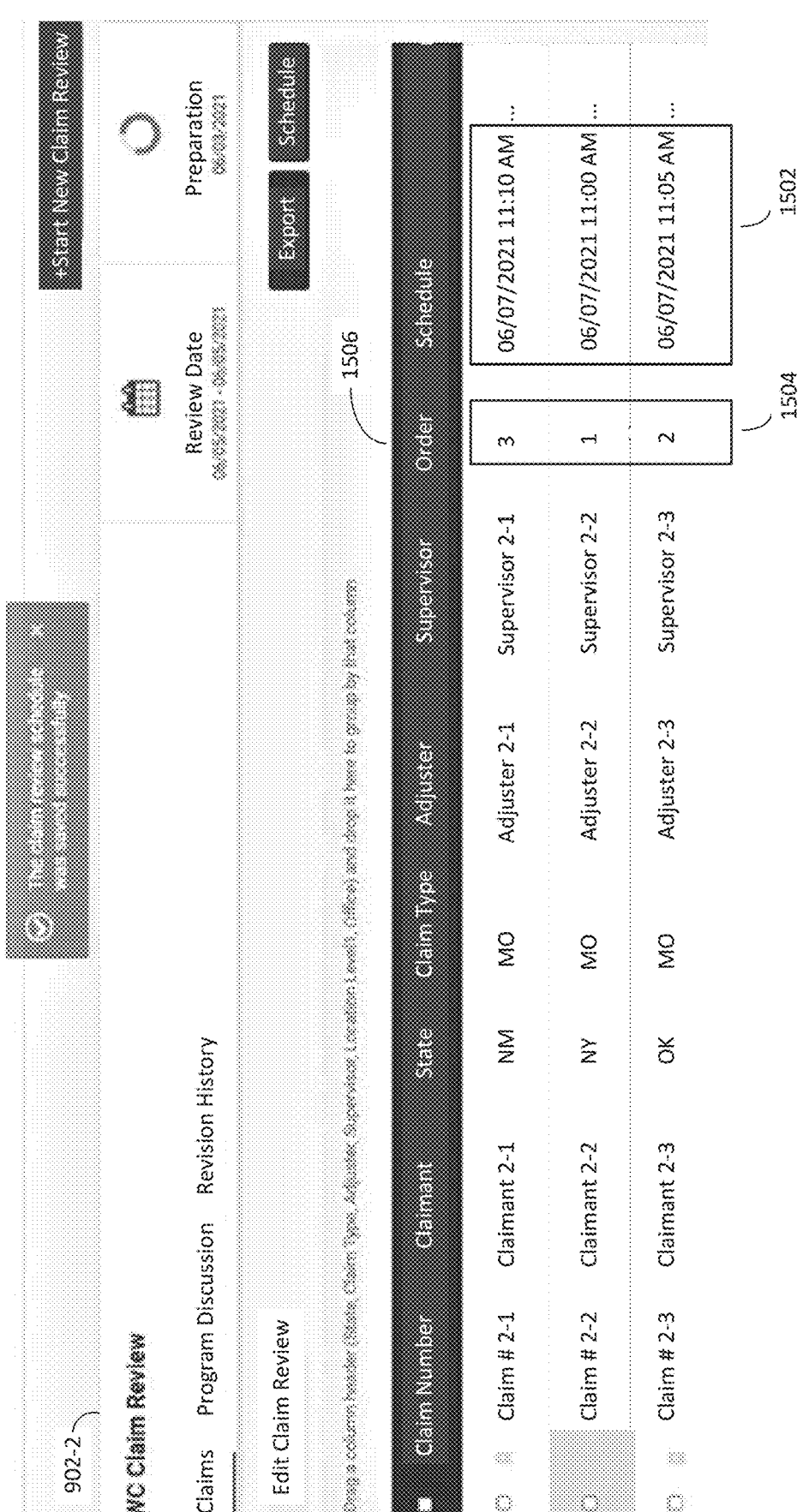
Figure 15D:
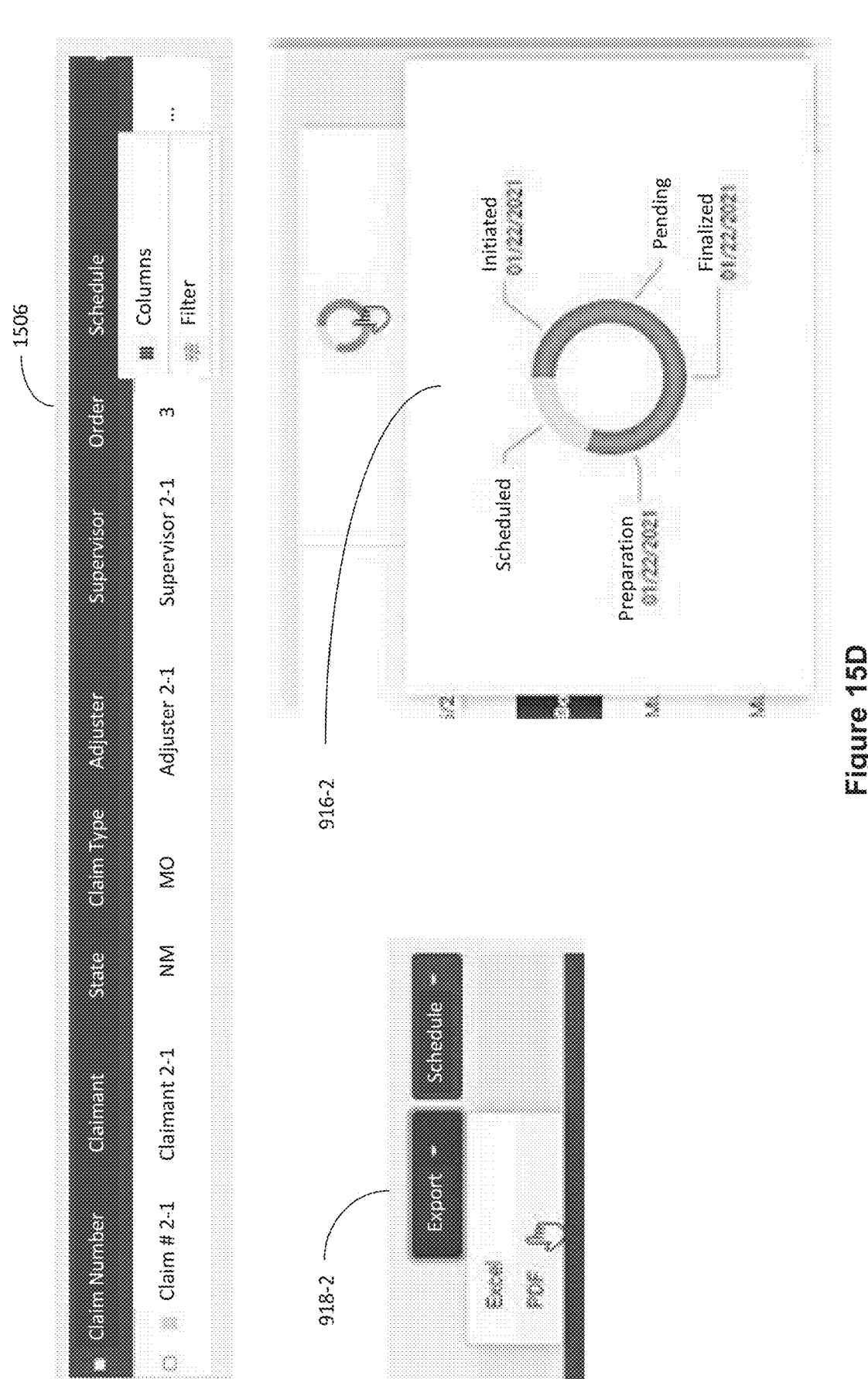

An example of a completion status 916-2 for the instance of the claim review is illustrated in FIG. 15D. In some embodiments, the completion status 916-2 is displayed in graphical form as a progress wheel and/or a progress bar. In some embodiments, the completion status 916-2 is displayed as a label and/or a caption. In some embodiments, referring to FIG. 1, the completion status 136 for a respective claim review 130 is obtained, in electronic form, from a data store, such as claim review data construct 128 in system 100.

In some embodiments, the completion status for the instance of the claim review is selected from the group consisting of initiated, pending, preparation, complete, submit for review, finalized, and/or scheduled.

In some embodiments, the completion status indicates a progress of the instance of the claim review throughout a claims processing workflow and/or any action performed on the instance of the claim review. For example, the completion status is "initiated" when the instance of the claim review is generated and/or populated with a corresponding plurality of claims. In some embodiments, the completion status is "preparation" when the claim review has been modified and/or finalized. In some embodiments, the completion status is "complete" when the corresponding plurality of claims for the instance of the claim review are prepared for review (e.g., when the corresponding plurality of claims for the instance of the claim review are marked as completed, e.g., by an adjuster).

In some embodiments, the completion status is "submit for review" when the claim review has been submitted from a user associated with a first entity (e.g., an account manager) to a user associated with a second entity (e.g., a risk manager and/or an employer) for review and/or approval. In some implementations, an instance of a claim review that has been submitted for review is edited and/or modified by the user associated with the second entity (e.g., the risk manager and/or the employer). For instance, in some embodiments, the instance of the claim review that has been submitted for review can be modified by adding a claim, deleting a claim, editing a claim, modifying an annotation, and/or any other modification as disclosed herein (see, for example, the section entitled "Modifying Claim Reviews," below). In some embodiments, an instance of a claim review that has been submitted for review is returned (e.g., after approval, modification, and/or rejection) from the user associated with the second entity to the user associated with the first entity for finalization and/or scheduling. In some embodiments, an instance of a claim review that has been submitted for review is further finalized and/or scheduled by the user associated with the second entity.

In some embodiments, the completion status is "finalized" when the claim review is finalized for scheduling (e.g., final approval by a supervisor and/or an account manager). In some embodiments, finalization is performed after the instance of the claim review is submitted for review. In some embodiments, finalization is performed when the instance of the claim review has not been submitted for review. In some embodiments, the completion status is "scheduled" when a review date for the instance of the claim review has been scheduled.

In some embodiments, the method further includes, upon user selection of the first affordance, updating the instance of the claim review by updating the completion status of the claim review.

In some embodiments, the updating the completion status of the claim review includes submitting the claim review for review. For example, as illustrated in FIG. 13, in some embodiments, the updating the completion status of the claim review comprises, upon user selection of the first affordance 1302 (e.g., "Submit for Review"), submitting the claim review from a user associated with the first entity to a user associated with the second entity for review. In some implementations, an account manager associated with a first entity submits a claim review to a risk manager associated with a second entity for review, such that the risk manager can either approve the claim review or return the claim review for further editing.

Figure 14A:
Figure 14B:
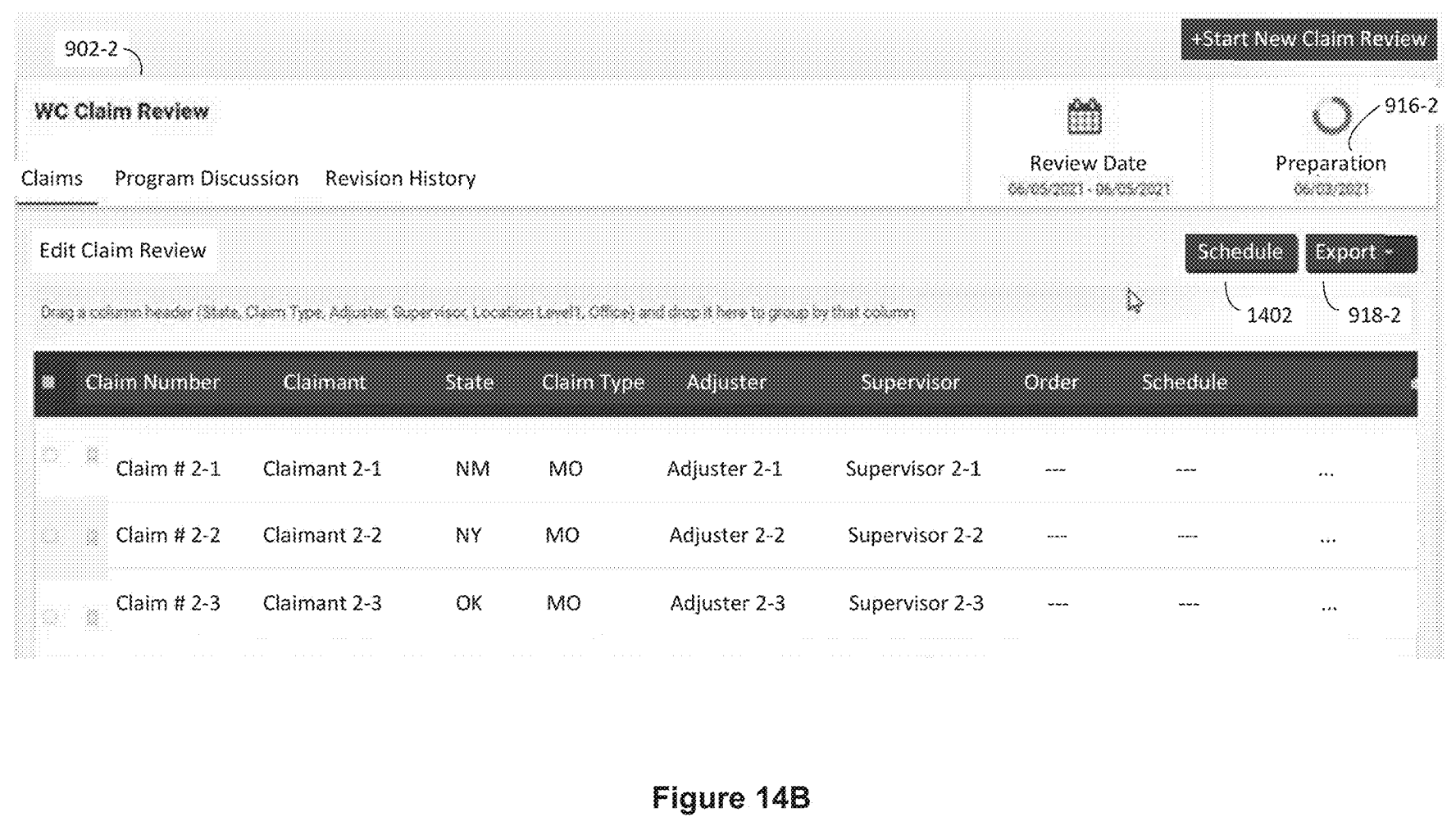

In some embodiments, the updating the completion status of the claim review includes finalizing the claim review. For example, as illustrated in FIGS. 13 and 14A-B, in some embodiments, the updating the completion status of the claim review comprises, upon user selection of the first affordance 1304 (e.g., "Finalize"), finalizing the claim review for scheduling. In some implementations, an account manager associated with a first entity finalizes a claim review for scheduling, thereby updating the completion status of the claim review from "initiated" to "preparation."

In some embodiments, the updating the completion status of the claim review includes completing the claim review. For example, as illustrated in FIG. 20B, in some embodiments, the updating the completion status of the claim review comprises, upon user selection of the first affordance (e.g., "Complete"), completing one or more claims in the corresponding plurality of claims for the instance of the claim review. In some implementations, an adjuster associated with a first entity completes one or more claims in the corresponding plurality of claims for the instance of the claim review.

In some embodiments, the first affordance is determined based upon the identity of the first user (e.g., a first respective user and a second respective user access different actions for processing the claim review). In some embodiments, the first affordance is determined based upon the current completion status of the claim review (e.g., available actions for processing claim reviews are updated based on previously performed actions). For example, the first affordance for updating the completion status of the claim review is displayed on the customizable user interface (e.g., "Submit for Review" 1302 and/or "Finalize" 1304) after the instance of the claim review is populated with a corresponding plurality of claims (FIG. 13), and the first affordance for updating the completion status of the claim review is removed from the customizable user interface after the instance of the claim review is finalized (FIGS. 14A-B).

In some embodiments, the completion status is updated at least 1, at least 2, at least 3, at least 4, at least 5, at least 6, at least 7, at least 8, at least 9, at least 10, at least 15, at least 20, at least 25, or at least 30 times. In some embodiments, the completion status is updated no more than 50, no more than 30, no more than 20, no more than 10, or no more than 5 times. In some embodiments, the completion status is updated from 2 to 10 times, from 3 to 6 times, from 5 to 20 times, or another range starting no lower than 1 and ending no higher than 50.

Referring to Block 214, in some embodiments, the customizable user interface further comprises a third affordance for selecting a review schedule, where the method further comprises, upon user selection of the third affordance, assigning a review schedule to the instance of the claim review, thereby scheduling the claim review. For instance, FIG. 14B illustrates an example of the third affordance for selecting a review schedule (e.g., "Schedule" 1402).

In some embodiments, the method includes, upon user selection of the third affordance for selecting a review schedule, displaying an expanded scheduling interface comprising a scheduling affordance for determining a meeting time. In some embodiments, the assigning the review schedule to the instance of the claim review comprises determining a meeting time for the instance of the claim review (e.g., date, hour, minute, and/or time zone), determining a meeting duration for the instance of the claim review (e.g., start time, end time, and/or increments in minutes), and saving the review schedule, thereby scheduling the claim review. For instance, as illustrated in FIGS. 15A-B, the expanded scheduling interface comprises a scheduling affordance for determining a meeting time, a scheduling affordance for determining a meeting duration, and a scheduling affordance for designating a break (e.g., lunch breaks). Selection of an affordance for saving the review schedule applies, to each respective claim in the corresponding plurality of claims for the instance of the claim review, a corresponding review schedule 1502 indicating the start time, end time, and/or duration of a review meeting for the respective claim.

In some embodiments, the meeting duration indicates the time allotted to a respective claim in the corresponding plurality of claims for the instance of the claim review. For instance, a meeting duration of 5 minute increments indicates, in some embodiments, that each respective claim in the corresponding plurality of claims is allotted 5 minutes for review. In some embodiments, each respective claim in the corresponding plurality of claims for the instance of the claim review has the same increment. In some embodiments, two or more claims in the corresponding plurality of claims have different increments.

In some embodiments, the review schedule for each respective claim in the corresponding plurality of claims for the instance of the claim review can be modified. For example, as illustrated in FIG. 15C, in some embodiments, the review schedule 1502 for each respective claim in the corresponding plurality of claims is modified such that the order 1504 of the claims to be reviewed during the claim review is updated.

In some embodiments, the corresponding plurality of claims for the instance of the claim review is sorted and/or filtered according to the review schedule for each respective claim in the corresponding plurality of claims. In some embodiments, the corresponding plurality of claims for the instance of the claim review is sorted and/or filtered according to the order of review of each respective claim in the corresponding plurality of claims. For example, as illustrated in FIG. 15D, selection of the column heading for filtering criterion 1506 (e.g., "Order") modifies the display of the corresponding plurality of claims.

In some embodiments, the scheduling the instance of the claim review schedules an in-person meeting or a remote meeting (e.g., online). In some embodiments, the scheduling the instance of the claim review updates the completion status of the claim review (e.g., to "scheduled"). In some embodiments, the review schedule for the instance of the claim review is viewable by any user in the plurality of users (e.g., any adjuster, account manager, supervisor, and/or risk manager associated with one or more claims in the corresponding plurality of claims for the instance of the claim review).

In some embodiments, the customizable user interface further displays, for a respective instance of a claim review in the corresponding one or more claim reviews, one or more personnel assigned to the respective claim review (e.g., an adjuster, a supervisor, an account manager, a risk manager, a nurse, and/or a legal counsel). In some embodiments, the customizable user interface further displays, for a respective instance of a claim review in the corresponding one or more claim reviews, one or more personnel assigned to the respective review date for the respective instance of the claim review. For example, in some such embodiments, the customizable user interface displays an indication of one or more individuals that will attend the review meeting at the date and time indicated by the review schedule for the respective instance of the claim review.

Criterion and Historical Record.

Figure 16:
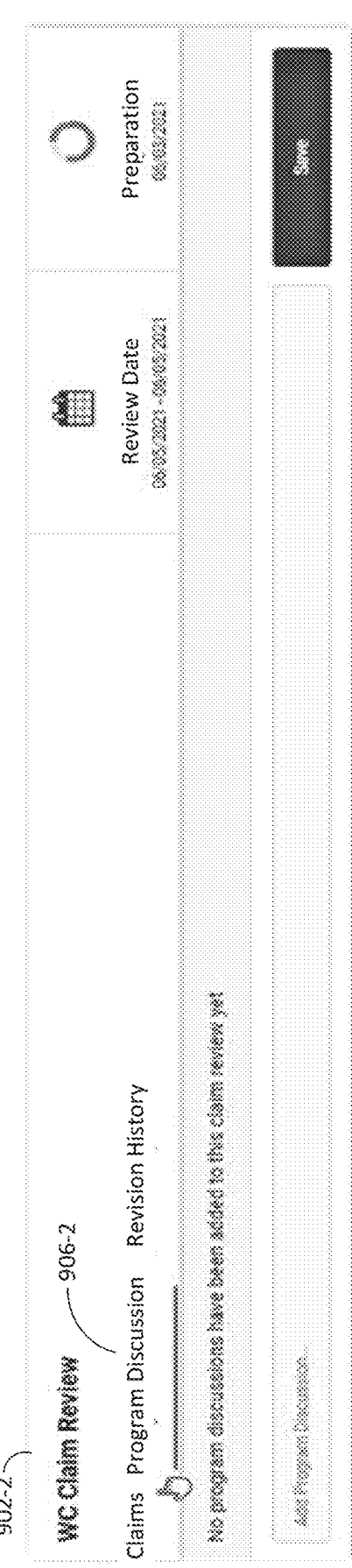
FIG. 16 illustrates a customizable user interface displaying an affordance for updating a criterion for an instance of a claim review, in accordance with some embodiments of the present disclosure.

Referring again to Block 212, the method includes displaying, on the display, a second affordance for updating a criterion for the instance of the claim review. For instance, FIG. 16 illustrates a second affordance for updating the criterion 906 (e.g., 906-2). In some embodiments, referring to FIG. 1, the criterion 138 for a respective claim review 130 is stored, in electronic form, in a data store, such as in claim review data construct 128 in a system 100.

In some embodiments, the method further comprises, upon user selection of the second affordance, updating the instance of the claim review by updating the criterion for the instance of the claim review. In some embodiments, the criterion for the instance of the claim review is a program discussion topic. Generally, a program discussion topic indicates one or more topics for focus and/or discussion during a respective instance of a claim review. For example, a program discussion topic can include whether a claim review relates to a claimant that is out of work, a claims resolution goal, desired actions and/or outcomes, and/or other issues of interest. In some embodiments, the program discussion topic is retained with the respective instance of the claim review before, during, and/or after the review date for the instance of the claim review. In some embodiments, the program discussion topic is retained with the respective instance of the claim review before, during, and/or after resolution of the corresponding plurality of claims for the instance of the claim review. In some embodiments, the program discussion topic can be modified at any point during the claim review process, including before, during, and/or after the review date for the instance of the claim review, and/or before, during, and/or after resolution of the corresponding plurality of claims for the instance of the claim review.

In some embodiments, the criterion for the instance of the claim review is a claim type for the one or more claims in the instance of the claim review.

Referring to Block 216, the customizable user interface further comprises a fourth affordance that displays a historical record for the instance of the claim review. In some embodiments, the method further includes, upon user selection of the fourth affordance, displaying one or more revisions, by the first user, to the instance of the claim review. In some embodiments, the displaying the historical record further displays a plurality of revisions comprising, for each respective user in the plurality of users, a corresponding one or more revisions to the instance of the claim review.

FIG. 17 illustrates a fourth affordance for displaying the historical record for the instance of the claim review 908 (e.g., 908-2). In some embodiments, referring to FIG. 1, the historical record 140 for a respective claim review 130 is stored, in electronic form, in a data store, such as in claim review data construct 128 in a system 100.

In some embodiments, the historical record is a revision history that stores a log of all actions performed on the instance of the claim review, including any additions, deletions, edits, annotations, updates to completion status, scheduling, submissions, and/or reviews, as disclosed herein.

In some embodiments, the historical record is a revision history that stores a log of all actions performed by any user in the plurality of users (e.g., any adjuster, account manager, supervisor, and/or risk manager associated with one or more claims in the corresponding plurality of claims for the instance of the claim review).

In some embodiments, the historical record is a revision history that can be viewed (e.g., accessed) by any user in the plurality of users (e.g., any adjuster, account manager, supervisor, and/or risk manager associated with one or more claims in the corresponding plurality of claims for the instance of the claim review).

In some embodiments, the plurality of revisions includes at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, at least 500, at least 600, at least 700, at least 800, at least 900, at least 1000, at least 2000, at least 3000, at least 4000, or at least 5000 revisions. In some embodiments, the plurality of revisions comprises no more than 10,000, no more than 5000, no more than 2000, no more than 1000, no more than 500, no more than 200, no more than 100, no more than 50, no more than 40, no more than 30, no more than 20, or no more than 10 revisions. In some embodiments, the plurality of revisions comprises from 2 to 10, from 5 to 30, from 3 to 8, from 10 to 50, from 20 to 500, from 100 to 2000, or from 200 to 10,000 revisions. In some embodiments, the plurality of revisions falls within another range starting no lower than 2 users and ending no higher than 10,000 revisions.

In some embodiments, the plurality of revisions includes two or more revisions performed at a respective two or more time points in a period of time. For instance, in some embodiments, two or more revisions in the plurality of revisions are performed over a period of time (e.g., where a first revision in the plurality of revisions is performed at a first time point and a second revision in the plurality of revisions is performed at a second time point that is a duration of time after the first time point.

In some embodiments, the duration of time is at least 1, at least 2, at least 3, at least 4, at least 5, at least 6, at least 7, at least 8, at least 9, at least 10, at least 11, at least 12, at least 15, at least 18, at least 21, or at least 24 hours. In some embodiments, the duration of time is at least 1, at least 2, at least 3, at least 4, at least 5, at least 6, or at least 7 days. In some embodiments, the duration of time is at least 1, at least 2, at least 3, or at least 4 weeks. In some embodiments, the duration of time is at least 1, at least 2, at least 3, at least 4, at least 5, at least 6, at least 7, at least 8, at least 9, at least 10, at least 11, or at least 12 months. In some embodiments, the duration of time is at least 1, at least 2, at least 3, at least 4, at least 5, at least 6, at least 7, at least 8, at least 9, at least 10, at least 15, at least 20, at least 25, or at least 30 years. In some embodiments, the duration of time is no more than 50, no more than 40, no more than 30, no more than 20, no more than 10, no more than 5, or no more than 1 year. In some embodiments, the duration of time is no more than 12, no more than 8, no more than 6, no more than 4, no more than 3, no more than 2, or no more than 1 month. In some embodiments, the duration of time is no more than 4, no more than 3, no more than 2, or no more than 1 week. In some embodiments, the duration of time is no more than 7, no more than 5, no more than 3, or no more than 1 day. In some embodiments, the duration of time is no more than 24, no more than 20, no more than 18, no more than 15, no more than 12, no more than 6, no more than 3, or no more than 1 hour. In some embodiments, the duration of time is from 1 hour to 1 day, from 1 day to 1 week, from 1 week to 1 month, or from 1 month to 1 year. In some embodiments, the duration of time falls within another range starting no lower than 1 hour and ending no higher than 50 years.

Annotations.

Referring to Block 218, in some embodiments, the customizable user interface further comprises a fifth affordance for modifying an annotation to the instance of the claim review. In some embodiments, the method further includes, upon user selection of the fifth affordance, updating the instance of the claim review by modifying an annotation to the instance of the claim review. In some embodiments, the annotation is a user-inputted alphanumeric string (e.g., a text string).

Figure 19A:
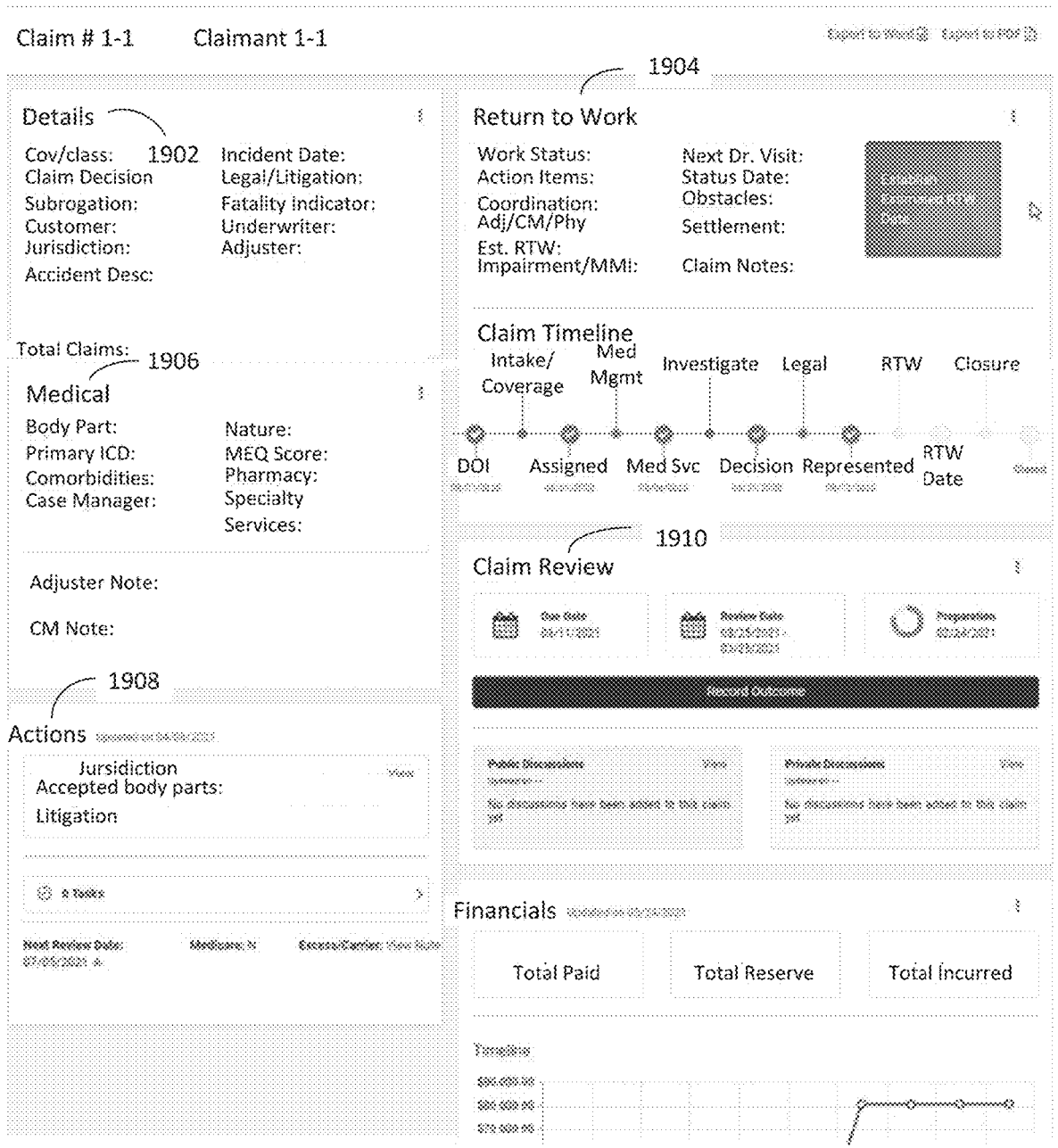
Figure 19B:
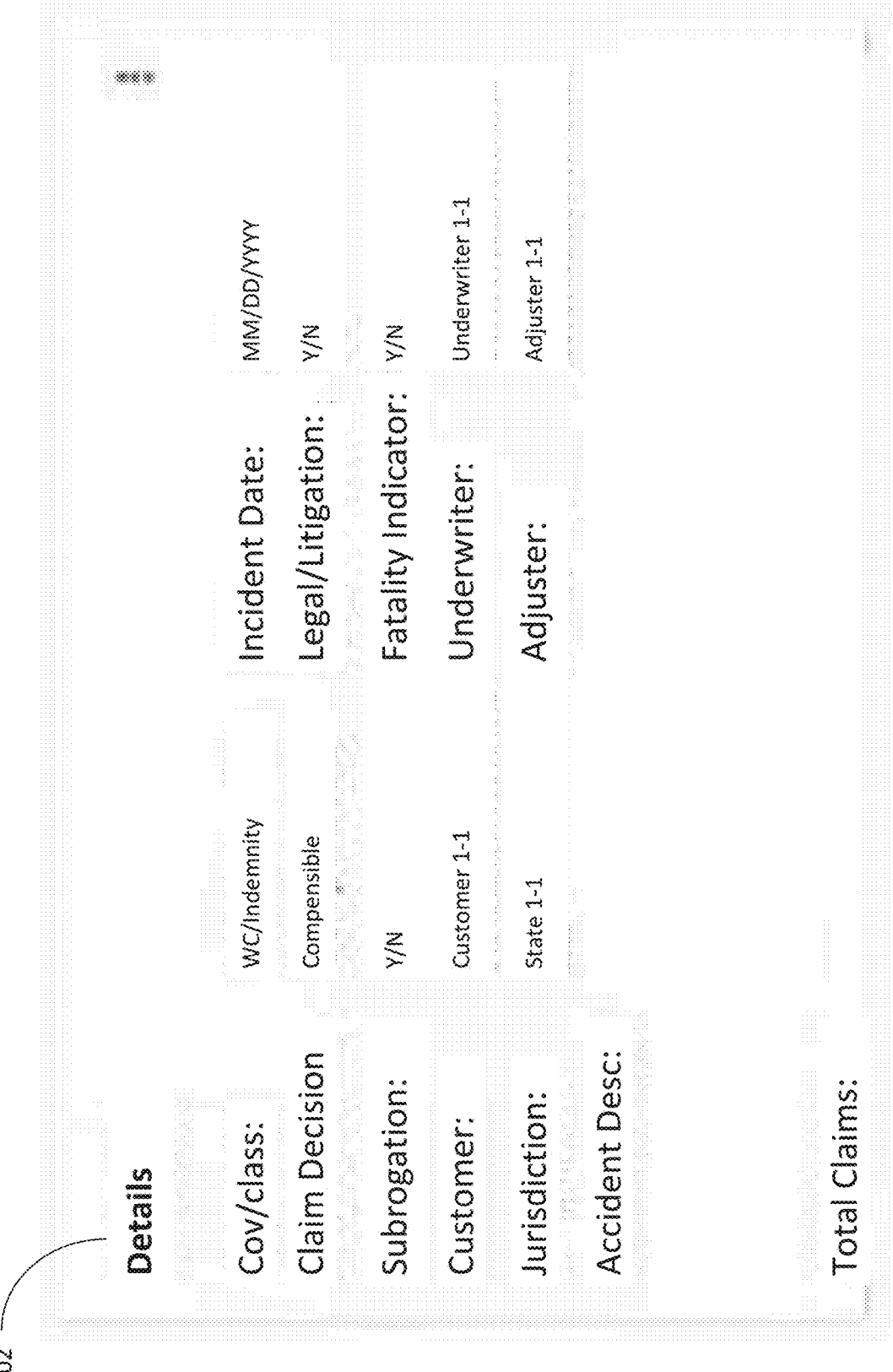
Figure 19C:
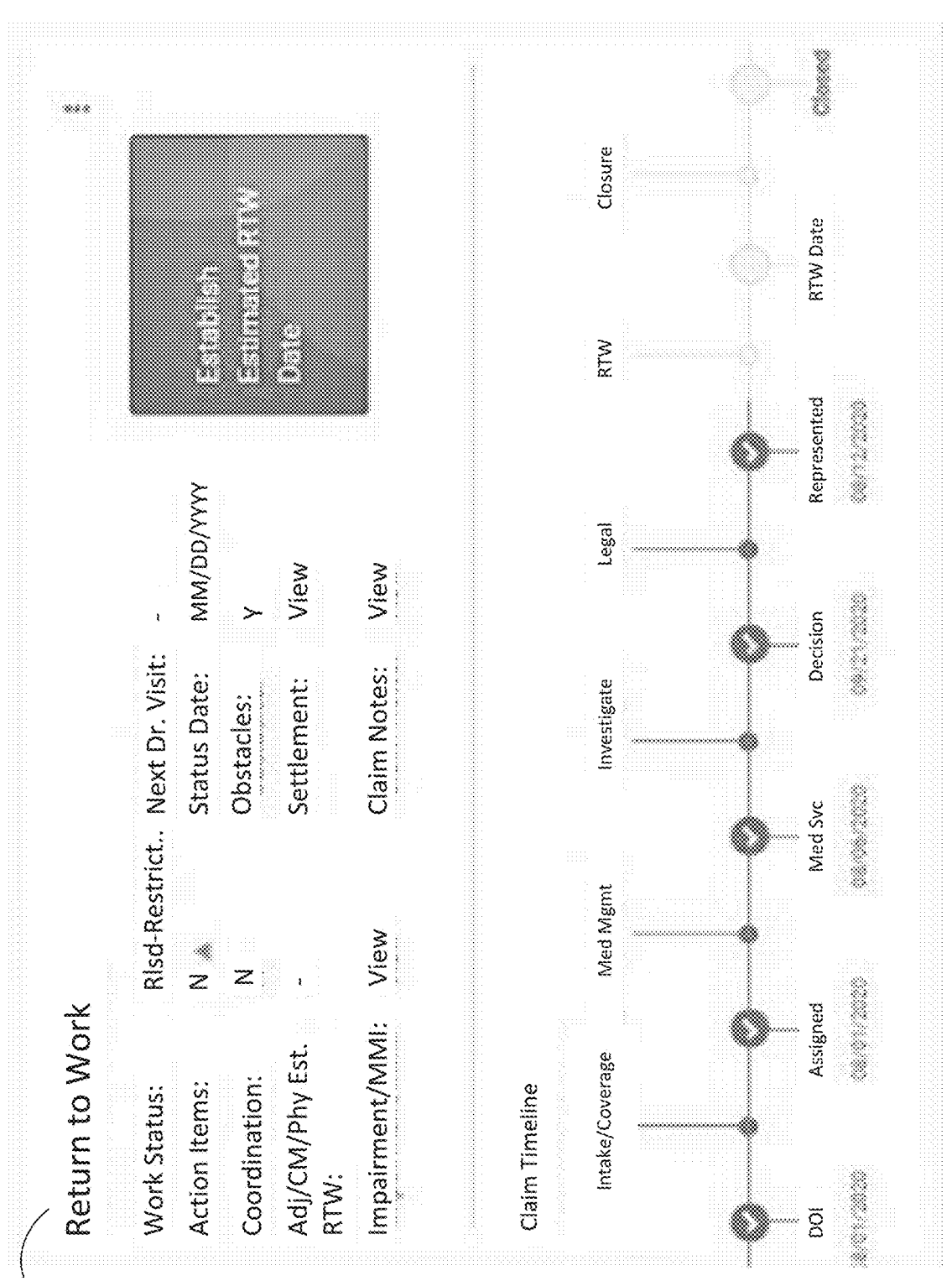
Figure 19D:
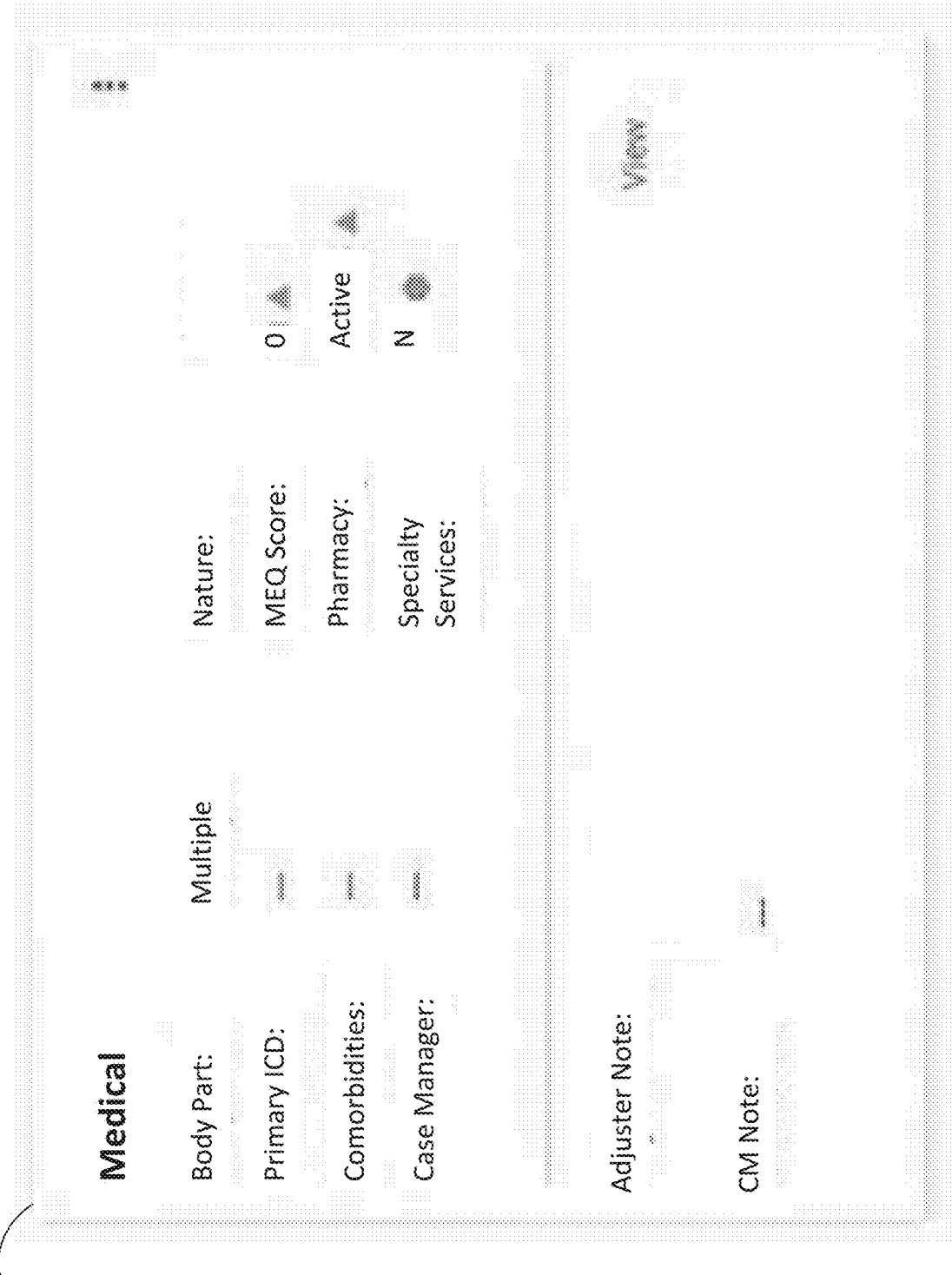
Figure 19E:
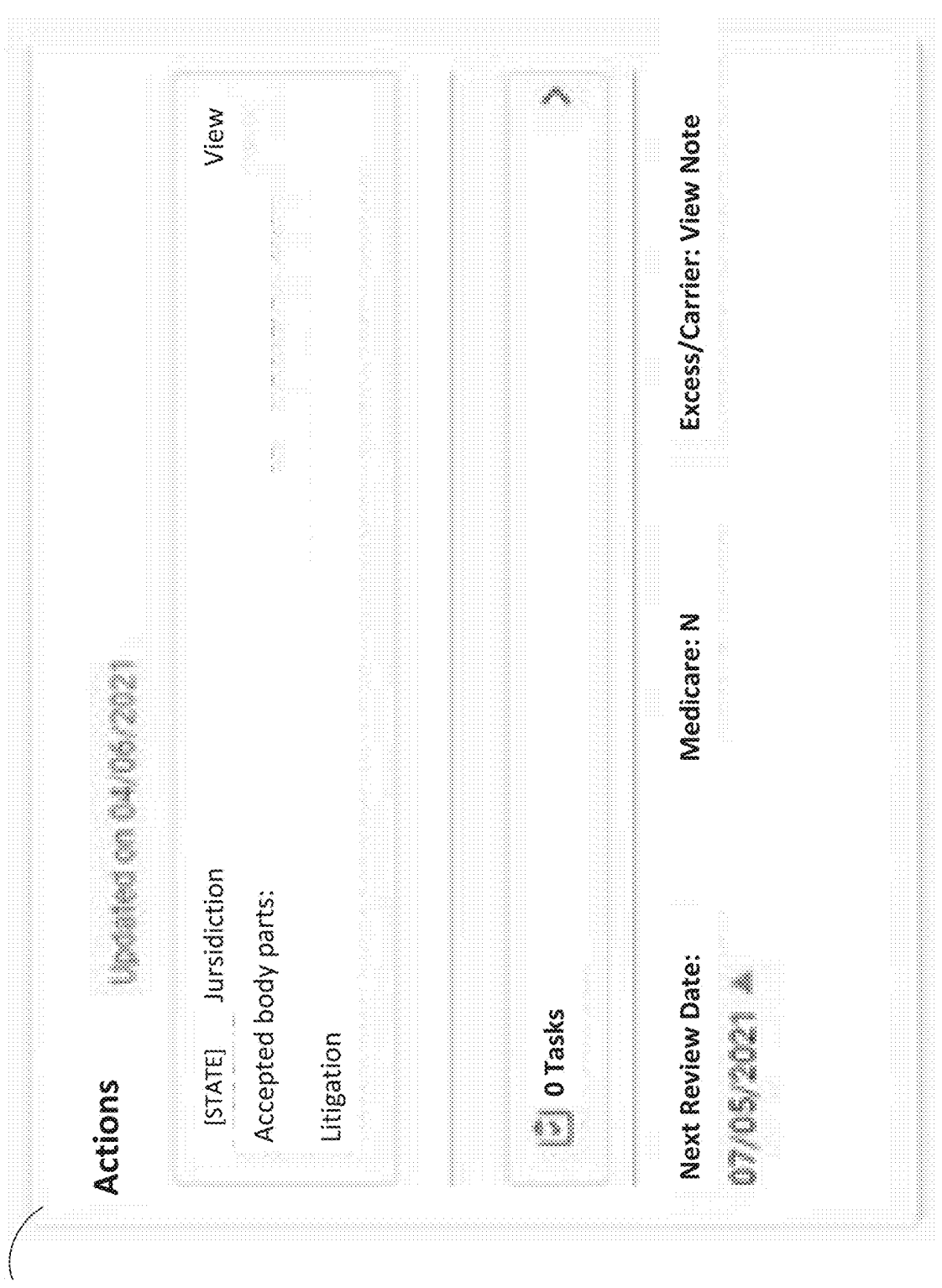
Figure 19F:
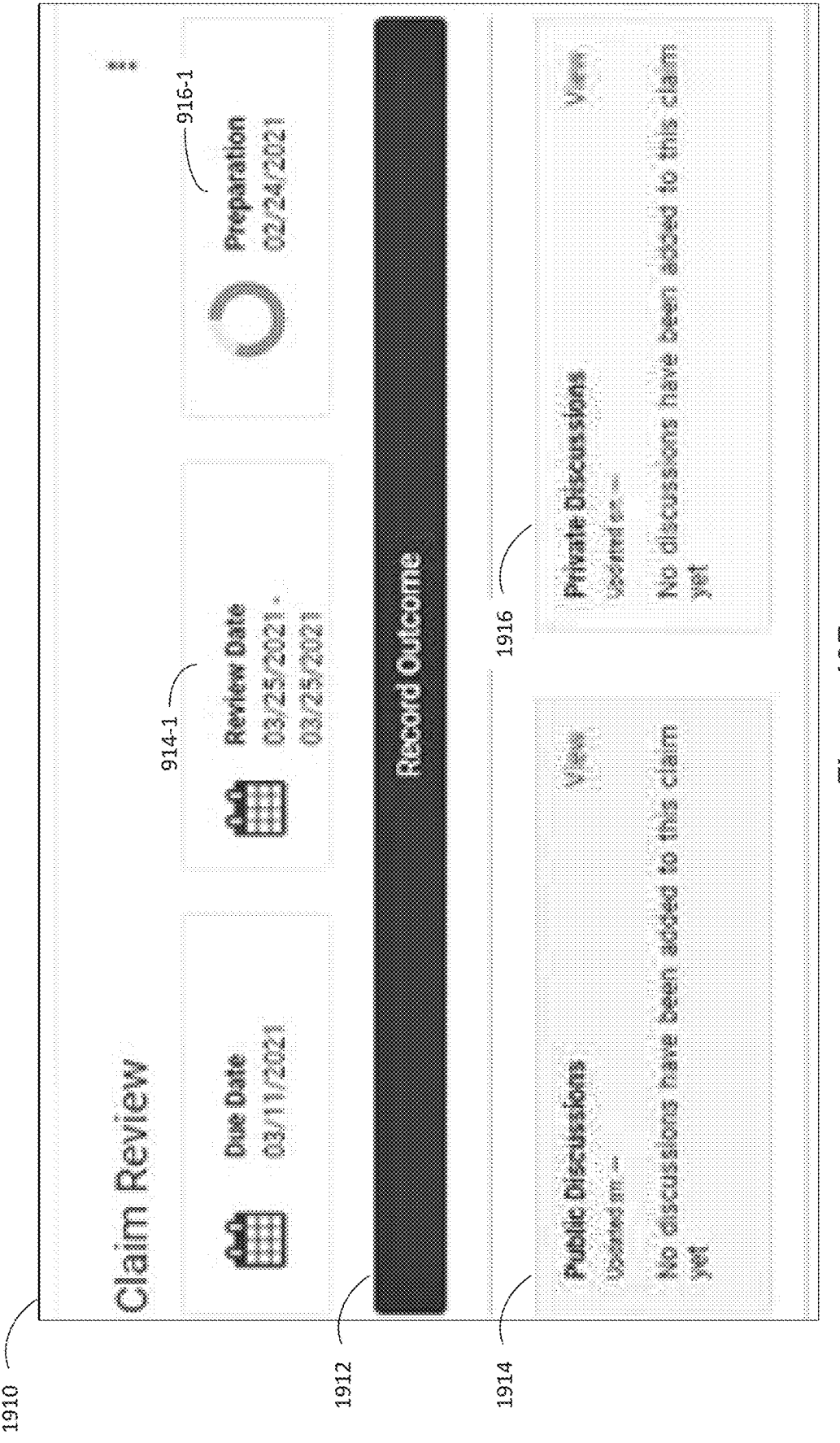

In some embodiments, referring to Block 220, the annotation is accessible only to the first user. For example, in some implementations, an annotation to the instance of the claim review is a private discussion 1916, as illustrated in FIG. 19F. In some embodiments, referring to Block 222, the annotation is accessible to each respective user in the plurality of users. For example, in some implementations, an annotation to the instance of the claim review is a public discussion 1914, as illustrated in FIG. 19F. Thus, in some such implementations, a public discussion is accessible (e.g., viewable) by any user in the plurality of users (e.g., any adjuster, account manager, supervisor, and/or risk manager associated with one or more claims in the corresponding plurality of claims for the instance of the claim review). In some embodiments, referring to FIG. 1, the annotation 142 for a respective claim review 130 is stored, in electronic form, in a data store, such as in claim review data construct 128 in a system 100.

Private discussions include, but are not limited to, personal notes, reminders, and/or private comments applied by a respective user to an instance of a claim review. Public discussions include, but are not limited to, shared comments, shared notes, meeting minutes, and/or public information related to the instance of the claim review that is relevant to all users in the plurality of users (e.g., users associated with the instance of the claim review). In some embodiments, the updating the instance of the claim review by modifying an annotation to the instance of the claim review provides a method for recording, compiling, storing, and/or cataloging all relevant notes, comments, and information related to a respective instance of a claim review. Thus, the updating the instance of the claim review by modifying an annotation to the instance of the claim review advantageously maintains an updated and centralized record of the relevant information across all users in the plurality of users associated with the instance of the claim review.

In some embodiments, an annotation can be modified at any point during the claim review process, including before, during, and/or after the review date for the instance of the claim review, and/or before, during, and/or after resolution of the corresponding plurality of claims for the instance of the claim review.

In some embodiments, the instance of the claim review comprises a plurality of annotations. In some embodiments, the plurality of annotations comprises at least a first annotation generated by a first respective user in the plurality of users and at least a second annotation generated by a second respective user in the plurality of users. In some embodiments, the plurality of annotations comprises at least a respective annotation for each respective user in the plurality of users. In some embodiments, the plurality of annotations includes at least 2, at least 3, at least 4, at least 5, at least 6, at least 7, at least 8, at least 9, at least 10, at least 15, at least 20, at least 25, at least 30, at least 35, at least 40, at least 45, at least 50, at least 60, at least 70, at least 80, at least 90, at least 100, at least 200, at least 300, at least 400, or at least 500 annotations. In some embodiments, the plurality of annotations comprises no more than 1000, no more than 500, no more than 200, no more than 100, no more than 50, no more than 40, no more than 30, no more than 20, or no more than 10 annotations. In some embodiments, the plurality of annotations comprises from 2 to 10, from 5 to 30, from 10 to 50, from 20 to 500, from 100 to 200, from 200 to 500, from 10 to 100, or from 80 to 1000 annotations. In some embodiments, the plurality of annotations falls within another range starting no lower than 2 annotations and ending no higher than 1,000 annotations.

Modifying Claim Reviews.

Referring to Block 224, in some embodiments, the customizable user interface further comprises a sixth affordance for modifying the corresponding plurality of claims corresponding to the instance of the claim review. In some embodiments, the method further includes, upon user selection of the sixth affordance, updating the instance of the claim review by modifying the corresponding plurality of claims, corresponding to the instance of the claim review.

In some embodiments, the modifying the corresponding plurality of claims comprises adding a claim to the corresponding plurality of claims. In some embodiments, the modifying the corresponding plurality of claims comprises removing a claim from the corresponding plurality of claims.

In some embodiments, the adding a claim to the corresponding plurality of claims comprises applying a second customizable template to the instance of the claim review, where the second customizable template specifies a subset of candidate claims in a plurality of candidate claims associated with both the first and the second entity, thereby obtaining one or more candidate claims, and adding the one or more candidate claims to the instance of the claim review. In some embodiments, the removing a claim from the corresponding plurality of claims comprises selecting one or more claims in the corresponding plurality of claims and deleting the one or more claims from the corresponding plurality of claims.

In some embodiments, the modifying the corresponding plurality of claims comprises editing a claim in the corresponding plurality of claims. In some embodiments, the modifying the corresponding plurality of claims comprises updating a status corresponding to a respective claim in the corresponding plurality of claims (e.g., marking a claim as "complete").

In some embodiments, the modifying the corresponding plurality of claims comprises recording a personnel change for a respective claim in the corresponding plurality of claims. Personnel changes include, but are not limited to, adding a user associated with the respective claim and/or removing a user associated with the respective claim. For example, in some embodiments, a personnel change includes adding or removing a nurse, a legal counsel, an adjuster, an account manager, a supervisor, and/or a risk manager associated with a respective claim.

In some embodiments, the modifying the corresponding plurality of claims comprises updating a feature for a respective claim in the corresponding plurality of claims. For example, as described above, features for a respective claim include, but are not limited to, any of the one or more features included in the summary for the respective claim. In some embodiments, the one or more features include a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a supervisor, a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars).

In some embodiments, a feature for a respective claim in the corresponding plurality of claims is selected from the group consisting of claim details, medical information, actions, return to work, claim timeline, financial, and claim review. In some embodiments, a feature for a respective claim in the corresponding plurality of claims is any of the features disclosed herein, such as any of the features described in the section entitled "Claim Summaries," below.

In some embodiments, the corresponding plurality of claims corresponding to the instance of the claim review can be modified at any point during the claim review process, including before, during, and/or after the review date for the instance of the claim review, and/or before, during, and/or after resolution of the corresponding plurality of claims for the instance of the claim review.

Claim Summaries.

Referring to Block 226, in some embodiments, the customizable user interface further comprises, for each respective claim in the one or more claims for the instance of the claim review, a corresponding respective affordance for expanding the summary of the respective claim to an expanded summary of the respective claim, wherein the expanded summary of the respective claim includes a corresponding one or more features of the respective claim not displayed prior to the expanding. For instance, FIG. 18 illustrates a corresponding respective affordance 1802 for expanding the summary of a respective claim.

Similarly, as illustrated in FIG. 6, in some embodiments, the customizable user interface further comprises, for each respective candidate claim in the plurality of candidate claims 610, a corresponding respective affordance 614 for expanding the summary of the respective candidate claim to an expanded summary of the respective candidate claim.

In some embodiments, the expanded summary of the respective claim (and/or candidate claim) is displayed as a new display (e.g., a new window, a new tab, or an overlay display such as a popup window). In some embodiments, the new display has an affordance for canceling the new display of the expanded feature information (e.g., a close-out or exit button, a back button, etc.). In some embodiments, the new display of the expanded feature information is canceled by user interaction (e.g., clicking a mouse) on a portion of the display that does not contain the expanded feature information (e.g., for an overlay display or popup window, the display of the expanded feature information can be canceled by clicking anywhere on the screen outside of the popup window). In some embodiments, the expanded summary of the respective claim (and/or candidate claim) is displayed as a transitory display where visibility is dependent on instant or present user interaction. For example, in some embodiments, the expanded feature information is presented as an overlay only when a user directs a pointer (e.g., a mouse) to a specific location on the display. When the user moves the pointer to a different location on the display, the overlay is removed.

In some embodiments, each feature in the corresponding one or more features is selected from the group consisting of claim details, medical information, actions, return to work, claim timeline, financial, and/or claim review. For example, FIG. 19A illustrates an example expanded summary of a respective claim obtained by selection of an affordance 1802. The expanded summary of the respective claim displays a dynamic dashboard summary page that includes details 1902, medical 1906, actions 1908, return to work 1904 including a claim timeline, claim review 1910, and financial information. Details of example features are further illustrated in FIGS. 19B-19G.

In some embodiments, details 1902 includes information related to a respective claim. In some embodiments, details 1902 includes claim information and/or data corresponding to claim coverage or class (e.g., worker's compensation, indemnity, and/or liability), incident date, claim decision (e.g., compensable, not compensable, etc.), legal/litigation (e.g., yes/no), subrogation (e.g., yes/no), fatality indicator (e.g., yes/no), customer (e.g., name and/or identity of customer), underwriter (e.g., name and/or identity of company), jurisdiction (e.g., U.S. state), adjuster (e.g., name and/or identity), and/or accident description.

In some embodiments, return to work 1904 includes information related to return to work, including claim information and/or data corresponding to work status (e.g., full, off, partial, restricted, etc.), next doctor's visit, previous doctor's visit, action items, status date, coordination, obstacles, settlement (e.g., including a user affordance to view settlement information), impairment (e.g., including a user affordance to view impairment information), and/or claim notes (e.g., including a user affordance to view claim notes). In some embodiments, return to work 1904 further includes a claim timeline comprising an indication of the progress of the respective claim throughout a claim processing workflow (e.g., a graphical representation such as a status bar and/or a visual timeline, where progress is indicated by, e.g., coloring and/or solid shading). In some embodiments, the indication of the progress includes a plurality of checkpoints (e.g., date of inception (DOI), intake/coverage, assigned (e.g., to a user such as an adjuster and/or a case manager), medical management, medical service, investigation, decision, legal, represented, return to work (RTW), RTW date, closure, and/or closed). In some embodiments, a respective checkpoint in the plurality of checkpoints includes a corresponding date on which the claim passed the respective checkpoint during the claim processing workflow.

In some embodiments, medical 1906 includes medical information related to a claim, including body part, nature of injury, number of injuries, number of body parts, fractures, comorbidities, case manager, MEQ score, pharmacy (e.g., active/not active), specialty services, and/or additional notes (e.g., adjuster notes and/or case manager notes).

In some embodiments, actions 1908 includes information related to actions, including claim information and/or data corresponding to jurisdiction (e.g., U.S. state), accepted body parts, litigation, tasks, next review date, Medicare, excess/carrier notes, and/or changes in personnel (e.g., adding or removing a user such as a nurse or a legal counsel).

In some embodiments, financial includes financial information including date updated, total paid, total reserve, and/or total incurred (e.g., costs). In some embodiments, financial further includes a graphical representation of a timeline of financial actions and/or financial history.

In some embodiments, claim review 1910 includes information related to an instance of a claim review including the respective claim. For instance, in some embodiments, claim review 1910 includes data corresponding to past claim reviews and/or current claim reviews, including preparation status of the respective claim, completion status of an instance of a claim review, claim due date, claim review date, public discussions, private discussions, and/or outcomes. In some embodiments, claim review 1910 further includes an affordance for viewing and/or editing any of the features in the claim review section, including public discussions, private discussions, and/or outcomes.

In some embodiments, the expanded summary of the respective claim comprises a respective recording affordance for recording an outcome, and the method further comprises, upon user selection of the respective recording affordance, recording an outcome of a respective claim review corresponding to the respective claim. For instance, as illustrated in FIGS. 19F-G, the customizable user interface further displays an affordance for recording an outcome for the instance of the claim review 1912. In some implementations, the recording an outcome for the instance of the claim review comprises selecting a topic for the outcome and, optionally, adding one or more notes (e.g., comments) for the outcome. In some embodiments, the outcome (e.g., the topic for the outcome) is selected from the group consisting of financial, litigation, medical, return to work, settlement, subrogation, and other.

In some embodiments, the corresponding one or more features further includes claim information and/or data corresponding to clinical modeling, documents, drug history, guidelines, notes, pharmacy, treatment calendar, and/or utilization management.

In some embodiments, the expanded summary of the respective claim (and/or candidate claim) further includes an affordance for viewing and/or editing any of the features in the one or more features for the respective claim.

In some embodiments, the customizable user interface further includes any visual indicators of one or more elements (e.g., features, affordances, claim reviews, claims, claim summaries, actions, statuses, annotations, events, data, and/or other any other aspects or embodiments of the present disclosure, as disclosed herein). In some embodiments, visual indicators include graphical representations of any of the abovementioned features. In some embodiments, visual indicators include text-based representations of any of the abovementioned features. In some embodiments, a visual indicator is an alphanumeric character, a string of alphanumeric characters, a shape, an image, a color, and/or a pattern. In some embodiments, a graphical representation includes heatmaps, bar graphs, density plots, dot plots, line graph, area graph, scatter plot, box and whisker plot, violin plot, histogram, pie chart, and/or any form of graphical representation as will be apparent to one skilled in the art.

In some embodiments, a user interaction is used to view and/or display one or more elements (e.g., features, affordances, claim reviews, claims, claim summaries, actions, statuses, annotations, events, data, and/or other aspects or embodiments of the present disclosure, as disclosed herein) in the customizable user interface. In some embodiments, a user interaction includes clicking on an element (e.g., a claim summary) to view expanded element information (e.g., an expanded summary). In some embodiments, a user interaction includes hovering a pointer (e.g., a mouse) over an element to view expanded element information.

In some embodiments, upon receiving a user interaction, the display displays a change in a visual indicator. For example, where a visual indicator is an alphanumeric character, a string of alphanumeric characters, a shape, an image, a color, and/or a pattern, a change in a visual indicator can include a change in the alphanumeric character, the string of alphanumeric characters, the shape, the image, the color, and/or the pattern. In some such embodiments, the change in the visual indicator includes a change in the intensity, size, thickness, and/or formatting of any of the above visual indicators. In some embodiments, the change in a visual indicator upon receiving a user interaction includes displaying a visual indicator where a visual indicator was not previously displayed.

In some embodiments, other features are customizable and/or user interactive, as will be apparent to one skilled in the art. In some embodiments, the customization and/or user interaction is performed using any of the user inputs and/or affordances disclosed herein, and/or any substitutions, modifications, additions, deletions, and/or combinations thereof. Dynamic Scheduling.

In some embodiments, the claim review is in a plurality of claim reviews, and the method further comprises repeating the receiving, applying, accessing, and displaying, for an additional claim review in the plurality of claim reviews. In some embodiments, any of the aspects and embodiments disclosed herein for an instance of a claim review are contemplated for each respective claim review in a plurality of claim reviews, or any substitutions, modifications, additions, deletions, and/or combinations thereof, as will be apparent to one skilled in the art.

For example, in some embodiments, the customizable user interface further comprises a third affordance for selecting a review schedule, and the method further comprises, for each respective claim review in the plurality of claim reviews, upon user selection of the third affordance, assigning a review schedule to the instance of the respective claim review, thereby scheduling the respective claim review.

In some embodiments, the customizable user interface further displays, for each respective claim review in the plurality of claim reviews, a review date for the instance of the respective claim review.

In some embodiments, the customizable user interface further displays, for each respective claim review in the plurality of claim reviews, an indication of one or more personnel assigned to the review date for the instance of the respective claim review (e.g., an adjuster, a supervisor, an account manager, a risk manager, a nurse, and/or a legal counsel). For example, in some such embodiments, the customizable user interface displays an indication of one or more individuals that will attend the review meeting at the date and time indicated by the review schedule for the instance of the respective claim review.

In some embodiments, the customizable user interface displays an affordance for sorting and/or filtering the plurality of claim reviews using one or more filtering criteria, and the method further comprises specifying an order and/or a subset of one or more claim reviews in the plurality of claim reviews. In some embodiments, the one or more filtering criteria include a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a supervisor, a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars). In some embodiments, the one or more filtering criteria include any of the filtering criteria disclosed herein (see, for example, the section entitled "Claim Reviews," above).

In some embodiments, the plurality of claim reviews is sorted and/or filtered according to the review schedule for each respective claim review in the plurality of claim reviews. In some embodiments, the plurality of claim reviews is sorted and/or filtered according to the order of review of each claim review in the plurality of claim reviews. For example, in some embodiments, the method further comprises specifying (i) an order and (ii) a subset of the plurality of claim reviews based on the review date for the respective instance of each respective claim review in the plurality of claim reviews. In some embodiments, the method comprises specifying (i) an order and (ii) a subset of the plurality of claim reviews based on the meeting time, meeting duration, start time, and/or end time for the respective instance of each respective claim review in the plurality of claim reviews.

In some embodiments, the review schedule for an instance of each respective claim review in the plurality of claim reviews is viewable by any user in the plurality of users (e.g., any adjuster, account manager, supervisor, and/or risk manager associated with one or more claims in the corresponding plurality of claims for the instance of the claim review). For example, in some embodiments, the plurality of claim reviews is displayed as a list, calendar, or schedule.

In some embodiments, the method includes, for a respective user in the plurality of users, selecting, removing, adding, and/or editing any of the claim reviews in the plurality of claim reviews. Any of the aspects and embodiments disclosed herein for generating a claim review, modifying a claim review, adding claims, removing claims, editing claims, updating a criterion, updating a historical record, updating a claim review status (e.g., a completion status), modifying an annotation, and/or modifying a feature for a claim are contemplated for each respective claim review in the plurality of claim reviews, or any substitutions, modifications, additions, deletions, and/or combinations thereof, as will be apparent to one skilled in the art.

Thus, referring to Block 300 of FIG. 3, another aspect of the present disclosure provides a method for dynamically scheduling a claim review, at a computer system having a display, one or more processors, and memory storing one or more programs for execution by the one or more processors. Referring to Block 302, the method includes, for a respective claim review in a plurality of claim reviews, receiving a request to display an instance of the respective claim review, where the request is generated by a first user in a plurality of users, each respective user in the plurality of users is associated with a first entity or a second entity, each respective claim review in the plurality of claim reviews comprises a respective independent set of claims in a plurality of claims, wherein each respective claim in the plurality of claims corresponds to a respective claimant in a plurality of claimants, and each claim in the plurality of claims is associated with both the first entity and the second entity.

Referring to Block 304, responsive to the request, a first customizable template is applied to the instance of the respective claim review, where the first customizable template specifies (i) an order and (ii) a subset of the independent set of claims in the instance of the respective claim review. Referring to Block 306, each respective claim in the respective independent set claims is accessed, in electronic form, from one or more data stores, to acquire a summary of the respective claim.

Referring to Block 308, the method further includes displaying, on the display, a customizable user interface comprising (i) a respective completion status for the instance of the respective claim review, (ii) for each respective claim in the respective independent set of claims, the summary of the respective claim, (iii) a first affordance for updating the respective completion status of the instance of the respective claim review, and (iv) a second affordance for updating a respective criterion for the instance of the respective claim review.

As described above, some aspects of the present disclosure provide receiving a request to display an instance of a claim review, where the request is generated by a first user in a plurality of users. In some such embodiments, the instance of the claim review is accessed via a system (e.g., in accordance with the exemplary system embodiments described above) for scheduling and/or visualization.

In some embodiments, the scheduling and/or visualization is performed on the display of a computer. In some embodiments, the scheduling and/or visualization is performed using a cloud-based interface such as an online portal. Thus, in some embodiments, the receiving, applying, accessing, and displaying is performed at a cloud computing infrastructure.

In some embodiments, some or all of the request and/or the instance of the claim review is transmitted from a first system (e.g., a first respective remote device for a first respective user in the plurality of users) to a second system (e.g., a second respective remote device for a second respective user in the plurality of users, in accordance with the exemplary system embodiments described above). In some embodiments, some or all of the request and/or the instance of the claim review is transmitted from a first system (e.g., a respective remote device for a respective user in the plurality of users) to a cloud-based interface, such as an online portal for performing the scheduling and/or visualization.

Referring to Block 228, in some embodiments, the method further comprises, for each respective user in the plurality of users, repeating the receiving, applying, accessing, and displaying. For example, as described above, in some embodiments, a respective user in the plurality of users is an adjuster, a supervisor, an account manager, a risk manager, a claimant, an employer, an individual associated with a risk management provider, an individual associated with a health care provider, a legal counsel, a nurse and/or medical professional, a case manager, a field investigator, a subrogation specialist, and/or other interested party involved in a claims management or claims processing workflow. See, above, the section entitled, "Users and Entities."

In some embodiments, the receiving a request to display an instance of a claim review includes, for each respective user in the plurality of users, receiving log-in credentials for the respective user, displaying, on the display, a respective index of claim reviews for the respective user, and detecting selection of a respective claim review from the index. In some embodiments, the log-in credentials for each respective user in the plurality of users are for an entity (e.g., a first entity and/or a second entity). In some embodiments, the log-in credentials for each respective user in the plurality of users are for an individual (e.g., an adjuster, a supervisor, an account manager, a risk manager, a claimant, an employer, an individual associated with a risk management provider, an individual associated with a health care provider, a legal counsel, a nurse and/or medical professional, a case manager, a field investigator, a subrogation specialist, and/or other interested party involved in a claims management or claims processing workflow).

In some embodiments, a plurality of requests can be received simultaneously from a plurality of users (e.g., where each user in the plurality of users is simultaneously logged on). In some embodiments, only one request at a time can be received from a user (e.g., only one user at a time can be logged on). In some embodiments, log-in credentials include a username and/or a password. In some embodiments, log-in credentials include an email address.

In some embodiment, the instance of the claim review is accessed, by each respective user in the plurality of users, at a respective remote device for the respective user (e.g., a computer, a smartphone, and/or a personal electronic device). In some embodiments, the instance of the claim review is accessed, by each respective user in the plurality of users, on the display of a computer. In some embodiments, the instance of the claim review is accessed, by each respective user in the plurality of users, using a cloud-based interface such as an online portal. Thus, in some embodiments, for each respective user in the plurality of users, the repeating the receiving, applying, accessing, and displaying is performed at a cloud computing infrastructure.

In some embodiments, some or all of the request and/or the instance of the claim review is transmitted from a first system (e.g., a first respective remote device for a first respective user in the plurality of users) to a second system (e.g., a second respective remote device for a second respective user in the plurality of users). In some embodiments, some or all of the request and/or the instance of the claim review is transmitted from a first system (e.g., a respective remote device for a respective user in the plurality of users) to a cloud-based interface, such as an online portal for performing the scheduling and/or visualization. In some embodiments, some or all of the request and/or the instance of the claim review is transmitted simultaneously from each respective system in a plurality of systems (e.g., each respective remote device for each respective user in the plurality of users) to a cloud-based interface, such as an online portal for performing the scheduling and/or visualization. In some embodiments, some or all of the request and/or the instance of the claim review is transmitted simultaneously from a cloud-based interface, such as an online portal, to each respective system in a plurality of systems (e.g., each respective remote device for each respective user in the plurality of users).

Thus, in some embodiments, the repeating the receiving, applying, accessing, and displaying is performed concurrently, and, for each respective user in the plurality of users, the instance of the claim review is accessible from a respective remote device for the respective user.

Referring to Block 230, in some embodiments, the method further includes, for each respective user in the plurality of users, updating the completion status for the instance of the claim review upon user selection of the first affordance by the respective user. Referring to Block 232, in some embodiments, the method further includes, when the instance of the claim review is updated, displaying an updated instance of the claim review on the customizable user interface, for each respective user in the plurality of users. Referring to Block 234, in some embodiments, the displaying the updated instance of the claim review on the customizable user interface is performed concurrently, and, for each respective user in the plurality of users, the updated instance of the claim review is accessible from a respective remote device for the respective user.

As an example, in an embodiment, the method includes, for a first respective user in the plurality of users (e.g., an adjuster), updating the completion status for the instance of the claim review when the first respective user marks the corresponding plurality of claims for the instance of the claim review as complete. For a second respective user in the plurality of users (e.g., an account manager), the completion status for the instance of the claim review is further updated when the second respective user submits the instance of the claim review to a third respective user (e.g., a risk manager for review). Additionally, for a third respective user in the plurality of users (e.g., a risk manager), the completion status for the instance of the claim review is further updated when the third respective user finalizes the instance of the claim review. The method further includes, each time the instance of the claim review is updated, displaying an updated instance of the claim review on the customizable user interface, for each respective user in the plurality of users, such that the first respective user, second respective user, and third respective user are able to access the updated instance on a customizable user interface. Displaying the updated instance of the claim review on the customizable user interface is performed concurrently for each of the first, second, and third users, such that each respective user is able to access the updated instance of the claim review, simultaneously, from a respective remote device.

In some embodiments, the instance of the claim review is updated when any modification is made to any of the features, affordances, claim reviews, claims, claim summaries, actions, statuses, annotations, events, data, and/or other aspects or embodiments of the present disclosure, as disclosed herein.

In some embodiments, the method further includes, when the instance of the claim review is updated, notifying each user in the plurality of users that an updated instance of the claim review is available. In some embodiments, the notifying each user in the plurality of users comprises generating a notification in the customizable user interface for the respective user. In some embodiments, a notification is an email, text message, phone call, a banner, an indicator, a highlight, and/or a flag (e.g., on an icon for a smartphone or a user interface). In some embodiments, the notification is displayed on a "notifications" page in the customizable user interface (e.g., a claim alerts page). In some embodiments, the notification further includes an indication of a number of updates (e.g., for a plurality of claims and/or a plurality of claim reviews).

As described above, in some embodiments, responsive to receiving the request to display the instance of the claim review, the first customizable template applied to the instance of the claim review is selected, from a plurality of first customizable templates, based on the identity of the first user.

For example, as described above, FIG. 9 illustrates a respective first customizable template applied to a respective instance of a claim review for a respective first user in a plurality of users (e.g., "user 1," 502), FIGS. 20A-B collectively illustrate a respective first customizable template applied to a respective instance of a claim review for a different respective first user in the plurality of users (e.g., "user 2," 2002), and FIGS. 21A-B collectively illustrate a respective first customizable template applied to a respective instance of a claim review for still another respective first user in the plurality of users (e.g., "user 3," 2102), where each of the respective first customizable templates applied to the respective instance of the claim review for users 1, 2, and 3 display an independent set of affordances for performing actions to the respective instance of the claim review.

In some embodiments, a respective first customizable template in the plurality of first customizable templates has a respective independent set of affordances for performing actions to a respective instance of a claim review, where each affordance in the respective independent set of affordances for the respective first customizable template is the same or different from an affordance in a corresponding independent set of affordances for any other first customizable template in the plurality of first customizable templates. In other words, in some embodiments, a respective first customizable template applied to an instance of a claim review for a respective user in the plurality of users displays the same or different affordances for performing actions, or a combination thereof, as any other user in the plurality of users (e.g., the customizable user interface displayed for a respective user can have similarities and/or differences from any other customizable user interface displayed for any other user in the plurality of users). Thus, referring again to FIGS. 9, 20A-B, and 21A-B, in an example embodiment, user 1 is an account manager, user 2 is an adjuster, and user 3 is a risk manager, and the respective first customizable template applied to the instance of the claim review for each respective user in the plurality of users is selected, from a plurality of first customizable templates, based on the identity of the respective user.

FIG. 20A illustrates a respective customizable user interface 2004 for a respective user 2002 (e.g., "User 2"). In some embodiments, user 2002 is an adjuster associated with a first entity. The customizable user interface 2004 includes, for example, an index of claim reviews 2006 (e.g., 2006-1, 2006-2), and, for each respective claim review in the index of claim reviews, a corresponding review date, a corresponding due date, a number of claims, an account manager, a title, a pay customer identity, and/or a scheduled date. The customizable user interface 2004 further includes affordances for viewing, sorting, filtering (e.g., specifying an order and/or a subset), and/or editing the index of claim reviews. The customizable user interface 2004 further includes an affordance 2008 for displaying, on the display, an instance of a claim review (e.g., claim review 2006-1). For example, as illustrated in FIG. 20B, selection of the affordance 2008 for displaying an instance of claim review

2006-1 displays, on the display, a corresponding index of claims for the instance of the claim review, where each respective claim in the corresponding index of claims includes a summary of the respective claim and an affordance 2010 for expanding the summary of the respective claim to an expanded summary of the respective claim, where the expanded summary of the respective claim includes a corresponding one or more features of the respective claim not displayed prior to the expanding. Expanded claim summaries contemplated for use in the present disclosure are further described in the section entitled "Claim Summaries," above. Displaying an instance of claim review 2006-1 further displays an affordance for updating the completion status of the instance of the claim review (e.g., "Complete"). Thus, each respective claim review in the index of claim reviews has an affordance for marking the respective claim review as "Complete." When each respective claim in the corresponding index of claims for the instance of the claim review is marked as complete (e.g., prepared for review by an adjuster), then the claim review is ready to be finalized, submitted for review, and/or scheduled for a review meeting.

FIG. 21A illustrates a respective customizable user interface 2104 for a respective user 2102 (e.g., "User 3"). In some embodiments, user 2002 is a risk manager associated with a second entity. The customizable user interface 2104 includes, for example, an affordance for viewing a plurality of candidate claims 2106, an affordance for viewing one or more saved claims 2108, an affordance for viewing an index of claim reviews 2110, and/or an affordance for viewing a plurality of reminders 2112. Selection of the affordance for viewing a plurality of candidate claims 2106 displays, on the display, a plurality of candidate claims associated with the respective user 2102 (e.g., candidate claims 2114-1, 2114-2). The customizable user interface 2104 further includes, for each respective candidate claim in the plurality of candidate claims, a respective affordance 2116 for expanding the summary of the respective claim to an expanded summary of the respective claim, where the expanded summary of the respective claim includes a corresponding one or more features of the respective claim not displayed prior to the expanding. Expanded claim summaries contemplated for use in the present disclosure are further described in the section entitled "Claim Summaries," above. As illustrated in FIG. 21B, selection of the affordance for viewing an index of claim reviews 2110 displays, on the display, the index of claim reviews 2118 (e.g., 2118-1, 2118-2) associated with the respective user 2102, where each instance of a respective claim review in the index of claim reviews includes a corresponding index of claims and each respective claim in the corresponding index of claims includes a summary of the respective claim. In some embodiments, the respective customizable user interface for the respective user 2102 further includes, for each respective instance of a claim review in the index of claim reviews, an affordance for updating the completion status, an affordance for updating a criterion, an affordance for selecting a review schedule, an affordance for displaying a historical record, an affordance for modifying an annotation, and/or an affordance for modifying the corresponding index of claims.

In some embodiments, a first user in the plurality of users can access an account for a second user in the plurality of users. For example, in some embodiments, a supervisor, account manager, and/or a risk manager can view the accounts of one or more adjusters.

In some embodiments, a respective user in the plurality of users has a specified time frame within which to complete one or more tasks associated with the respective user. In some embodiments, each respective user in the plurality of users has a specified time frame within which to complete one or more tasks associated with the respective user. In an example implementation, an adjuster has a specified due date by which each respective claim in the corresponding plurality of claims for a respective instance of a claim review is due to be prepared for review (e.g., marked as complete). In another example implementation, an account manager has a specified review date by which a respective instance of a claim review is due to be scheduled (e.g., submitted for review, finalized, and/or scheduled). In some embodiments, the specified time frame for each respective user in the plurality of users is the review date (e.g., all updates to completion status, including completed, submitted for review, finalized, and/or scheduled, are to be performed prior to the review date).

An example workflow for dynamic scheduling for a plurality of users, including an adjuster, supervisor, account manager and a risk manager, is provided herein, in accordance with an embodiment of the present disclosure. The method includes generating an instance of a claim review by specifying a subset of candidate claims in a plurality of candidate claims associated with both a first and a second entity (e.g., a risk management provider and an employer), thereby obtaining one or more candidate claims. Prior to adding the one or more candidate claims to the instance of the claim review, an approval of the one or more candidate claims is obtained from at least the account manager associated with the first entity (e.g., the risk management provider) and the risk manager associated with the second entity (e.g., the employer). After the account manager and the risk manager have agreed on the one or more candidate claims, the one or more candidate claims are added to the instance of the claim review, thereby populating the claim review with the corresponding plurality of claims. In some implementations, the method further includes obtaining an approval of a criterion (e.g., a program discussion topic) for the instance of the claim review from at least the account manager and the risk manager.

Addition of the corresponding plurality of claims to the instance of the claim review updates the customizable user interface of each user in the plurality of users, including a respective adjuster associated with (e.g., assigned to) one or more claims in the corresponding plurality of claims. The adjuster then performs one or more of the following actions: displaying a historical record, modifying an annotation (e.g., adding a private discussion and/or a public discussion), modifying one or more claims in the corresponding plurality of claims, and/or expanding the summary of a respective claim to an expanded summary of the respective claim. For example, an adjuster displays, by selection of an affordance for expanding the summary of a respective claim, an expanded summary of the respective claim. The expanded summary of the respective claim includes a plurality of features for the respective claim, which the adjuster reviews, updates, annotates, confirms, and/or performs any other appropriate actions for the respective claim. The adjuster then updates the completion status for the one or more claims in the corresponding plurality of claims (e.g., marks as "complete").

Updating the completion status of the one or more claims to "complete" further updates the customizable user interface of each user in the plurality of users, including a supervisor for the respective adjuster. Thus, completion of the instance of the claim review escalates the instance of the claim review to the supervisor, where the supervisor performs a review of the instance of the claim review. The supervisor then updates the completion status for the instance of the claim review (e.g., marks as "complete").

Updating the completion status of the instance of the claim review to "complete" further updates the customizable user interface of each user in the plurality of users, including the account manager and/or the risk manager. Optionally, the account manager further updates the completion status for the instance of the claim review by submitting the instance of the claim review to the risk manager for review. Alternatively, or additionally, the account manager further updates the completion status for the instance of the claim review by finalizing the instance of the claim review such that it can proceed to scheduling. In some implementations, where the instance of the claim review is submitted to the risk manager for review, the risk manager reviews, updates, annotates, confirms, and/or performs any other appropriate actions for the instance of the claim review. In some implementations, where the instance of the claim review is submitted to the risk manager for review, the risk manager updates the completion status for the instance of the claim review by finalizing the instance of the claim review such that it can proceed to scheduling. Updating the completion status of the instance of the claim review to "finalized" further updates the customizable user interface of each user in the plurality of users. Finally, scheduling the instance of the claim review by assigning a review schedule to the instance of the claim review further updates the customizable user interface of each user in the plurality of users.

In some embodiments, each respective action for the instance of the claim review is updated, in real time, on the respective customizable user interface for each respective user in the plurality of users, allowing each respective user to perform their respective tasks efficiently, while fully informed. In some embodiments, the updating the customizable user interface includes generating a notification for each respective user in the plurality of users, thus notifying the respective user that a revision has been made and/or a task is available to perform for the instance of the claim review.

Thus, referring to Block 400 of FIG. 4, another aspect of the present disclosure provides a method for dynamically scheduling a claim review, at a computer system having a display, one or more processors, and memory storing one or more programs for execution by the one or more processors. Referring to Block 402, the method includes, for each respective user in a plurality of users, receiving a request to display an instance of a claim review, where each respective user in the plurality of users is associated with a first entity or a second entity, the instance of the claim review comprises a corresponding plurality of claims, each respective claim in the corresponding plurality of claims corresponding to a claim by a different claimant in a plurality of claimants, and each claim in the corresponding plurality of claims is associated with both the first entity and the second entity.

Referring to Block 404, responsive to the request, a first customizable template is applied to the instance of the claim review, where the first customizable template specifies (i) an order and (ii) a subset of the corresponding plurality of claims in the instance of the claim review. Referring to Block 406, each respective claim in the corresponding plurality of claims is accessed, in electronic form, from one or more data stores, to acquire a summary of the respective claim. Referring to Block 408, the method further includes displaying, on the display, a customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Another aspect of the present disclosure provides a method for dynamically scheduling a claim review, the method including, for each respective user in a plurality of users, for each respective claim review in a plurality of claim reviews, receiving a request to display an instance of the respective claim review, where each respective user in the plurality of users is associated with a first entity or a second entity, the instance of the respective claim review comprises a respective corresponding plurality of claims, each respective claim in the respective corresponding plurality of claims corresponding to a claim by a different claimant in a plurality of claimants, and each claim in the corresponding plurality of claims is associated with both the first entity and the second entity. Responsive to the request, a respective first customizable template is applied to the instance of the respective claim review, where the respective first customizable template specifies (i) an order and (ii) a subset of the respective corresponding plurality of claims in the instance of the respective claim review. Each respective claim in the respective corresponding plurality of claims is accessed, in electronic form, from one or more data stores, to acquire a summary of the respective claim. The method further includes displaying, on the display, a respective customizable user interface comprising (i) a completion status for the instance of the respective claim review, (ii) for each respective claim in the respective corresponding plurality of claims, the summary of the respective claim, (iii) a first affordance for updating the completion status of the instance of the respective claim review, and (iv) a second affordance for updating a criterion for the instance of the respective claim review.

Any of the features, elements, aspects, and/or embodiments of any of the presently disclosed users, entities, candidate claims, claim reviews, filters, customizable user templates, statuses, affordances, criteria, annotations, modifications, features and/or summaries described herein, and any substitutions, modifications, additions, deletions, and/or combinations thereof, as will be apparent to one skilled in the art, are contemplated for use with the foregoing method.

For example, in some embodiments, the method comprises any number of users, any number of claim reviews, and/or any combination thereof, as disclosed herein (see, for example, the sections entitled "Users and Entities" and "Claim Reviews," above). In some embodiments, the plurality of claim reviews includes at least one claim review associated with at least a first user and at least one claim review associated with at least a second user. In some embodiments, the plurality of claim reviews includes a subset of claim reviews associated with at least a first user and a subset of claim reviews associated with at least a second user. In some embodiments, the plurality of claim reviews includes, for each respective user in the plurality of users, a respective subset of claim reviews associated with the respective user.

In some embodiments, for a respective claim review in the plurality of claim reviews, the corresponding plurality of claims includes at least one claim associated with a first user in the plurality of users and at least one claim associated with a second user in the plurality of users. In some embodiments, for a respective claim review in the plurality of claim reviews, for each respective user in the plurality of users, the corresponding plurality of claims includes a respective claim associated with at least the respective user.

In some embodiments, the plurality of claim reviews is displayed as a list, calendar, and/or schedule.

In some embodiments, the plurality of claim reviews is a list, calendar, and/or schedule that is viewable by each user in the plurality of users. For example, in some embodiments, the method comprises displaying, on the display, a list, calendar, and/or schedule of scheduled claim reviews, such that each user in the plurality of users can view the date, time, duration, and/or order of claim reviews that are scheduled to take place. In some such embodiments, the list, calendar, and/or schedule of scheduled claim reviews includes at least a respective claim review associated with a respective user in the plurality of users, such that the respective user can view the position of the respective claim review in a queue of scheduled claim reviews. In some embodiments, the list, calendar, and/or schedule of scheduled claim reviews includes, for each respective scheduled claim review in the plurality of scheduled claim reviews, one or more personnel assigned to the review date of the scheduled claim review (e.g., an adjuster, a supervisor, an account manager, a risk manager, a nurse, and/or a legal counsel). For example, in some such embodiments, the list, calendar, and/or schedule displays an indication of one or more individuals that will attend the review meeting at the date and time indicated by the review schedule, for an instance of each respective claim review in the plurality of claim reviews.

In some embodiments, the list, calendar, and/or schedule displays an affordance for sorting and/or filtering the plurality of scheduled claim reviews using one or more filtering criteria, and the method further comprises specifying an order and/or a subset of one or more scheduled claim reviews in the plurality of scheduled claim reviews. In some embodiments, the one or more filtering criteria include a claim number, a claimant, a state (e.g., a U.S. state and/or a jurisdiction), a claim type (e.g., worker's compensation, medical, health, bodily injury, liability, general liability, auto liability, and/or property liability), an incident date, a cost incurred, an adjuster (e.g., an adjuster name), a supervisor, a work status (e.g., of a claimant, including full, restricted, and/or off), an order (e.g., a number of a respective candidate claim in an ordered list of candidate claims), a schedule (e.g., a date and/or a time of a scheduled claim review), a preparation status (e.g., ready, pending, complete, etc.), a completion status, a litigation status (e.g., yes/no), a body part (e.g., of a bodily injury), a coverage line (e.g., worker's compensation and/or liability), and/or an amount (e.g., dollars). In some embodiments, the one or more filtering criteria include any of the filtering criteria disclosed herein (see, for example, the section entitled "Claim Reviews," above).

In some embodiments, the plurality of scheduled claim reviews is sorted and/or filtered according to the review schedule for each respective scheduled claim review in the plurality of scheduled claim reviews. In some embodiments, the plurality of scheduled claim reviews is sorted and/or filtered according to the order of review of each scheduled claim review in the plurality of scheduled claim reviews. For example, in some embodiments, the method further comprises specifying (i) an order and (ii) a subset of the plurality of scheduled claim reviews based on the review date for the respective instance of each scheduled claim review in the plurality of scheduled claim reviews. In some embodiments, the method comprises specifying (i) an order and (ii) a subset of the plurality of scheduled claim reviews based on the meeting time, meeting duration, start time, and/or end time for the respective instance of each scheduled claim review in the plurality of scheduled claim reviews.

Reports.

In some embodiments, the customizable user interface further comprises an exporting affordance for exporting the instance of the claim review. In some embodiments, the exporting exports the instance of the claim review in Excel, PDF, Word, HTML, and/or image format. In some embodiments, the exporting exports the instance of the claim review such that it can be printed and/or transmitted (e.g., emailed).

In some embodiments, the method further includes generating a report comprising the instance of the claim review. In some embodiments, the report includes any of the features, elements, aspects, and/or embodiments of any of the presently disclosed users, entities, candidate claims, claim reviews, filters, customizable user templates, statuses, affordances, annotations, and/or summaries, and any substitutions, modifications, additions, deletions, and/or combinations thereof as will be apparent to one skilled in the art.

In some embodiments, the generating of a report comprises transmitting the report to a cloud computing infrastructure (e.g., an email). In some embodiments, the method comprises generating an alert (e.g., an email) when the generation of the report is complete.

In some embodiments, the report is stored for retrieval. In some embodiments, the report is transmitted to a cloud computing infrastructure (e.g., a server) for storage. In some embodiments, the method comprises generating an alert (e.g., an email) when transmission to the cloud computing infrastructure is complete.

In some embodiments, the report is exported in a printable format. In some embodiments, the report is generated as a printable document (e.g., a PDF).

In some embodiments, the customizable user interface further includes an affordance for referrals (e.g., durable medical equipment (DME), translation, transportation, home health services, text messaging for physical therapy and/or radiology).

In some embodiments, the customizable user interface further includes a program management dashboard.

In some embodiments, the customizable user interface further includes an affordance for managing shared review approvals. In some embodiments, the customizable user interface further includes an affordance for managing out of office notifications.

In some embodiments, the customizable user interface further displays any of the features, elements, aspects, and/or embodiments of any of the presently disclosed users, entities, candidate claims, claim reviews, filters, customizable user templates, statuses, affordances, annotations, and/or summaries, and any substitutions, modifications, additions, deletions, and/or combinations thereof as will be apparent to one skilled in the art.

Additional Embodiments

Another aspect of the present disclosure provides a computer system, comprising one or more processors and memory, the memory storing instructions for performing a method for dynamically scheduling a claim review, the method comprising receiving a request to display an instance of a claim review, where the request is generated by a first user in a plurality of users, each respective user in the plurality of users is associated with a first entity or a second entity, the instance of the claim review comprises a corresponding plurality of claims, each respective claim in the corresponding plurality of claims corresponding to a claim by a different claimant in a plurality of claimants, and each claim in the corresponding plurality of claims is associated with both the first entity and the second entity. The method further includes applying, responsive to the request, a first customizable template to the instance of the claim review, where the first customizable template specifies (i) an order and (ii) a subset of the corresponding plurality of claims in the instance of the claim review. The method further includes accessing, in electronic form, from one or more data stores, each respective claim in the corresponding plurality of claims, to acquire a summary of the respective claim. The method further comprises displaying, on the display, a customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Another aspect of the present disclosure provides a non-transitory computer-readable medium storing one or more computer programs, executable by a computer, for performing a method for dynamically scheduling a claim review, the computer comprising one or more processors and a memory, the one or more computer programs collectively encoding computer executable instructions that perform a method comprising receiving a request to display an instance of a claim review, where the request is generated by a first user in a plurality of users, each respective user in the plurality of users is associated with a first entity or a second entity, the instance of the claim review comprises a corresponding plurality of claims, each respective claim in the corresponding plurality of claims corresponding to a claim by a different claimant in a plurality of claimants, and each claim in the corresponding plurality of claims is associated with both the first entity and the second entity. The method further includes applying, responsive to the request, a first customizable template to the instance of the claim review, where the first customizable template specifies (i) an order and (ii) a subset of the corresponding plurality of claims in the instance of the claim review. The method further includes accessing, in electronic form, from one or more data stores, each respective claim in the corresponding plurality of claims, to acquire a summary of the respective claim. The method further comprises displaying, on the display, a customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Another aspect of the present disclosure provides a computer system, comprising one or more processors and memory, the memory storing instructions for performing a method for dynamically scheduling a claim review, the method comprising for a respective claim review in a plurality of claim reviews, receiving a request to display an instance of the respective claim review, where the request is generated by a first user in a plurality of users, each respective user in the plurality of users is associated with a first entity or a second entity, each respective claim review in the plurality of claim reviews comprises a respective independent set of claims in a plurality of claims, where each respective claim in the plurality of claims corresponds to a respective claimant in a plurality of claimants, and each claim in the plurality of claims is associated with both the first entity and the second entity. The method includes applying, responsive to the request, a first customizable template to the instance of the respective claim review, where the first customizable template specifies (i) an order and (ii) a subset of the independent set of claims in the instance of the respective claim review, and accessing, in electronic form, from one or more data stores, each respective claim in the respective independent set claims, to acquire a summary of the respective claim. The method further includes displaying, on the display, a customizable user interface comprising (i) a respective completion status for the instance of the respective claim review, (ii) for each respective claim in the respective independent set of claims, the summary of the respective claim, (iii) a first affordance for updating the respective completion status of the instance of the respective claim review, and (iv) a second affordance for updating a respective criterion for the instance of the respective claim review.

Yet another aspect of the present disclosure provides a non-transitory computer-readable medium storing one or more computer programs, executable by a computer, for performing a method for dynamically scheduling a claim review, the computer comprising one or more processors and a memory, the one or more computer programs collectively encoding computer executable instructions that perform a method comprising, for a respective claim review in a plurality of claim reviews, receiving a request to display an instance of the respective claim review, where the request is generated by a first user in a plurality of users, each respective user in the plurality of users is associated with a first entity or a second entity, each respective claim review in the plurality of claim reviews comprises a respective independent set of claims in a plurality of claims, wherein each respective claim in the plurality of claims corresponds to a respective claimant in a plurality of claimants, and each claim in the plurality of claims is associated with both the first entity and the second entity. The method includes applying, responsive to the request, a first customizable template to the instance of the respective claim review, where the first customizable template specifies (i) an order and (ii) a subset of the independent set of claims in the instance of the respective claim review, and accessing, in electronic form, from one or more data stores, each respective claim in the respective independent set claims, to acquire a summary of the respective claim. The method further includes displaying, on the display, a customizable user interface comprising (i) a respective completion status for the instance of the respective claim review, (ii) for each respective claim in the respective independent set of claims, the summary of the respective claim, (iii) a first affordance for updating the respective completion status of the instance of the respective claim review, and (iv) a second affordance for updating a respective criterion for the instance of the respective claim review.

Still another aspect of the present disclosure provides a computer system, comprising one or more processors and memory, the memory storing instructions for performing a method for dynamically scheduling a claim review, the method comprising, for each respective user in a plurality of users, receiving a request to display an instance of a claim review, where each respective user in the plurality of users is associated with a first entity or a second entity, the instance of the claim review comprises a corresponding plurality of claims, each respective claim in the corresponding plurality of claims corresponding to a claim by a different claimant in a plurality of claimants, and each claim in the corresponding plurality of claims is associated with both the first entity and the second entity. The method includes applying, responsive to the request, a first customizable template to the instance of the claim review, where the first customizable template specifies (i) an order and (ii) a subset of the corresponding plurality of claims in the instance of the claim review, and accessing, in electronic form, from one or more data stores, each respective claim in the corresponding plurality of claims, to acquire a summary of the respective claim. The method further includes displaying, on the display, a customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Yet another aspect of the present disclosure provides a non-transitory computer-readable medium storing one or more computer programs, executable by a computer, for performing a method for dynamically scheduling a claim review, the computer comprising one or more processors and a memory, the one or more computer programs collectively encoding computer executable instructions that perform a method comprising, for each respective user in a plurality of users, receiving a request to display an instance of a claim review, where each respective user in the plurality of users is associated with a first entity or a second entity, the instance of the claim review comprises a corresponding plurality of claims, each respective claim in the corresponding plurality of claims corresponding to a claim by a different claimant in a plurality of claimants, and each claim in the corresponding plurality of claims is associated with both the first entity and the second entity. The method includes applying, responsive to the request, a first customizable template to the instance of the claim review, where the first customizable template specifies (i) an order and (ii) a subset of the corresponding plurality of claims in the instance of the claim review, and accessing, in electronic form, from one or more data stores, each respective claim in the corresponding plurality of claims, to acquire a summary of the respective claim. The method further includes displaying, on the display, a customizable user interface comprising (i) a completion status for the instance of the claim review, (ii) for each respective claim in the corresponding plurality of claims, the summary of the respective claim, (iii) a first affordance for updating the completion status of the instance of the claim review, and (iv) a second affordance for updating a criterion for the instance of the claim review.

Still another aspect of the present disclosure provides a computer system having one or more processors, and memory storing one or more programs for execution by the one or more processors, the one or more programs comprising instructions for performing any of the methods and/or embodiments disclosed herein. In some embodiments, any of the presently disclosed methods and/or embodiments are performed at a computer system having one or more processors, and memory storing one or more programs for execution by the one or more processors.

Still another aspect of the present disclosure provides a non-transitory computer readable storage medium storing one or more programs configured for execution by a computer, the one or more programs comprising instructions for carrying out any of the methods disclosed herein.

EXAMPLES

With the ability to collect and analyze patient data, artificial intelligence (AI) provides advantages to the traditionally manual process of managing medical information. Not only does this increase efficiency and improve accuracy in general management procedures, but it also enhances the patient experience. As an added advantage, AI helps reduce costs due to its ability to accurately detect risks earlier on. Some examples of this include remote diagnoses, predictive modeling, and wearable technology paired with digital health programs.

An example claims management system, CareMC Edge-eSM (see, for example, FIGS. 5-21), utilizes AI technology to help adjusters proactively take informed action on claims by, for example, providing systems and methods for dynamically scheduling claim reviews in accordance with an embodiment of the present disclosure, including methods for managing claims and improving outcomes for clients.

Manage Claims. CareMC Edge (504; FIG. 5) is a claims management platform that offers a prospective, proactive, and comprehensive way of managing claims compared to the traditional reactive models. For example, "My Claims" (602; FIG. 6) provides methods for users (e.g., adjusters) to manage their caseload and identify claims needing immediate attention and intervention; "Actions" (1908; FIGS. 19A and 19E) provides actionable insight, integrating multiple managed care activities in real time so users can make informed decisions based on the total care of the patient; "Return to Work (RTW)" (1904; FIGS. 19A and 19C) identifies the barriers to RTW, estimated and expected RTW, and clearly tracks RTW progress; "Claims Summary" (FIGS. 19A-19G) delivers the essential facts and next steps to move the claim forward, all in one screen; and "Medical" (1906; FIGS. 19A and 19D) and "Financials" (FIG. 19A) provides access to all open claim information including medical status, drug history, documents, RTW plan, reserves, financials, and notes. "Claim Review" (1910; FIGS. 19A and 19F) includes data relating to claim reviews, including indications of due dates, review dates, completion status, and annotations (e.g., public discussions, private discussions, and/or recording outcomes).

Integrated Platform. CareMC Edge offers users (e.g., claims professionals) a fully integrated platform with updates to claims and claim reviews generated for all users in real time. For instance, "Claim Summary" (FIG. 19A) provides a dynamic and interactive high-level overview of the features of a respective claim, including Claim Review. The dashboard offers complete visibility and real-time information, helping to integrate user data related to claims and claim reviews, and to proactively manage their claim reviews.

By aggregating and prioritizing complex claims information, including financials, medical, actions, details, return to work, and claim review, CareMC Edge transforms claims data into valuable insight. Compared to the traditional, reactive claims management process, the Edge provides a proactive, data-driven experience for adjusters. This advancement reduces the total cost of risk and, more importantly, helps injured workers get the care they need faster.

The systems and methods of the present disclosure have been proven to make medical processes more efficient and reduce costs. With the power of analytics and AI technology, significant improvements continue to be observed across the healthcare industry.

CONCLUSION

All references cited herein are incorporated herein by reference in their entirety and for all purposes to the same extent as if each individual publication or patent or patent application was specifically and individually indicated to be incorporated by reference in its entirety for all purposes.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed:

1. A computer-implemented method for dynamically updating a customizable user interface, the computer-implemented method comprising:

at a real-time, interactive computer system comprising one or more processors, and a memory storing one or more programs for execution by the one or more processors, the one or more programs comprising one or more instructions for, for each respective user in a first plurality of users comprising at least 5,000 users:

receiving, in electronic form, via a network, by a network communication module of the real-time, interactive computer system, a request to access a structured data construct stored at the real-time, interactive computer system, wherein:

the request (i) is generated at a first remote device, in a plurality of remote devices, associated with a first user, in the first plurality of users, and (ii) comprises an identity of the first user, the real-time, interactive computer system is communicatively coupled, via the network, to at least two remote devices, in the plurality of remote devices, comprising the first remote device, each respective user in the first plurality of users is associated with (i) a first entity or a second entity and (ii) at least one remote device in the plurality of remote devices, the structured data construct comprises an index of a corresponding plurality of data records unique to one or more users in the first plurality of users, the one or more users comprises the first user, and each respective data record in the corresponding plurality of data records corresponding to a plurality of criteria for a corresponding benefit for a different user in a second plurality of users that excludes the first plurality of users and generated by a respective remote device in the plurality of remote devices excluding the first remote device, the second plurality of users comprises at least 50,000 users, the corresponding plurality of data records comprises at least 40,000 data records, and each data record in the corresponding plurality of data records is associated with (i) both the first entity and the second entity, and (ii) the one or more users in the first plurality of users;

responsive to the request, performing a process in real time, the process comprising:

retrieving, responsive to authenticating the identity of the first user, from a customizable template construct of the real-time, interactive computer system storing a plurality of customizable templates, a first customizable template defined by the first user, wherein each respective customizable template specifies a user-defined visualization of a respective plurality of data records in accordance with (i) an independent set of affordances defined by a corresponding user, each respective affordance in the independent set of affordances configured (a) by the first user for performing one or more actions to a corresponding data entry of a data record and (b) to display concurrently with each affordance in the independent set of affordances, (ii) an ordered listing of candidate data records specified by one or more filtering criteria, and (iii) a subset of the corresponding plurality of data records;

accessing, responsive to the first customizable template, in electronic form, from the structured data construct of the real-time, interactive computer system, each respective data record in the corresponding plurality of data records, to acquire a real-time record of a corresponding plurality of data entries associated with the respective data record, wherein the corresponding plurality of data entries comprises (i) a first data entry associated with a completion status of the respective data record, (ii) a second data entry associated with an elapsed time during a period of time allocated to the respective data record, the period of time defined a corresponding threshold timeline for a corresponding user in the second plurality of users, and (iii) a plurality of annotations comprising a first annotation associated with the corresponding user, in the second plurality of users, and authored by the first user, in the first plurality of users, and a second annotation associated with the corresponding user and authored by a second user in a third plurality of users different from both the first plurality of users user and the second plurality of users;

evaluating, by the one or more processors of the real-time, interactive computer system, for each respective data record in the corresponding plurality of data records, each data entry in the corresponding plurality of data entries, thereby generating, without human interference, a summary of the respective data record;

applying the first customizable template to the real-time record of the plurality of data records, thereby generating, by the one or more processors of the real-time, interactive computer system, one or more instructions for displaying a customizable user interface, the customizable user interface comprising:

(i) a first affordance, in the independent set of affordances, for visualizing a graphical representation of the completion status for the corresponding plurality of data records, (ii) for each respective data record in the corresponding plurality of data records, a corresponding second affordance, in the independent set of affordances, for visualizing the summary of the respective data record, (iii) a third affordance, in the independent set of affordances, for updating, the completion status of the corresponding plurality of data records using a first graphical element of the third affordance, and (iv) a fourth affordance, in the independent set of affordances, for updating a criterion for deeming complete some or all of the corresponding plurality of data records using a second graphical element of the fourth affordance;

communicating, via the network, by the network communication module of the real-time, interactive computer system, the one or more instructions for displaying the customizable user interface, thereby causing presentation of the customizable user interface at the display of the first remote device; and further receiving, in electronic form, via the network, by the network communication module of the real-time, interactive computer system, a selection of the first graphical element of the third affordance or the second graphical element of the fourth affordance, wherein the selection is generated at the first remote device via an input by the user at the first remote device, and wherein upon selection of the first graphical element of the third affordance, updating (i), at the structured data construct, the corresponding plurality of data records by modifying the first data entry in the corresponding plurality of data entries associated with the completion status of a first data record in the corresponding plurality of data records and (ii) the graphical representation of the completion status for the corresponding plurality of data records, and upon selection of the second graphical element of the fourth affordance, updating (i), at the structured data construct, the corresponding plurality of data records by updating the second data entry in the corresponding plurality of data entries associated with the criterion for deeming complete some or all of the corresponding plurality of data records and (ii) the graphical representation of the completion status for the corresponding plurality of data records in accordance with an approval of the updating (i) from at least a third user, in the first plurality of users, associated with the first entity and a fourth user, in the first plurality of users, associated with the second entity other than the first user or the second user.

2. The method of claim 1, wherein the completion status for the corresponding plurality of data records is selected from the group consisting of: initiated, preparation, complete, submit for review, finalize, and schedule.

3. The method of claim 1, wherein the criterion for deeming complete some or all of the corresponding plurality of data records is a program discussion topic.

4. The method of claim 1, wherein the criterion for deeming complete some or all of the corresponding plurality of data records is a claim type for the one or more data records in the corresponding plurality of data records.

5. The method of claim 1, wherein the customizable user interface further comprises a fifth affordance, in the independent set of affordances, for selecting, by the first user, a review schedule, and wherein the method further comprises, upon user selection of the fifth affordance, assigning a review schedule to the corresponding plurality of data records, thereby scheduling completion of the claim review before elapsing of the period of time.

6. The method of claim 1, wherein the customizable user interface further comprises a sixth affordance, in the independent set of affordances, for visualizing a review date for the corresponding plurality of data records.

7. The method of claim 1, wherein the customizable user interface further comprises a seventh affordance, in the independent set of affordances, for visualizing a historical record for the corresponding plurality of data records.

8. The method of claim 7, further comprising, upon user selection of the seventh affordance, displaying one or more revisions, by the first user, the second user, the third user or the fourth to the corresponding plurality of data records.

9. The method of claim 1, wherein the customizable user interface further comprises an eighth affordance, in the independent set of affordances, for modifying, by the first user, an annotation in the plurality of annotations.

10. The method of claim 1, wherein the customizable user interface further comprises a ninth affordance, in the independent set of affordances, for modifying, by the first user, the corresponding plurality of data records.

11. The method of claim 10, further comprising, upon user selection of the ninth affordance, updating, at the claim review module, the corresponding plurality of data records by modifying at least two data entries of the first data record.

12. The method of claim 10, wherein the modifying comprises adding a data entry, removing a data entry, updating a status corresponding to a respective data entry, recording a personnel change for a respective data entry, updating a feature for a respective data entry, or a combination thereof.

13. The method of claim 1, wherein the customizable user interface further comprises, for each respective data record in the one or more claims for the corresponding plurality of data records, a corresponding respective affordance for expanding, by the first user, the summary of the respective data record to an expanded summary of the respective data record, wherein the expanded summary of the respective data record is based on a corresponding one or more data entries of the respective data record not displayed prior to the expanding.

14. The method of claim 1, further comprising receiving a request to generate the real-time record of the corresponding plurality of data entries associated with the respective data record by:

applying a second customizable template to the corresponding plurality of data entries, wherein the second customizable template specifies a subset of candidate data entries in a plurality of candidate data entries associated with both the first and the second entity, thereby obtaining one or more candidate data entries, and adding the one or more candidate data entries to the the corresponding plurality of data entries.

15. The method of claim 14, further comprising, prior to the adding the one or more candidate data entries to the the corresponding plurality of data entries, obtaining an approval of the one or more candidate data entries from at least the third user associated with the first entity and the fourth user associated with the second entity other than the first user or the second user.

16. The method of claim 1, wherein the the corresponding plurality of data entries is accessed by the first user at the first remote device.

17. The method of claim 1, wherein the customizable user interface further comprises an exporting affordance for exporting the the corresponding plurality of data entries.

18. The method of claim 1, further comprising generating a report comprising the the corresponding plurality of data entries.

19. The method of claim 1, wherein the customizable user interface further displays, for each respective data record, an indication of one or more users in the second plurality of users or the third plurality of users assigned to the review date for the the corresponding plurality of data entries.

20. The method of claim 1, wherein the receiving further comprises:

receiving log-in credentials for the first user; and detecting selection, by the first user, of a respective data entry.

21. A real-time, interactive computer system, comprising one or more processors and memory, the memory storing instructions for performing a method comprising:

receiving, in electronic form, via a network, by a network communication module of the real-time, interactive computer system, a request to access a structured data construct stored at the real-time, interactive computer system, wherein:

the request (i) is generated at a first remote device, in a plurality of remote devices, associated with a first user, in the first plurality of users, and (ii) comprises an identity of the first user, the real-time, interactive computer system is communicatively coupled, via the network, to at least two remote devices, in the plurality of remote devices, comprising the first remote device, each respective user in the first plurality of users is associated with (i) a first entity or a second entity and (ii) at least one remote device in the plurality of remote devices, the structured data construct comprises an index of a corresponding plurality of data records unique to one or more users in the first plurality of users, the one or more users comprises the first user, and each respective data record in the corresponding plurality of data records corresponding to a plurality of criteria for a corresponding benefit for a different user in a second plurality of users that excludes the first plurality of users and generated by a respective remote device in the plurality of remote devices excluding the first remote device, the second plurality of users comprises at least 50,000 users, the corresponding plurality of data records comprises at least 40,000 data records, and each data record in the corresponding plurality of data records is associated with (i) both the first entity and the second entity, and (ii) the one or more users in the first plurality of users;

responsive to the request, performing a process in real time, the process comprising:

retrieving, responsive to authenticating the identity of the first user, from a customizable template construct of the real-time, interactive computer system storing a plurality of customizable templates, a first customizable template defined by the first user, wherein each respective customizable template specifies a user-defined visualization of a respective plurality of data records in accordance with (i) an independent set of affordances defined by a corresponding user, each respective affordance in the independent set of affordances configured (a) by the first user for performing one or more actions to a corresponding data entry of a data record and (b) to display concurrently with each affordance in the independent set of affordances, (ii) an ordered listing of candidate data records specified by one or more filtering criteria, and (iii) a subset of the corresponding plurality of data records;

accessing, responsive to the first customizable template, in electronic form, from the structured data construct of the real-time, interactive computer system, each respective data record in the corresponding plurality of data records, to acquire a real-time record of a corresponding plurality of data entries associated with the respective data record, wherein the corresponding plurality of data entries comprises (i) a first data entry associated with a completion status of the respective data record, (ii) a second data entry associated with an elapsed time during a period of time allocated to the respective data record, the period of time defined a corresponding threshold timeline for a corresponding user in the second plurality of users, and (iii) a plurality of annotations comprising a first annotation associated with the corresponding user, in the second plurality of users, and authored by the first user, in the first plurality of users, and a second annotation associated with the corresponding user and authored by a second user in a third plurality of users different from both the first plurality of users user and the second plurality of users;

evaluating, by the one or more processors of the real-time, interactive computer system, for each respective data record in the corresponding plurality of data records, each data entry in the corresponding plurality of data entries, thereby generating, without human interference, a summary of the respective data record;

applying the first customizable template to the real-time record of the plurality of data records, thereby generating, by the one or more processors of the real-time, interactive computer system, one or more instructions for displaying a customizable user interface, the customizable user interface comprising:

(i) a first affordance, in the independent set of affordances, for visualizing a graphical representation of the completion status for the corresponding plurality of data records, (ii) for each respective data record in the corresponding plurality of data records, a corresponding second affordance, in the independent set of affordances, for visualizing the summary of the respective data record, (iii) a third affordance, in the independent set of affordances, for updating, the completion status of the corresponding plurality of data records using a first graphical element of the third affordance, and (iv) a fourth affordance, in the independent set of affordances, for updating a criterion for deeming complete some or all of the corresponding plurality of data records using a second graphical element of the fourth affordance;

communicating, via the network, by the network communication module of the real-time, interactive computer system, the one or more instructions for displaying the customizable user interface, thereby causing presentation of the customizable user interface at the display of the first remote device; and further receiving, in electronic form, via the network, by the network communication module of the real-time, interactive computer system, a selection of the first graphical element of the third affordance or the second graphical element of the fourth affordance, wherein the selection is generated at the first remote device via an input by the user at the first remote device, and wherein upon selection of the first graphical element of the third affordance, updating (i), at the structured data construct, the corresponding plurality of data records by modifying the first data entry in the corresponding plurality of data entries associated with the completion status of a first data record in the corresponding plurality of data records and (ii) the graphical representation of the completion status for the corresponding plurality of data records, and upon selection of the second graphical element of the fourth affordance, updating (i), at the structured data construct, the corresponding plurality of data records by updating the second data entry in the corresponding plurality of data entries associated with the criterion for deeming complete some or all of the corresponding plurality of data records and (ii) the graphical representation of the completion status for the corresponding plurality of data records in accordance with an approval of the updating (i) from at least a third user, in the first plurality of users, associated with the first entity and a fourth user, in the first plurality of users, associated with the second entity other than the first user or the second user.

22. A non-transitory computer-readable medium storing one or more computer programs, executable by a real-time, interactive computer system, for performing a method, interactive computer system comprising one or more processors and a memory, the one or more computer programs collectively encoding computer executable instructions that perform the method comprising:

receiving, in electronic form, via a network, by a network communication module of the real-time, interactive computer system, a request to access a structured data construct stored at the real-time, interactive computer system, wherein:

the request (i) is generated at a first remote device, in a plurality of remote devices, associated with a first user, in the first plurality of users, and (ii) comprises an identity of the first user, the real-time, interactive computer system is communicatively coupled, via the network, to at least two remote devices, in the plurality of remote devices, comprising the first remote device, each respective user in the first plurality of users is associated with (i) a first entity or a second entity and (ii) at least one remote device in the plurality of remote devices, the structured data construct comprises an index of a corresponding plurality of data records unique to one or more users in the first plurality of users, the one or more users comprises the first user, and each respective data record in the corresponding plurality of data records corresponding to a plurality of criteria for a corresponding benefit for a different user in a second plurality of users that excludes the first plurality of users and generated by a respective remote device in the plurality of remote devices excluding the first remote device, the second plurality of users comprises at least 50,000 users, the corresponding plurality of data records comprises at least 40,000 data records, and each data record in the corresponding plurality of data records is associated with (i) both the first entity and the second entity, and (ii) the one or more users in the first plurality of users;

responsive to the request, performing a process in real time, the process comprising:

retrieving, responsive to authenticating the identity of the first user, from a customizable template construct of the real-time, interactive computer system storing a plurality of customizable templates, a first customizable template defined by the first user, wherein each respective customizable template specifies a user-defined visualization of a respective plurality of data records in accordance with (i) an independent set of affordances defined by a corresponding user, each respective affordance in the independent set of affordances configured (a) by the first user for performing one or more actions to a corresponding data entry of a data record and (b) to display concurrently with each affordance in the independent set of affordances, (ii) an ordered listing of candidate data records specified by one or more filtering criteria, and (iii) a subset of the corresponding plurality of data records;

accessing, responsive to the first customizable template, in electronic form, from the structured data construct of the real-time, interactive computer system, each respective data record in the corresponding plurality of data records, to acquire a real-time record of a corresponding plurality of data entries associated with the respective data record, wherein the corresponding plurality of data entries comprises (i) a first data entry associated with a completion status of the respective data record, (ii) a second data entry associated with an elapsed time during a period of time allocated to the respective data record, the period of time defined a corresponding threshold timeline for a corresponding user in the second plurality of users, and (iii) a plurality of annotations comprising a first annotation associated with the corresponding user, in the second plurality of users, and authored by the first user, in the first plurality of users, and a second annotation associated with the corresponding user and authored by a second user in a third plurality of users different from both the first plurality of users user and the second plurality of users;

evaluating, by the one or more processors of the real-time, interactive computer system, for each respective data record in the corresponding plurality of data records, each data entry in the corresponding plurality of data entries, thereby generating, without human interference, a summary of the respective data record;

applying the first customizable template to the real-time record of the plurality of data records, thereby generating, by the one or more processors of the real-time, interactive computer system, one or more instructions for displaying a customizable user interface, the customizable user interface comprising:

(i) a first affordance, in the independent set of affordances, for visualizing a graphical representation of the completion status for the corresponding plurality of data records, (ii) for each respective data record in the corresponding plurality of data records, a corresponding second affordance, in the independent set of affordances, for visualizing the summary of the respective data record, (iii) a third affordance, in the independent set of affordances, for updating, the completion status of the corresponding plurality of data records using a first graphical element of the third affordance, and (iv) a fourth affordance, in the independent set of affordances, for updating a criterion for deeming complete some or all of the corresponding plurality of data records using a second graphical element of the fourth affordance;

communicating, via the network, by the network communication module of the real-time, interactive computer system, the one or more instructions for displaying the customizable user interface, thereby causing presentation of the customizable user interface at the display of the first remote device; and further receiving, in electronic form, via the network, by the network communication module of the real-time, interactive computer system, a selection of the first graphical element of the third affordance or the second graphical element of the fourth affordance, wherein the selection is generated at the first remote device via an input by the user at the first remote device, and wherein upon selection of the first graphical element of the third affordance, updating (i), at the structured data construct, the corresponding plurality of data records by modifying the first data entry in the corresponding plurality of data entries associated with the completion status of a first data record in the corresponding plurality of data records and (ii) the graphical representation of the completion status for the corresponding plurality of data records, and upon selection of the second graphical element of the fourth affordance, updating (i), at the structured data construct, the corresponding plurality of data records by updating the second data entry in the corresponding plurality of data entries associated with the criterion for deeming complete some or all of the corresponding plurality of data records and (ii) the graphical representation of the completion status for the corresponding plurality of data records in accordance with an approval of the updating (i) from at least a third user, in the first plurality of users, associated with the first entity and a fourth user, in the first plurality of users, associated with the second entity other than the first user or the second user.

23. The method of claim 1, wherein the second affordance is displayed as a list, a calendar, or a schedule.

24. The method of claim 1, wherein the customizable user interface further comprises a tenth affordance for visualizing the index of of the corresponding plurality of data records.

25. The method of claim 1, wherein each affordance in the independent set of affordances is displayed concurrently via the customizable user interface.

26. The method of claim 1, wherein the customizable user interface is configured to transition between a first of affordances and a second set of affordances.

27. The method of claim 1, the first customizable template is unique to the first user.

28. The method of claim 1, wherein the process is performed without human interference.

\* \* \* \* \*